United States Patent [19]

Lo

[11] Patent Number: 5,987,444
[45] Date of Patent: Nov. 16, 1999

[54] ROBUST NEUTRAL SYSTEMS

[76] Inventor: James Ting-Ho Lo, 10210 Sunway Ter., Ellicott City, Md. 21042

[21] Appl. No.: 08/935,839

[22] Filed: Sep. 23, 1997

[51] Int. Cl.$^6$ ................................. G06E 1/00; G06E 3/00
[52] U.S. Cl. ................................. 706/25; 706/14; 706/15; 706/23
[58] Field of Search ................................. 706/25, 15, 14, 706/23

[56] References Cited

U.S. PATENT DOCUMENTS

| | | | |
|---|---|---|---|
| 5,003,490 | 3/1991 | Castelaz et al. | 706/22 |
| 5,150,323 | 9/1992 | Castelaz | 708/801 |
| 5,408,424 | 4/1995 | Lo | 708/303 |
| 5,649,065 | 7/1997 | Lo et al. | 706/22 |
| 5,748,847 | 5/1998 | Lo | 706/14 |

OTHER PUBLICATIONS

K. Narendra and K. Parthasarathy, "Identification and Control of Dynamical System Using Neural Networks," *IEEE Transactions on Neural Networks*, vol. 1, No. 1, pp. 4–27 (1990).

G. Puskorius and L. Feldcamp, "Neurocontrol of Nonlinear Dynamical Systems with Kalman Filter Trained Recurrent Networks," *IEEE Trainsactions on Neural Networks*, vol. 5, No. 2, pp. 279–297 (1994).

O. Nerrand et al, "Neural Networks and Nonlinear Adaptive Filtering: Unifying Concepts and New Algorithms," *Neural Computation*, vol. 5, pp. 165–199 (1993).

L. Yin et al, "A New Class of Nonlinear Filters—Neural Filters," *IEEE Transaction on Signal Processing*, vol. 41, pp. 1201–1222 (1993).

B. Hassibi and T. Kailath, "H–infinity Optimal Training Algorithms and their Relation to Backpropagation," *Advances in Neural Information Processing Systems*, vol. 7, pp. 191–199, MIT Press (1995).

J. Connor, R. Martin and L Atlas, "Recurrent Neural Networks and Robust Time Series Prediction," *IEEE Trainsactions on Neural Networks*, vol. 3, No. 2, pp. 240–254 (1994).

B. Hassibi, A. Sayed and T. Kailath, "H–infinity Optimality of the LMS Algorithm," *IEEE Trainsactions on Signal Processing*, vol. 44, No. 2, pp. 267–280 (1996).

B. Hassibi, A. Sayed and T. Kailath, "Linear Estimation in Krein Spaces—Part I: Theory," *IEEE Trainsactions on Automatic Control*, vol. 41, No. 1, pp. 18–33 (1996).

B. Hassibi, A. Sayed and T. Kailath, "Linear Estimation in Krein Spaces—Part II: Applications," *IEEE Trainsactions on Automatic Control*, vol. 41, No. 1, pp. 34–49 (1996).

(List continued on next page.)

*Primary Examiner*—Tariq R. Hafiz
*Assistant Examiner*—Wilbert L. Starks, Jr.

[57] ABSTRACT

A robust neural system for robust processing is disclosed for averting unacceptable or disastrous processing performances. This robust neural system either comprises a neural network or comprises a neural network and at least one range transformer. At least one adjustable weight of the robust neural system is a nonlinear weight of the neural work determined in a nonadaptive training of the robust neural system with respect to a nonadaptive risk-sensitive training criterion.

If all the adjustable weights of the robust neural system are nonadaptively adjustable, all these weights are held fixed during the robust neural system's operation. If said neural network is recursive, and the nonadaptive training data used to construct said nonadaptive risk-sensitive training criterion contain data for each of a number of typical values of an environmental parameter, the robust neural system is not only robust but also adaptive to the environmental parameter.

If the robust neural system comprises both nonadaptively and adaptively adjustable weights, these adaptively adjustable weights are adjusted by an adaptor in the robust neural system during its operation. Such a robust neural system is called a robust adaptive neural system. Two types of adaptor are described.

20 Claims, 19 Drawing Sheets

OTHER PUBLICATIONS

J. Speyer, C. Fan and R. Banavar, "Optimal Stochastic Estimation with Exponential Cost Criteria," *Proceedings of the 31st Conference on Decision and Control*, pp. 2293–2298 (1992).

M. James, J. Baras and R. Ellicott, "Risk–Sensitive Control and Dynamic Games for Partially Observed Discrete–time Nonlinear Systems," *IEEE Trainsactions on Automatic Control*, vol. 39, No. 4, pp. 780–792 (1996).

J. Baras and N. Patel, "Information State for Robust Control of Set–Valued Discrete Time Systems," *Proceedings of the 34th Conference on Decision and Control*, pp. 2302–2307 (1995).

W. Lin and C. Byrnes, "H–infinity–Control of Discrete–Time Nonlinear Systems," *IEEE Trainsactions on Automatic Control*, vol. 41, No. 4, pp. 494–510 (1996).

A. Bensoussan and R. Ellicott, "General Finite–Dimensional Risk–Sensitive Problems and Small Noise Limits," *IEEE Trainsactions on Automatic Control*, vol. 41, No. 2, pp. 210–215 (1996).

J. Lo, "Risk–Sensitive Approximation of Functions by Neural Networks," *Proceedings of the 34th Allerton Conference on Communication, Control, and Computing*, Monticello, Illinois, pp. 991–996 (1996).

J. Lo, "Risk–Sensitive Identification of Dynamic Systems by Neural Networks," *Proceedings of the 34th Allerton Conference on Communication, Controlk, and Computing*, Monticello, Illinois, pp. 982–990 (1996).

J. Lo, "Model Reference Risk–Sensitive Neurocontrol for a Deterministic Plant," *Proceedings of the 31st Annual Conference on Information Sciences and Systems*, Johns Hopkins U., Balti., pp. 441–446 (1997).

J. Lo, "Robust Adaptive Identification of Dynamic Systems by Neural Networks," *Proceedings of the 1997 International Conference on Neural Networks*, vol. 2, pp. 1121–1126 (1997).

J. Lo, "Robust Adaptive Neurofilters with or without On–Line Weight Adjustment," *Proceedings of the 1997 International Conference on Neural Networks*, vol. 4, pp. 2245–2250 (1997).

Song, Q., Robust Training Algorithm for a Perceptron Neuron., Neural Networks, Jan. 1997., International Conference on vol.: 3, pp.: 1907–1912 vol. 3.

Larsen, J., et al., Design of Robust Neural Network Classifiers, Acoustics, Speech, and Signal Processing, Jan. 1998., Proceedings of the 1998 IEEE Conference on vol.: 2, pp.: 1205–1208 vol. 2.

Joonsuk Kim; Seo, J.H., Implementation of a robust feedforward neural network using the classifier structure, Neural Networks, Jan. 1994. IEEE World Congress on Computational Intelligence., 1994 IEEE International Conference on vol.: 3, pp.: 1427–1432.

Sean Meyn, "Call for Papers: Thirty–Fourth Annual Allerton Conference on Communication, Control, and Computing", URL: <http://www.cds.caltech.edu/extras/conferences/ALLER96/> (viewed on: May 4, 1999; 0927HRS).

Leahy, M.B., Jr., et al., Robust Model–Based Neural Network Control, Systems Engineering, Jan. 1990., IEEE International Conference on, pp.: 343–346.

Shuzhi Sam Ge, Robust Adaptive NN Feedback Linearization Control of Nonlinear Systems, Intelligent Control, 1996 IEEE International Symposium on, pp.: 486–491, Jan. 1996.

Rovithakis, G.A., et Al., A Robust Direct Adaptive Regulation Architecture Using Dynamic Neural Network Models., Systems, Man, and Cybernetics, Jan. 1994. Humans, Information and Technology., 1994 IEEE International Conference on vol.: 2, pp. 1110–1115 vo.

ROBUST NEUTRAL SYSTEMS

CROSS-REFERENCE TO RELATED APPLICATION

This application is related to U.S. Pat. No. 5,408,424, entitled "Optimal Filtering by Recurrent Neural Networks," granted 18 Apr. 1995; U.S. Pat. No. 5,649,065, entitled "Optimal Filtering by Neural Networks with Range Extenders and/or Reducers," grant 15 Jul. 1997; U.S. patent application Ser. No. 08/575,055, entitled "Nonadaptively Trained Adaptive Neural Systems," filed 21 Dec. 1995; U.S. patent application Ser. No. 08/893,781, entitled "Recursive Neural Filters;" filed Jul. 11, 1997; and U.S. patent application Ser. No. 08/893,782, entitled "Neural Systems with Range Reducers and/or Extenders," filed Jul. 11, 1997.

BACKGROUND OF THE INVENTION

This invention is concerned with robust processing and robust adaptive processing by artificial neural systems (NSs) to avoid unacceptable or disastrous processing performances. The invention disclosed herein is applicable in a large number of fields including pattern recognition, signal/speech processing, system identification/control, communication, robotics, biomedical electronics, mechanical design, sound/vibration cancellation, economics, geophysics, sonar/radar data processing, oceanography, time series prediction, financial market forecast, etc. An artificial NS is hereinafter referred to as an NS.

One of the major concentrated activities of the past 15 years in the conventional control theory has been the development of the so-called "$H^\infty$-optimal control theory," which addresses the issue of worst-case controller design for linear plants subject to unknown additive disturbances and plant uncertainties. Many references can be found in B. A. Francis, *A Course in $H^\infty$ Control Theory*, Springer-Verlag, New York (1987); and T. Basar and P. Bernhard, *$H^\infty$-Optimal Control and Related Minimax Design Problems: A Dynamic Game Approach*, 2nd Edition, Birkhauser, Boston, Mass. (1995). Although the idea of worst-case design is a little too conservative, "$H^\infty$-optimal" has become a synonym to the word "robust" in the control theory community.

Among many interpretations of and alternative approaches to the $H^\infty$-optimality for robust linear control and filtering are those based on the minimax criteria in dynamic games and the risk-sensitive (or exponential cost) criteria. The risk-sensitive criteria were first proposed in D. H. Jacobson, "Optimal Stochastic Linear Systems with Exponential Performance Criteria and Their Relation to Deterministic Games," *IEEE Transactions on Automatic Control*, AC-18-2, pp.124–131 (1973) for optimal stochastic linear control. The relationships among the $H^\infty$, the minimax criteria in dynamic games and the risk-sensitive criteria have attracted a great deal of attention in the past few years. Some well-known references are K. Glover and J. C. Doyle "State-Space Formulae for All Stabilizing Controllers That Satisfy an $H^\infty$ Norm Bound and Relations to Risk-Sensitivity," *Systems Control Letters*, vol. 11, pp. 167–172, (1988); P. Whittle, *Risk Sensitive Optimal Control*, Wiley, New York (1990); Jason L. Speyer and Chih-Hai Fan and Ravi N. Banavar, "Optimal Stochastic Estimation with Exponential Cost Criteria," *Proceedings of the 31st Conference on Decision and Control*, IEEE, New York, N.Y. (1992); T. Basar and P. Bernhard, *$H^\infty$-Optimal Control and Related Minimax Design Problems: A Dynamic Game Approach*, 2nd Edition, Birkhauser, Boston, Mass. (1995); B. Hassibi and A. H. Sayed and T. Kailath, "$H^\infty$-Optimality of the LMS Algorithm, *IEEE Transactions on Signal Processing*, vol. 44, pp. 267–280, (1996). For linear systems, $H^\infty$-optimal controllers and filters can be derived by minimizing some risk-sensitive criteria. Extending these robust processing results to nonlinear problems by the conventional analytic approach is a topic of current research; e.g., W. H. Fleming and W. M. McEneaney, Risk Sensitive Optimal Control and Differential Games, *Stochastic Theory and Adaptive Control*, pp.185–197, vol. 184 of Lecture Notes in Control and Information Sciences, Springer Verlag, Berlin (1992); M. R. James and J. S. Baras and R. J. Elliott, "Risk Sensitive Control and Dynamic Games for Partially Observed Discrete-Time Nonlinear Systems," *IEEE Transactions on Automatic Control*, AC-39(4), pp. 780–792 (1994); John S. Baras and N. S. Patel, "Information State for Robust Control of Set-Value Discrete Time Systems," *Proceedings of the 34th Conference on Decision and Control*, pp. 2302–2307, New Orleans, La. (1995); and W. Lin and C. I. Byrnes, "$H_\infty$-Control of Discrete-Time Nonlinear System," *IEEE Transactions on Automatic Control*, vol. 41, No. 4 (1996). However, certain structures of the mathematical models involved are assumed in these papers, and no systematic conventional method of designing a robust discrete-time processor, that is optimal or near-optimal with respect to a robustness criterion for a general nonlinear operating environment, is available.

Since the neural networks are known to be effective nonlinear processors, let us examine the prior art of neural networks (NNs) for robust processing. There are many good books on NNs and their applications. A good introduction to NNs can be found in R. Hecht-Nielsen, *Neurocomputing*, Addison-Wesley (1990), J. Hertz, A. Krogh and R. G. Palmer, *Introduction to the Theory of Neural Computation*, Addison-Wesley (1991), S. Haykin, *Neural Networks*, Macmillan College Publishing Company (1994), and M. H. Hassoun, *Fundamentals of Artificial Neural Networks*, MIT Press (1995). Applications of NNs can be found in D. A. White and D. A. Sofge, editors, *Handbook of Intelligent Control*, Van Nostrand Reinhold (1992), B. Kosko, editor, *Neural Networks for Signal Processing*, Prentice Hall (1992), D. P. Morgan and C. L. Scofield, *Neural Networks and Speech Processing*, Kluwer Academic Publishers (1991)), and E. Sanchez-Sinencio and C. Lau, editors, *Artificial Neural Networks*, IEEE Press (1992). There are also a large number of research articles concerning neural networks, which can be found in journals (e.g., *IEEE Transactions on Neural Networks, Neural Networks, and Neural Computation*), and in Conference proceedings (e.g., *Proceedings of the International Joint Conference on Neural Networks*).

Patent documents concerning NNs (neural networks) and their applications are too numerous to list here. Three that seem highly relevant to the present invention are as follows. In U.S. Pat. No. 5,003,490 to P. F. Castelaz and D. E. Mills, (1991), a multilayer perceptron with a sigmoid activation function and a tapped delay line for the input is used to classify input waveforms. In U.S. Pat. No. 5,150,323 (1992) to P. F. Castelaz, a multilayer perceptron with a sigmoid activation function and a couple of tapped delay lines for preprocessed inputs is used for in-band separation of a composite signal into its constituent signals. In U.S. Pat. No. 5,408,424 (1995) to James T. Lo, recurrent neural networks are used for optimal filtering.

A neural system (NS) comprising an NN and at least one range transformer is disclosed in U.S. Pat. No. 5,649,065 (1997) to James T. Lo for optimal filtering when the range of the exogenous input process or outward output process of the NS is necessarily large and/or keeps expanding during the operation of the NS.

So far, the main concern in synthesizing an NS, whether it comprises a neural network or a neural network and at least one range transformer, has been a good overall processing performance. However, a good overall processing performance may be accompanied with disastrous or unacceptable processing performances on some individual runs of the NS. The issue of robustness for multilayer perceptrons is considered in B. Hassibi and T. Kailath, "$H^\infty$ Optimal Training Algorithms and their Relation to Backpropagation," *Advances in Neural Information Processing Systems*, vol. 7, pp. 191–199, edited by G. Tesauro, D. S. Touretzky and T. K. Lee, MIT Press, Cambridge, Mass. (1995). Global $H^\infty$ optimal training algorithms for multilayer perceptrons are derived therein. Unfortunately, the ensuing estimators of the weights of a multilayer perceptron under training are infinite-dimensional, requiring growing memory. Upon a specialization, they reduce to a finite-dimensional, but only locally $H^\infty$ optimal estimator, which is the well-known backpropagation algorithm. The local $H^\infty$ optimality of the backpropagation means that it "minimizes the energy gain from the disturbances to the prediction errors, only if the initial condition is close enough to the true weight vector and if the disturbances are small enough." Besides these results on multilayer perceptrons, the issue of robustness has not been considered for neural networks in the open literature.

In summary, a systematic method, conventional or neural-network, of designing a robust processor, that is optimal or near-optimal with respect to a robustness criterion for a general nonlinear operating environment is greatly desired.

SUMMARY

To avert unacceptable or disastrous processing performances, a robust neural system for robust processing is disclosed, that is optimal or near-optimal with respect to a robustness criterion for a general nonlinear operating environment. This robust neural system comprises a neural network, wherein at least one adjustable weight is a nonlinear weight of the neural work determined in a nonadaptive training of the robust neural system with respect to a nonadaptive risk-sensitive training criterion. Usually, the nonadaptive training is performed off-line, and thus said at least one adjustable weight of the neural network is usually held fixed during said robust neural system's operation.

Unless specified otherwise, a neural network in a robust neural system in accordance with the teachings of this invention may be a nonrecurrent neural network such as a multilayer perceptron and a radial basis function network; a recurrent, but not recursive, neural network such as a multilayer perceptron with tapped delay lines and a radial basis function network with tapped delay lines; or a recursive neural network such as a multilayer perceptron with interconnected neurons, a multilayer perceptron with interconnected neurons and tapped delay lines, a multilayer perceptron with output feedbacks, and a multilayer perceptron with output feedbacks and tapped delay lines.

A robust neural system in accordance with the teachings of this invention either comprises a neural network, or comprises a neural network and at least one range transformer. If a robust neural system inputs and processes a process, the process is called the exogenous input process of the robust neural system, and the resulting output process is called the outward output process of the robust neural system. If the range of the exogenous input process or the outward output process is necessarily large or necessarily grows during the operation of the robust neural network, a robust neural system with a range transformer is required. A range transformer may be either a range reducer or a range extender. A range reducer transforms dynamically at least one component of an exogenous input process into inputs to at least one input neuron of the neural network. A range extender dynamically transforms outputs of at least one neuron of the neural network either into at least one component of the outward output process or into at least another neuron's input process.

If all the adjustable weights of a robust neural system in accordance with the teachings of this invention are determined in a nonadaptive training, all these adjustable weights are usually held fixed during the robust neural system's operation. In this case, if the robust neural system comprises a recursive neural network; and if the nonadaptive risk-sensitive training criterion, with respect to which the robust neural system is trained, is constructed with realizations of said robust neural system's operating environment for each of a plurality of typical values of an adaptation-worthy environmental parameter, said robust neural system is capable of not only robust, but also adaptive processing.

If a robust neural system in accordance with the teachings of this invention comprises a plurality of nonadaptively adjustable weights, whose operational values are determined in a nonadaptive training of said robust neural system with respect to a nonadaptive risk-sensitive training criterion; and a plurality of adaptively adjustable weights, these adaptively adjustable weights are adjusted by an adaptor in the robust neural system during the robust neural system's operation. Such a robust neural system is called a robust adaptive neural system. Two types of adaptor for a robust adaptive neural system are disclosed.

If the adaptively adjustable weights are linear weights of this robust adaptive neural system, and the adaptive risk-sensitive training criterion involves an exponential quadratic function of the outward outputs of the robust adaptive neural system, an algorithm, selected from the group consisting of the a posteriori risk-sensitive filter, the a priori risk-sensitive filter, the normalized LMS algorithm and the LMS algorithm, can be used in the adaptor for adjusting the adaptively adjustable weights.

DESCRIPTION OF PREFERRED EMBODIMENTS

Figure 1:
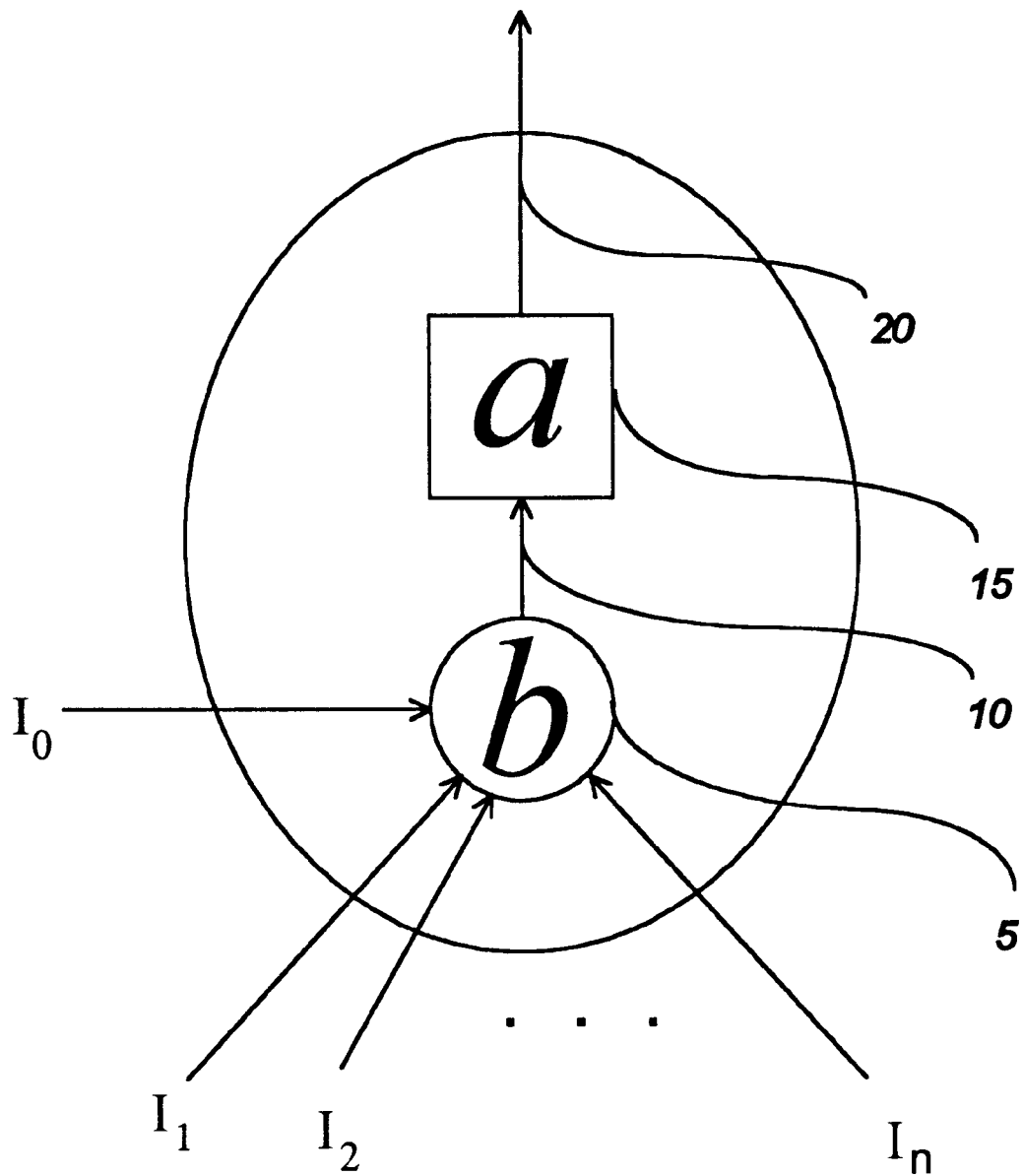
FIG. 1 is a schematic diagram of a typical neuron, which consists of a basis function b and an activation function a, forming a function composition. The basis function 5 is usually a finite series expansion of the bias $I_0$ and inputs, $I_1, \ldots, I_n$, to the neuron, which expansion is comprised of polynomial, rational, trigonometric, exponential, logarithmic, hyperbolic, transcendental, wavelet, and/or spline element(s). The value of the basic function at the link 10 is $b(I_0, I_1, \ldots, I_n)$. The activation function 15 is simply a linear or nonlinear transformation, which is a sigmoidal, exponential, wavelet, spline, polynomial, rational, trigonometric, hyperbolic, logarithmic, other transcendental function or a combination thereof. The activation level 20 of the neuron is thus $a(b(I_0, I_1, \ldots, I_n))$.

Some terminologies needed are now defined: A noun in its plural form is sometimes used to encompass both the singular and plural forms of the same noun for brevity. The symbol ":=" means "is defined to be." A vector is an n-tuple of real numbers, where n is a positive integer. A scalar is a one-dimensional vector. A vector-valued variable is a single-dimensional or a multiple-dimensional variable. A process is an ordered sequence of vector-valued variables with the same dimension. A sequence index is called time and denoted by t and takes on nonnegative integer values 1, 2, . . . , T, where T is a finite positive integer or infinity. There may or may not be a mathematical/statistical model for the process, which governs the evolution of the process. There may or may not be any knowledge about the relationship among the components of each vector-valued variable of the process or among the vector-valued variables at different times. A realization of a process is a sequence of the consecutive vector values of the process. If two processes denoted by x(t) and y(t), for t=1, 2, . . . , T, respectively, are related by a known and fixed function f such that y(t)=f(x(t)) for t=1, 2, . . . , T, then the function f is called a static transformer of the x process. If y(t) at a current time t depends not only on x(t) but also on at least one preceding value, say x(t−1), of the x process, and/or on the current and/or preceding value(s) of another process, then the mapping, transversal or recursive, that effects this transformation from the x process to the y process is called a dynamic transformer of the x process.

Let $(\Omega, A, \mu)$ be a probability space, where $\Omega$, A and $\mu$ are a sample space, a σ-field of events in $\Omega$, and a probability measure for A, respectively. For positive numbers p and $\lambda$, the order-$(\lambda,p)$ risk-sensitive functional $q_{\lambda,p}$ is a function from the collection V of all random variables g, that is defined by $$q_{\lambda,p}(g) := \frac{1}{\lambda}\ln E[\exp(\lambda|g|^p)] := \frac{1}{\lambda}\ln \int \exp(\lambda|g(\omega)|^p) d\mu(\omega),$$

for each $g \in V$, where c is a positive constant, and E denotes the expectation or the integral with respect to $\mu$. Note that if Ω is a finite set $\{\omega_1, \ldots, \omega_N\}$, then $$E[\exp(\lambda|g|^P)] := \sum_{i=1}^{N} \mu(\omega_i)\exp(\lambda|g(\omega_i)|^P).$$

If $\mu$ is a uniform probability distribution over $\{\omega_1, \ldots, \omega_N\}$, then $\mu(\omega_i)=1/N$ for every $i$ and $$E[\exp(\lambda|g|^P)] := \frac{1}{N}\sum_{i=1}^{N} \exp(\lambda|g(\omega_i)|^P).$$

Some intuition can be obtained by expanding $\rho_{\lambda,P}$ (g) in terms of $\lambda$ and writing $$q_{\lambda,P}(g) = E(|g|^P) + \frac{\lambda}{2}E(|g|^{2P}) + o(\lambda^2).$$

The order-($\lambda$,2) risk-sensitive functional was first used in D. Jacobson, "Optimal Stochastic Linear Systems with Exponential Performance Criteria and Their Relation to Deterministic Games," *IEEE Transactions on Automatic Control*, AC18-2, pp.124–131 (1973) for optimal stochastic linear control. It is called the standard risk-sensitive functional. The general order-($\lambda$,p) risk-sensitive functional $q_{\lambda,p}$ was conceived by the present inventor.

It is understood that many equivalent forms of the order-($\lambda$, p) risk-sensitive functional exist. For instance, $$q_{\lambda,P}(g) = \frac{1}{\lambda}\ln E\left[c^{(\lambda \log_c e)|g|^P}\right] = (\log_c e)\frac{1}{v}\ln E\left[c^{v|g|^P}\right],$$

where $v:=\lambda\log_c e$. The risk-sensitive functionals are used to construct performance and training criteria, which are elaborated on later. The functionals, $E[\exp (\lambda|g|^P)]$ and $E[c^{v|g|^P}]$, where $v=\lambda\log_c e$, are also called order-($\lambda$,p) risk-sensitive functionals.

Neural Networks and Their Elements and Structures

A neuron or node is a processing element that receives input numbers and produces an output number, which is called the activation level of the neuron or node. Referring to FIG. 1, a typical neuron (or node) consists of two functions, a basis function, b, and an activation function, a, forming a function composition. The basis function 5 is usually a finite series expansion of the bias $I_0$ and inputs, $I_1, \ldots, I_n$, to the neuron, which expansion is comprised of polynomial, rational, trigonometric, exponential, logarithmic, hyperbolic, transcendental, wavelet, and/or spline element(s). The value of the basic function at the link 10 is $b(I_0, I_1, \ldots, I_n)$. The activation function 15 is simply a linear or nonlinear transformation, which is a sigmoidal, exponential, wavelet, spline, polynomial, rational, trigonometric, hyperbolic, logarithmic, other transcendental function or a combination thereof. The activation level 20 of the neuron is thus $a(b(I_0,I_1, \ldots, I_n))$. If the activation level, $a(b(I_0, I_1, \ldots, I_n))$ of a neuron is a nonlinear function of $I_0$, $I_1, \ldots, I_n$, the neuron is called a nonlinear neuron.

Figure 2:
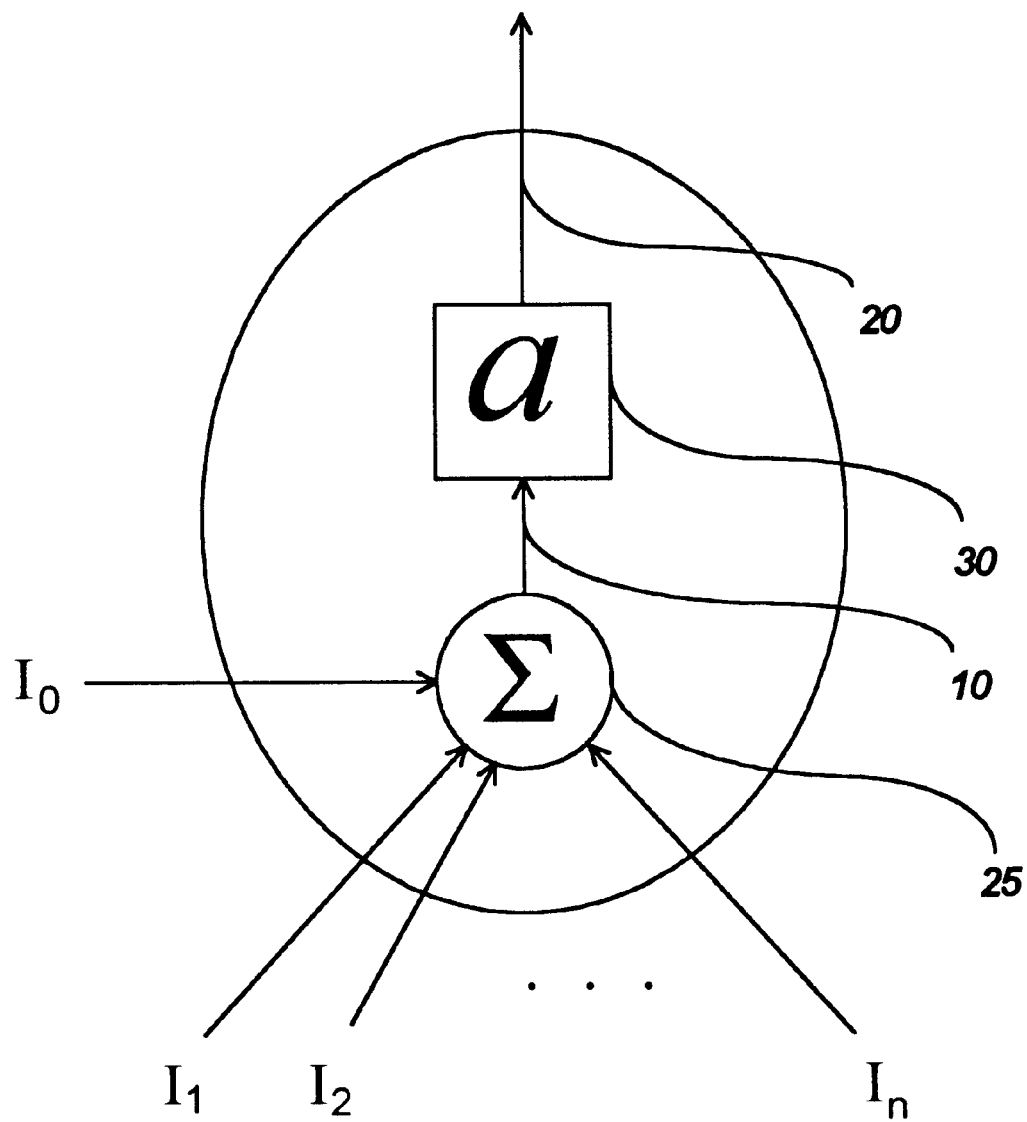
FIG. 2 is a schematic diagram of a widely-used neuron, which is a special case of the typical neuron depicted in FIG. 1. It consists of a summer 25 and an activation function 30 denoted by $\Sigma$ and a respectively. The activation function is a sigmoid function such as the hyperbolic tangent function tanh x, the logistic function, $1/(1+e^{-x})$, and the function $x/(1+|x|)$. Denoting the inputs to the neuron by $I_1, I_2, \ldots, I_n$, and the bias for the neuron by $I_0$, the basic function here is $\Sigma_{i=0}^n I_i$ and the activation level of the neuron at its output terminal 20 is $a(\Sigma_{i=0}^n I_i)$.

A widely-used neuron, which is a special case of the above typical neuron, is depicted in FIG. 2. It consists of a summer 25 and an activation function 30 denoted by $\Sigma$ and a respectively. The activation function is a sigmoid function such as the hyperbolic tangent function, tanh x, and the logistic function, $1/(1+e^{-x})$. Denoting the inputs to the typical neuron by $I_1, I_2, \ldots, I_n$, and the bias for the neuron by $I_0$, the basic function here is $\Sigma_{i=0}^{n}I_i$ and the activation level of the neuron at its output terminal 20 is $a(\Sigma_{i=0}^{n}I_i)$.

A constant that affects a neuron's processing such as a constant in the basic and activation functions of the neuron is called a parameter or a weight of the neuron. A delayless connection is means for effecting a weighted signal transfer from one neuron to another neuron. More specifically, a delayless connection is means for multiplying the activation level of a neuron by a number, which is called the weight of the delayless connection, and sending the resulting product to another neuron as one input of this neuron. A weight of a delayless connection is sometimes called a delayless weight. A delay connection is means for multiplying a first neuron's activation level by a number, which is called the weight of the delay connection, holding the resulting product for at least one unit of time, and then sending this product to a second neuron as one input of this second neuron. The second neuron may or may not be the same as the first. A weight of a delay connection is sometimes called a delay weight. By a connection and a weight of a connection, we mean a delayless or delay connection and a weight of a delayless or delay connection, respectively, unless indicated or implied otherwise. The bias for a neuron is a parameter of the neuron, but often treated as the weight of a delayless connection leading into this neuron from a constant activation level 1. A (delayless and/or delay) weight may be set equal to one or some other constant. It may also be determined in a process or procedure called training to be elaborated on later. A weight of a neuron and a weight of a connection leading to said neuron are said to be local to said neuron. It is understood that the word "time" herein refers to the index of a sequence, which may be an index of time or may simply be the numbering or index of patterns or events. In the latter case, the phrases, "a time unit" and "a time step" mean "a change of the numbering or index by one."

A neural network (NN) is a plurality of neurons and a plurality of connections (delay and/or delayless connections), which include one or more neurons receiving input signals from outside the NN (neural network), which neuron(s) are called input neurons and one or more neurons sending out output signals to outside the NN, which neuron (s) are called output neurons. An input signal from outside the NN is referred to as an input of the NN. Those neurons that are neither input neurons nor output neurons are called hidden neurons of the NN. A nonlinear neuron that is neither an input neuron nor an output neuron is called a hidden nonlinear neuron. (It is understood that if a neuron in an NN is treated as a hidden neuron in the training of the NN, examining the activation level of a hidden neuron or using it for a purpose other than the purpose that the NN is trained for in an operation of the NN do not make the hidden neuron an output neuron.) There may be one or more different types of neuron in an NN. For instance, an input neuron may only serve to distribute its single exogenous input signal through connections to some other neuron(s), and an output neuron may only serve to evaluate the sum of its bias and input signals, which arrive through connections from other neurons.

Consider an NN whose N neurons each have a summer and an activation function. Let the neurons in the NN be numbered 1 through N; the activation function of neuron n be denoted by $a_n$; the set of neurons each having a connection leading to neuron n with a delay of m time units be denoted by $D_m(n)$; the weight of the connection from neuron j to neuron i be denoted by $w_{ij}$; the activation level of neuron n at time t be denoted by $\beta_n(t)$; the exogenous input to neuron n be denoted by $I_n$; the bias for neuron n be denoted by $w_{n0}$; and the maximum connection delay be denoted by M. Then at time t, the processing performed by neuron n is $$\eta_n(t) = I_n + w_{n0} + \sum_{m=0}^{M} \sum_{j \in D_m(n)} w_{nj} \beta_j(t-m),$$

$$\beta_n(t) = a(\eta_n(t)).$$

Figure 3:
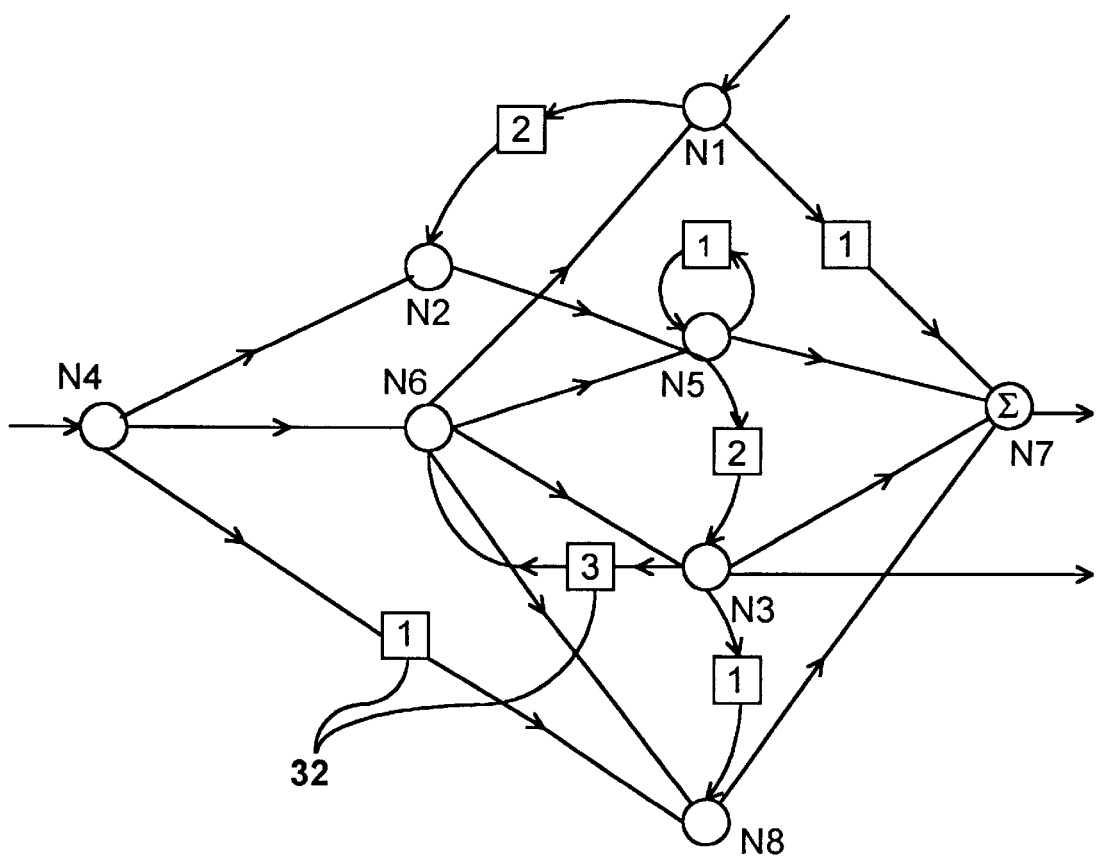
FIG. 3 shows an example neural network (NN). It contains 8 neurons, which are numbered N1 through N8 and represented by circles in the figure. Neurons N1 and N4 are the input neurons receiving exogenous inputs. Neurons N3 and N7 are the output neurons sending out output signals to outside the NN. Both the basic and activation functions of Neuron N4 are the identity function whose input and output are identical. Neuron 4 simply distributes its single input signal to its succeeding neurons N2, N6 and N8. Neuron N7 is simply a summer, which sums the activation levels of N7's preceding neurons N1, N5, N3 and N8. Neurons N1, N2, N3, N5, N6 and N8 are of the same type, whose basic function is a summer and whose activation function is the hyperbolic tangent function, tanh x. A delayless connection is represented by a line with an arrowhead indicating the direction of the signal transfer. A delay connection is represented by two lines with arrowheads connected in series with a box 32 in between. The box encloses a number that indicates the number of time steps that the connection holds a signal before it transfers the signal.

An example NN is shown in FIG. 3. It contains 8 neurons, which are numbered N1 through N8 and represented by circles in the figure. Neurons N1 and N4 are the input neurons receiving exogenous inputs. Neurons N3 and N7 are the output neurons sending out output signals to outside the NN. Both the basic and activation functions of Neuron N4 are the identity function whose input and output are identical. Neuron N4 simply distributes its single input signal to its succeeding neurons N2, N6 and N8. Neuron N7 is simply a summer, which sums the activation levels of N7's preceding neurons N1, N5, N3 and N8. Neurons N1, N2, N3, N5, N6 and N8 are of the same type, whose basic function is a summer and whose activation function is the hyperbolic tangent function, tanh x. A delayless connection is represented by a line with an arrowhead indicating the direction of the signal transfer. A delay connection is represented by two lines, each with an arrowhead, connected in series with a box 32 in between. The box encloses a number that indicates the number of time steps that the connection holds a signal before it transfers the signal.

The example NN has a layer structure: We observe that at a discrete time, neuron N4's activation level must be available, before all the processings in neurons N2 and N6 can be performed. Although N2 and N6 receive signals from N1 and N3 respectively, these signals are delayed signals and are thus available from preceding discrete times. Therefore, as soon as the activation level of N4 becomes available, N2 and N6 can perform their processings and make their activation levels available for other neurons. Similarly, as soon as the activation levels of N2 and N6 become available, the processings of neurons N1, N5, N3 and N8 can be performed, whose activation levels are needed in neuron N7's processing. Hence, the 4 sets of neurons, {N4}, {N2, N6}, {N1, N5, N3, N8}, and {N7}, form 4 layers to be called layer 0, layer 1, layer 2, and layer 3, respectively, of the example NN.

This observation can be easily generalized: Given an NN, we ignore the delay connections and examine the order in which the neurons' processings can take place. Those neuron(s) whose processing(s) can be performed simultaneously form a layer. The resulting layers are then numbered layer 0, layer 1, . . . , in their processing order. Notice that a delayless connection must feed forward from a layer to a higher-ordered layer, but a delay connection may either feed forward to a higher-numbered layer or feed back to the same or a lower-numbered layer. A connection is called a feedforward connection or a feedback connection, depending on whether it feeds forward or backward.

Recall from the graph theory that a directed graph G consists of two sets, V and E, V being a finite nonempty set of vertices and E being a set of directed pairs of vertices called edges. An edge is represented by a directed pair $(V_i, V_j)$, where $V_i$ is the tail and $V_j$ is the head of the edge. A path from vertex $V_p$ to vertex $V_q$ in graph G is a sequence of vertices, $V_p, V_{i_1}, V_{i_2}, \ldots, V_{i_n}, V_q$, such that $(V_p, V_{i_1}), (V_{i_1}, V_{i_2}), \ldots,$ and $(V_{i_n}, V_q)$ are edges in E. A simple path is a path in which all vertices except possibly the first and last are distinct. A cycle is a simple path in which the first and last vertices are the same. A very special case of a cycle is a vertex $V_p$, if $(V_p, V_p)$ is an edge in E. The terminology of directed graphs used here can be found in the book by E. Horowitz and S. Sahni, *Fundamentals of Data Structure*, Computer Science Press, Inc. (1976).

Ignoring the exogenous inputs and the connection delays of an NN, the NN can be viewed as a directed graph with the neurons as the vertices and the (delay and/or delayless) connections as the edges. A neuron on a cycle is called a cyclic neuron. A neuron that is not a cyclic neuron is called a noncyclic neuron. All the neuron(s) and connection(s) that have a path to a cyclic neuron form the recursive section of the NN. The rest form the nonrecursive section. Expressing the NN's output(s) as a function of the inputs, the delayed activation levels (held by the delay connections), and the (connection and neuron) weights of the NN, a weight from the nonrecursive section that appears linearly is called a linear weight and a connection with a linear weight is called a linear connection. A weight or connection that is not linear is called a nonlinear weight or connection, respectively. The set of all the linear connection(s), the neuron(s) at the tail(s) of these linear connection(s), and the linear weight(s) of neuron(s) with a linear weight is called the linear section of the NN. The rest of the NN is called the nonlinear section of the NN. The intersection of the nonlinear section and the nonrecursive section is called the nonlinear subsection of the nonrecursive section of the NN.

In the example NN shown in FIG. 3, there are two cycles. One cycle is the sequence, N5, N3, N6 and N5, because (N5, N3), (N3, N6) and (N6, N5) are connections of the NN. The other cycle is N5 itself, since (N5, N5) is a self-feedback connection in the example NN. Hence, N5, N3 and N6 are cyclic neurons. Observe that N6, N1, N2 and N5 form a path to a cyclic neuron, N5; that N4, N2 and N3 form another path to a cyclic neuron, N3; and that N4 and N6 form a third path to a cyclic neuron, N6. Therefore, the neurons, N4, N2, N6, N1, N5 and N3, together with the connections, (N4, N2), (N4, N6), (N2, N5), (N2, N3), (N6, N1), (N6, N5), (N6, N3), (N1, N2), (N5, N3), (N3, N6) and (N5, N5), form the recursive section of the example NN. The neurons, N8 and N7, together with the connections, (N4, N8), (N6, N8), (N3, N8), (N1, N7), (N5, N7), (N3, N7) and (N8, N7), form the nonrecursive section of the example NN. Since the activation functions of N1, N5, N3 and N8 are nonlinear, the only linear weights of the example NN are (N1, N7), (N5, N7), (N3, N7) and (N8, N7).

Depending on the structure, there are different types of NN: An NN with at least one delay connection is called a recurrent NN. An NN without a delay connection is called a nonrecurrent NN. An NN with at least one cyclic neuron is called a recursive NN. An NN without a cyclic neuron is called a nonrecursive NN. While a nonrecursive NN has an empty recursive section, a recursive NN has a nonempty recursive section. We note that a recursive NN must be a recurrent NN, but a recurrent NN may not be a recursive NN. A recurrent NN is a discrete-time dynamic system with all the activation levels of the recurrent NN, that are held by the delay connections at a time, as its dynamic state at the time. The dynamic state of a recurrent NN, in which an operation of the recurrent NN is initiated, is called the initial dynamic state of the recurrent NN for the operation. The components (or activation levels) of an initial dynamic state of a recurrent NN are viewed as weights of the recurrent NN. By the weights of an NN, we refer to the weights of the connections, the parameters of the neurons, and the components of the initial dynamic state, that exist in the NN.

In this description of preferred embodiments and the appended claims, a neural system (NS) is a system comprising an NN or a system comprising an NN and at least a range transformer, which is either a range reducer or a range extender. Range reducers and range extenders are to be described further. A neural system comprising an NN and at least one range transformer inputs and processes a process. A process input to a neural system is called an exogenous input process. A process produced by a neural system is called an outward output process. Through its exogenous input process and outward output process, an NS interacts with its operating environment. The information about the operating environment may be in the form of a mathematical (and/or statistical) model with completely or partially specified functional forms, some simulation data, or some true data, or a combination thereof.

Coefficients, parameters, and/or initialization values of a range transformer are also called weights of the range transformer. The weights of a neural system, denoted by W, are all the weights of the NN and range transformers of the neural system. If the outputs of a neural system depend linearly on a weight at all times during its operation, then this weight is called a linear weight of the neural system. A weight of a neural system that is not its linear weight is called a nonlinear weight of the neural system.

Training a neural system (NS) means determining and/or adjusting some or all of the weights of the NN and its range transformers of said neural system substantially through a process of reducing the value of a training criterion by the variation of these weights. Here the training criterion is a mathematical function of these weights, that is defined using simulated, experimental, and/or operational data about the operating environment of the neural system. Of course, a training criterion should be so chosen that a neural system trained with respect to it has a good processing performance for the NS's intended application. These data that are used to construct the training criterion are called the training data. A training criterion that is constructed only with simulated data, exerimental data, and/or operational data collected in previous operations is called a nonadaptive training criterion. A training criterion that is constructed with training data including the operational data made available during and about the on-going operation of the neural system is called an adaptive training criterion. Trainings with respect to a nonadaptive training criterion and an adaptive training criterion are called a nonadaptive training and an adaptive training respectively. While a nonadaptive training is usually conducted off-line, an adaptive training is usually conducted on-line.

A training criterion that is constructed with a risk-sensitive functional or involves a risk-sensitive functional is called a risk-sensitive training criterion. An NS that is trained with respect to a risk-sensitive training criterion is called a robust neural system.

Some of the weights of a neural system may be set equal to real numbers including 0 and 1, which are held constant throughout the trainings of the neural system, while the other weights are determined and/or adjusted during trainings. The former weights are called the fixed weights and the latter weights are called the adjustable weights of the neural system. The fixed weights of a neural system that belong to the NN therein are called the fixed weights of the NN. The adjustable weights of the NN are similarly defined.

An adjustable weight of a neural system that is determined in a nonadaptive training is called a non-adaptively adjustable weight of the neural system. Similarly, an adjustable weight of a neural system that is adjusted in an adaptive training is called an adaptively adjustable weight of the neural system. The totality of the adjustable weights of an NN of a neural system are denoted by w unless specified otherwise. The totalities of nonadaptively adjustable weights and adaptively adjustable weights in w are denoted by u and v, respectively. The values of the nonadaptively adjustable weights of a neural system, that are obtained in a nonadaptive training and used without being adjusted in an operation of the neural system, are called the operational values of the nonadaptively adjustable weights. It is emphasized that the adjustable weights of a neural system are adjusted only in a training. If there is no adaptive training on-line, the adjustable weights are held fixed on-line.

The collection of all the NNs with some common configurational feature(s) is called an NN paradigm. For instance, the existence or nonexistence of a connection among the neurons in a neuron layer is a configurational feature. The collection of all the NNs of the same NN paradigm that have the same number of neurons of each type, the same number of delay connections, the same number of delayless connections, the same number of input neurons, the same number of output neurons, and the same configuration thereof is called an NN architecture. In other words, two NNs are of the same architecture if and only if they are identical except with possibly different weights on the connections, different parameters in the neurons, and/or different initial dynamic states. Whenever these connection weights, neuron parameters, and/or initial dynamic state are specified for an NN architecture, the NN is completely specified. Recall that these connection weights, neuron parameters and/or initial dynamic state of an NN are all called the weights of the NN, unless a distinction between the connection weights, the neuron parameters, and/or initial dynamic state is necessary and made clear in the context.

Example Neural Network Paradigms

Some example NN paradigms are described in the following.

Figure 4:
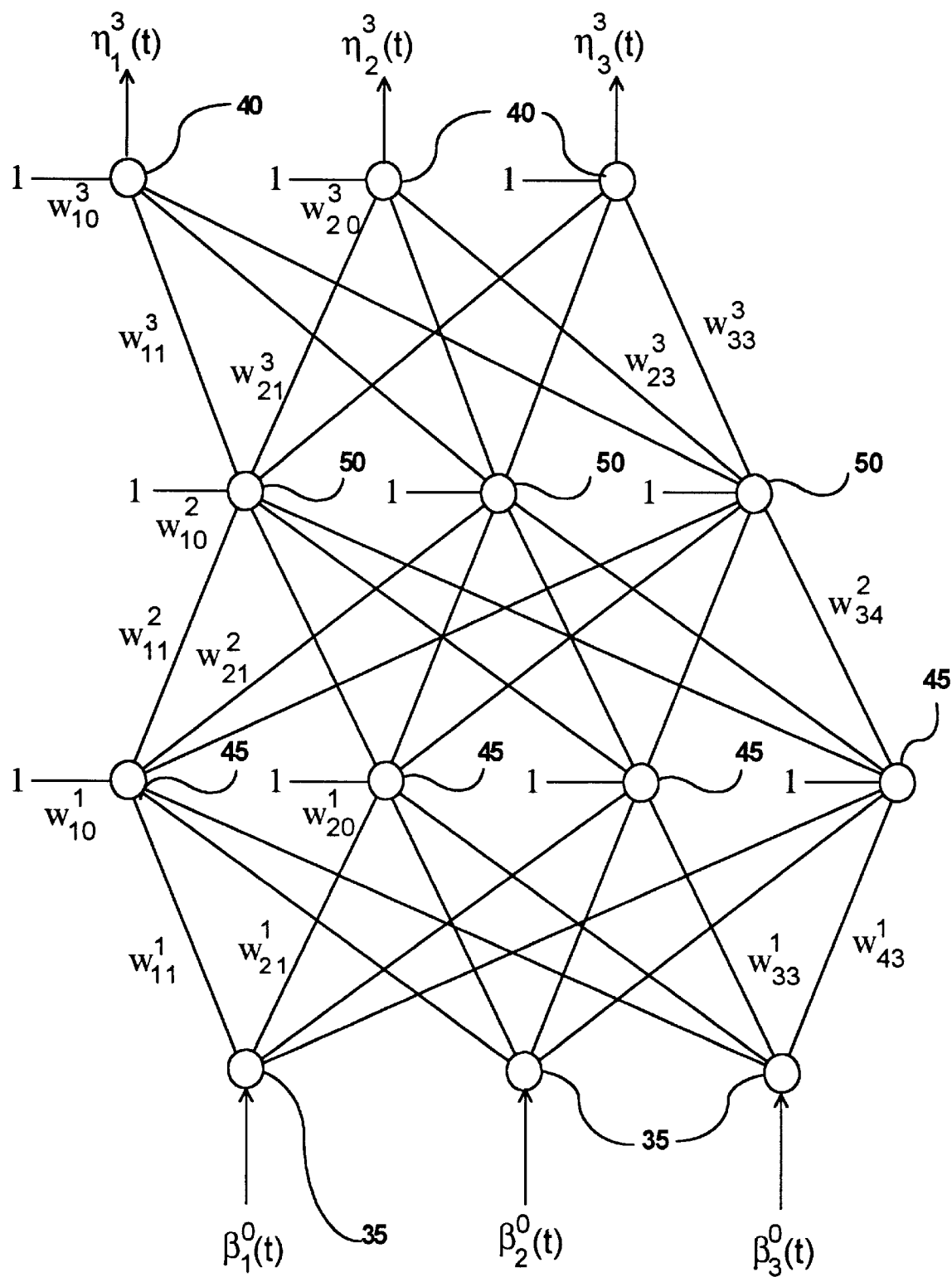
FIG. 4 shows an example multilayer perceptron (MLP). It has 3 input neurons 35 in the zeroth layer, 4 hidden neurons 45 in the first layer, 3 hidden neurons 50 in the second layer, and 3 output neurons 40 in the third and last layer. All the neurons are of the kind shown in FIG. 2. The input neurons 35, whose activation functions are the identity function, simply distribute the exogenous input, $(\beta_1^0(t), \beta_2^0(t), \beta_3^0(t))$, to the neurons in the first layer. The output neurons 40, whose activation functions are also the identity function, are summers, producing outward output, $(\eta_1^3(t), \eta_2^3(t), \eta_3^3(t))$. The activation functions of the neurons in the first and second layers are the hyperbolic tangent, tanh x. All the connections in the example MLP are delayless connection.

1. Multilayer perceptrons (MLPs): MLPs are perhaps the most popular NN paradigm. An example MLP is depicted in FIG. 4. It has 3 input neurons 35 in the zeroth layer, 4 hidden neurons 45 in the first layer, 3 hidden neurons 50 in the second layer, and 3 output neurons 40 in the third and last layer. All the neurons are of the kind shown in FIG. 2. The input neurons 35, whose activation functions are the identity function, simply distribute the exogenous input, $(\beta_1^0(t), \beta_2^0(t), \beta_3^0(t))$, to the neurons in the first layer. The output neurons 40, whose activation functions are also the identity function, are summers, producing outward output, $(\eta_1^3(t), \eta_2^3(t), \eta_3^3(t))$. The activation functions of the neurons in the first and second layers are the hyperbolic tangent, tanh x. All the connections in the example MLP are delayless connection.

The neurons in each layer are numbered from left to right in FIG. 4. The "numbering of a neuron" refers to this numbering in the neuron's layer. The symbol $w_{ij}^l$ denotes the weight on the delayless connection from neuron j in layer l−1 to neuron i in layer l. Only a few of the $w_{ij}^l$ are shown in FIG. 4 to avoid cluttering the figure. The bias for neuron i in layer l is denoted by $w_{i0}^l$, which is viewed as "the weight on the delayless connection leading into i in layer l from neuron 0 in layer l−1, whose activation level is set always equal to 1." Layer l of the MLP consists of the neurons in layer l and the connections leading into them. The totality of the weights in layer l is denoted by $w^l$.

Let us now see how the example MLP depicted in FIG. 4 processes information at time t. Recalling that component i of the input at time t is denoted by $\beta_i^0(t)$, the activation level $\beta_i^l(t)$ of neuron i in layer l and the weighted sum $\eta_i^l(t)$ in the same neuron at time t satisfy, for l=1,2, $$\beta_i^l(t) = a_i^l(\eta_i^l(t)), \tag{1}$$

$$\eta_i^l(t) = w_{i0}^l + \sum_{j=1}^{n_{l-1}} w_{ij}^l \beta_j^{l-1}(t), \tag{2}$$

where $n_{l-1}$ denotes the number of neurons in layer l−1 and $a_i^l(x)$ is the activation function of neuron i in layer l. The output $\eta_i^L(t)$ for L=3, at output neuron i is then determined by $$\eta_i^L(t) = w_{i0}^L + \sum_{j=1}^{n_L} w_{ij}^L \beta_j^{L-1}(t). \tag{3}$$

Depending on the application, there can be, in an MLP, any number L of layers, any number $n_0$ of input neurons, any number $n_L$ of output neurons, and any number $n_l$ of neurons in each hidden layer l. Although the hyperbolic tangent function tanh x, the logistic function $1/(1+e^{-x})$, and the function $x/(1+|x|)$ are perhaps most widely used as the activation functions in the MLPs in the literature, another function or functions selected from the group consisting of sigmoidal, wavelet, spline, polynomial, rational, trigonometric and exponential functions can also be used as the activation functions $a_i^l$ in MLPs to make the processors in the adaptive neural systems in accordance with the present invention. It is noted that all the MLPs with one and the same activation function for hidden neurons form one MLP paradigm. It will be appreciated that there may be more than one type of activation function in an MLP paradigm and the activation function of an input neuron does not have to be an identity function. By setting some delayless weights $w_{ij}$ equal to zero, differently configured MLPs, which are not fully connected, can be obtained. Notice that the equations, (1), (2) and (3), for l=1, . . . , L−1, possibly with some minor modifications are valid for the processing of most MLPs.

Since there are no delay connections in an MLP, it does not have a recursive section and is thus a nonrecursive NN. If all the output neurons are summers, equation (3) is valid for every output component of an MLP. Hence all the weights, $w_{ij}^L$, in layer L, appear linearly in the MLP's outputs and are thus linear weights of the MLP. Since every other weight appears in the MLP's outputs through nonlinear activation functions, the weights, $w^L$, constitute the linear section of the MLP.

Figure 5:
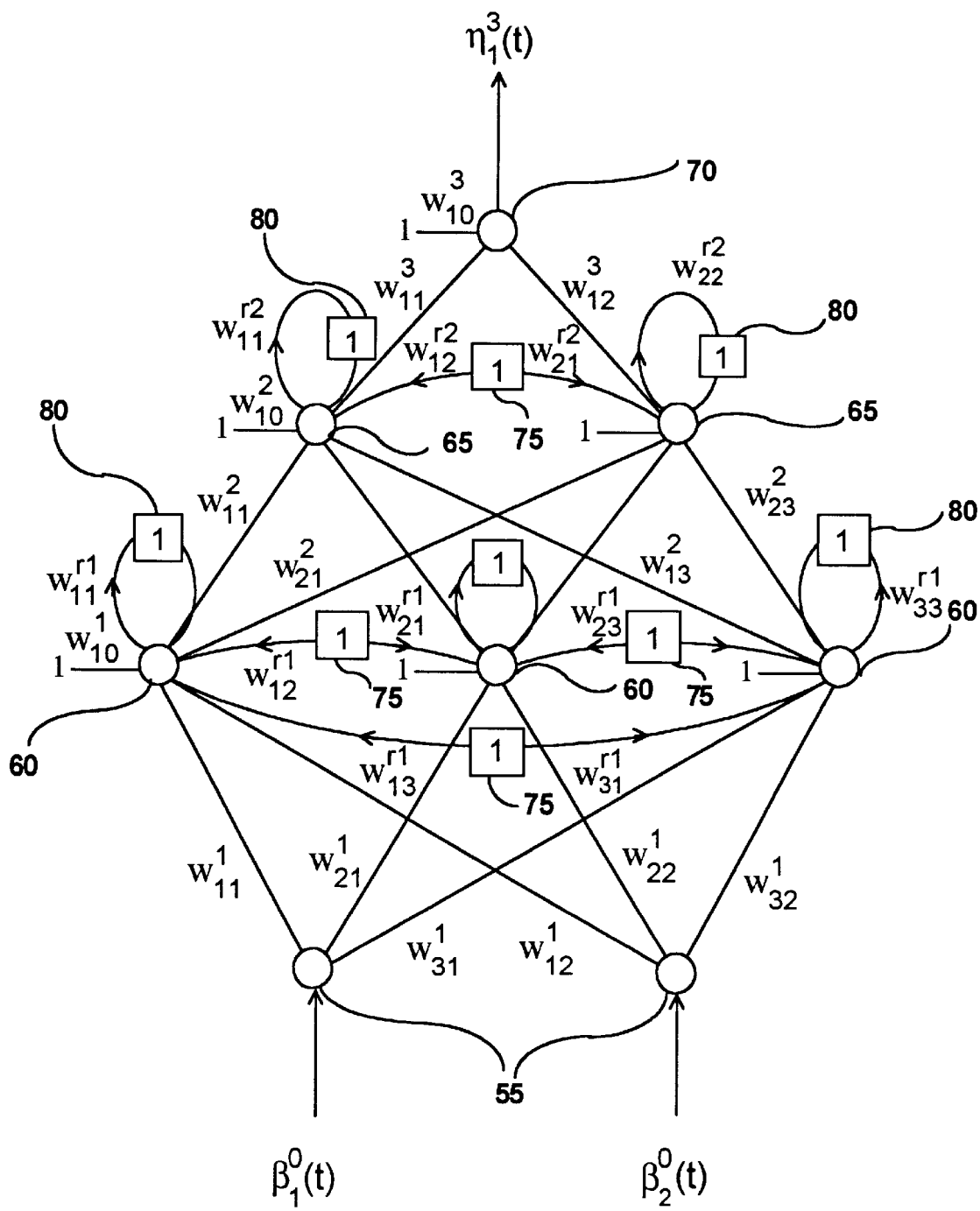
FIG. 5 shows an example multilayer perceptron with interconnected neurons (MLPWIN). It has 2 input neurons 55, 1 output neuron 70, and 2 layers 60, 65 of neurons. The first layer has 3 neurons 60 and the second layer has 2 neurons 65. The input and output neurons are regarded as the neurons in layer 0 and layer 3 respectively. Since the neurons in layers 1 and 2 do not interact directly with outside the MLPWIN, they are hidden neurons and their layers are hidden layers. Every pair of hidden neurons in a layer are interconnected with 2 delay connections, one in each direction. Every delay connection has a unit time delay device. One line with two opposite arrow heads and a box 75 containing the numeral 1 is used to represent such two connections interconnecting two hidden neurons in a layer. All the neurons are of the kind shown in FIG. 2. The input neurons 55, whose activation functions are the identity function, simply distribute the exogenous input, $(\beta_1^0(t), \beta_2^0(t))$, to the neurons in the first layer. The output neuron 70, whose activation functions are also the identity function, are summers, producing outward output, $\eta_1^3(t)$. The activation functions of the neurons in the first and second layers are the hyperbolic tangent, tanh x.

2. Multilayer perceptrons with interconnected neurons (MLPWINs): An MLPWIN is formed from a multilayer perceptron (MLP) by connecting some or all of the neurons in at least one layer of the MLP. There is a unit time delay device on each such connection, making it a delay connection. MLPWINs first appeared in J. L. Elman, "Finding Structures in Time," Cognitive Science, Vol. 14, pp. 179–211 (1990). An example MLPWIN is depicted in FIG. 5. It has 2 input neurons 55, 1 output neuron 70, and 2 layers 60, 65 of neurons. The first layer has 3 neurons 60 and the second layer has 2 neurons 65. The input and output neurons are regarded as the neurons in layer 0 and layer 3 respectively. Since the neurons in layers 1 and 2 do not interact directly with outside the MLPWIN, they are called hidden neurons and their layers are called hidden layers. All the neurons are of the kind shown in FIG. 2. The input neurons 55, whose activation functions are the identity function, simply distribute the exogenous input, $(\beta_1^0(t), \beta_2^0(t))$, to the neurons in the first layer. The output neuron 70, whose activation functions are also the identity function, are summers, producing outward output, $\eta_1^3(t)$. The activation functions of the neurons in the first and second layers are the hyperbolic tangent, tanh x.

The neurons in each layer are numbered from left to right in FIG. 5. The "numbering of a neuron" refers to this numbering in the neuron's layer. The symbol $w_{ij}^l$ denotes the weight on the delayless connection from neuron j in layer l−1 to neuron i in layer l. For notational simplicity, the bias for neuron i in layer l is denoted by $w_{i0}^l$, which is viewed as the "the weight on the delayless connection leading into neuron i in layer l from neuron 0 in layer l−1, the activation level of neuron 0 being set always equal to 1." The symbol $w_{ij}^{rl}$ denotes the weight on the delay connection from neuron j to neuron i in the same layer l. If i≠j, the two delay connections associated with $w_{ij}^{rl}$ and $w_{ji}^{rl}$ between neuron i and neuron j in layer l are indicated in FIG. 5 by the opposite arrow heads on the same line connecting the neurons. The box 80 enclosing the number 1 between the opposite arrow heads denotes a unit time delay device that the weighted activation levels of neuron i and j go through before they are fedback to neurons j and i respectively. The weight for self-feedback of neuron i in layer l is denoted by $w_{ii}^{rl}$. The self-feedback is also delayed by one time unit by a unit time delay device 80 in the FIG. 5. Layer l of the MLPWIN consists of the neurons in layer l and the connections leading into them. The totality of the delay weights, $w_{ij}^{rl}$, in layer l is denoted by $w^{rl}$. The totality of the delayless weights, $w_{ij}^l$, in layer l is denoted by $w^l$.

Figure 6:
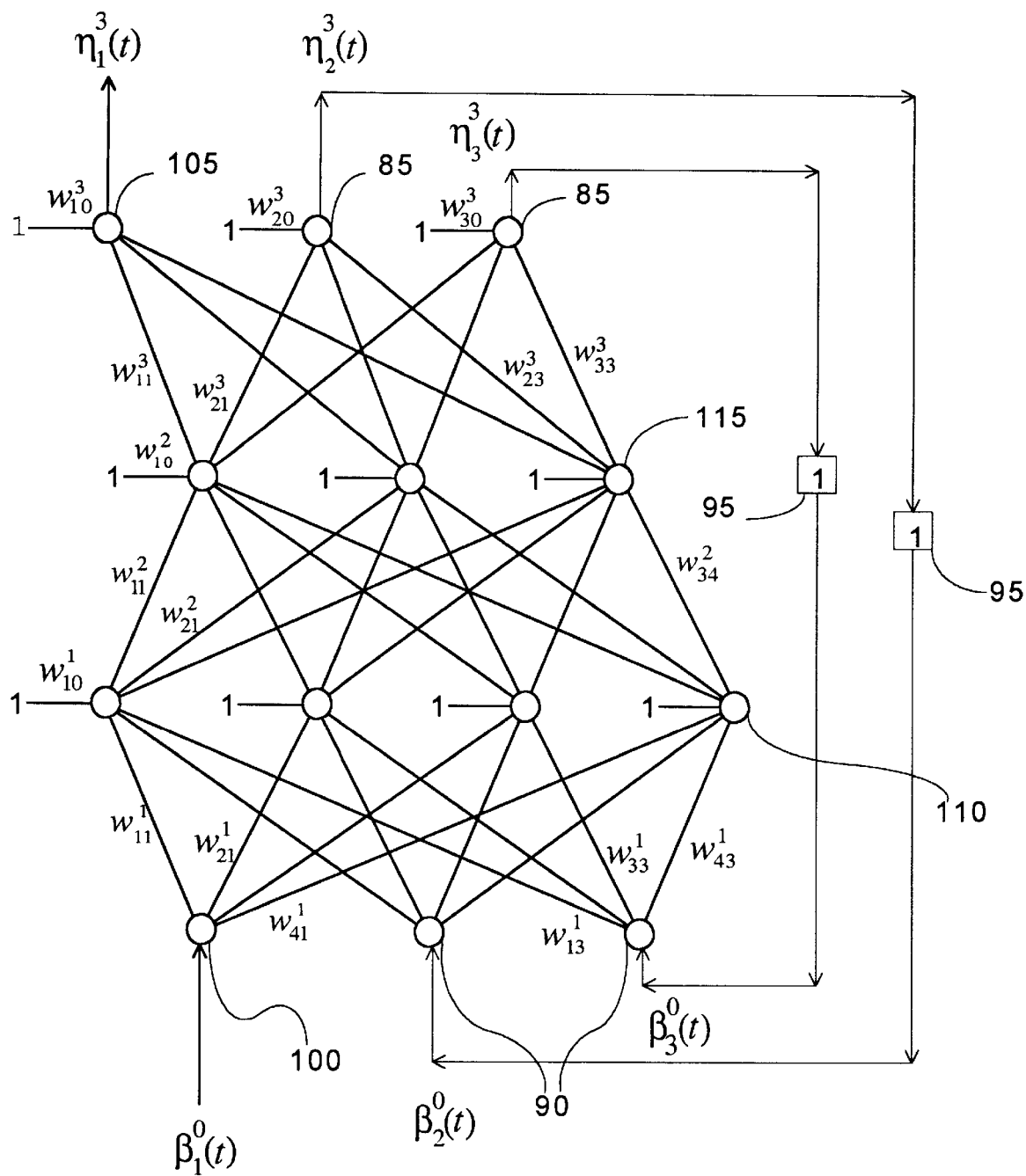
FIG. 6 is a schematic diagram of a typical multilayer perceptron with output feedbacks (MLPWOF). The MLPWOF has 2 free-feedback-sending neurons 85 each connected to a free-feedback-receiving neuron 90 through a unit time delay device 95. The free-feedback-sending neurons 85 shown in FIG. 6 are summers. However, free-feedback-sending neurons may also be neurons (or neurons) of another type or types. There is one input neuron 100 in the MLPWOF, which receives input data from outside the network, and one output neuron 105, which sends output data to outside the network.

Let us now see how the MLPWIN depicted in FIG. 5 processes information at time t. Denoting component i of the input to the MLPWIN at time t by $\beta_i^0(t)$, the activation level $\beta_i^l(t)$ of neuron i in layer l and the weighted sum $\eta_i^l(t)$ in the same neuron at time t satisfy, for l=1,2, $$\beta_i^l(t) = a_i^l(\eta_i^l(t)) \tag{4}$$

$$\eta_i^l(t) = w_{i0}^l + \sum_{j=1}^{n_{l-1}} w_{ij}^l \beta_j^{l-1}(t) + \sum_{j=1}^{n_l} w_{ij}^{rl} \beta_j^l(t-1), \tag{5}$$

where $n_l$ denotes the number of neurons in layer l, $a_i^l(x)$ is the activation function of neuron i in layer l, and $\beta_i^l(t-1)$, for i=1, 2, . . . , $n_l$ and l=1,2, form the dynamic state of the MLPWIN at time t. The dynamic state at time t=1 or at some other time for the performance of the MLPWIN to start being considered is called the initial dynamic state of the MLPWIN. The output $\eta_1^3(t)$ of the MLPWIN depicted in FIG. 6 is then determined by $$\eta_i^L(t) = w_{i0}^L + \sum_{j=1}^{n_{L-1}} w_{ij}^L \beta_j^{L-1}(t), \tag{6}$$

where L=3, i=1, and $n_{L-1}=2$.

Depending on the application, there can be, in an MLPWIN, any number L of layers, and any number $n_l$ of neurons in each layer l, for l=0, . . . , L. Although only the hyperbolic tangent function tanh x and the logistic function $1/(1+e^{-x})$ have been used as the activation functions in the MLPWINs in the literature, other functions such as any wavelet, spline, polynomial, rational, trigonometric and exponential function can also be used as the activation function in accordance with the present invention to make neural systems. Another activation function worth mentioning here is x/(1+|x|), which was recently proposed in D. L. Elliott, "A Better Activation Function for Artificial Neural Networks," ISR Technical Report TR 93-8, Institute for Systems Research, University of Maryland, College Park, Md. (1993). It is noted that all the MLPWINs with one and the same activation function for hidden neurons form one MLPWIN paradigm. It will be appreciated that there may be more than one type of activation function in an MLPWIN paradigm and the activation function of an input neuron does not have to be an identity function. By setting some delayless weights $w_{ij}^l$ and/or delay weights $w_{ij}^{rl}$ equal to zero, differently configured MLPWINs can be obtained. Notice that the equations, (4), (5) and (6), for l=1, . . . , L−1, with possibly some minor modifications are valid for the processing of most MLPWINs.

In an MLPWIN, a neuron with a self-feedback delay connection and/or in a cycle within a layer is a cyclic neuron. All such cyclic neurons and those neurons and/or connctions that have a path leading to one of these cyclic neurons constitute the recursive section of the MLPWIN. The rest of the neurons and connections of the MLPWIN form the nonrecursive section. If all the output neurons are summers, equation (6) is valid for every output component of the MLPWIN. Hence all the weights, $w_{ij}^L$, in layer L, appear linearly in the MLPWIN's outputs and are thus linear weights of the MLPWIN. If all hidden neurons are nonlinear, every other weight appears in the MLPWIN's outputs through these nonlinear neurons, and hence, the weights, $w_{ij}^L$, constitute the linear section of the MLPWIN.

3. Multilayer perceptrons with output feedbacks (MLPWOFs): An MLPWOF is formed with a multilayer perceptron (MLP) by connecting some or all of its last layer neurons (i.e. the output neurons of the MLP) to some of its zeroth layer neurons (i.e. the input neurons of the MLP). There is a unit time delay device on each such connection. The outputs of an MLPWOF are the processing results of the MLPWOF. They usually enter the training criterion directly and are forced to approach some target (or desired) outputs of the MLPWOF in training.

Those last layer neurons that are connected to some zeroth layer neurons (i.e. the input neurons of the MLP) are called feedback-sending neurons. If a feedback-sending neuron is also an output neuron, it is called an output-feedback-sending neuron. Otherwise, it is called a free-feedback-sending neuron. Similarly, a zeroth layer neuron is called an output-feedback-receiving neuron or a free-feedback-receiving neuron, depending on whether the zeroth layer neuron is connected to an output-feedback-sending or a free-feedback-sending neuron. Those zeroth layer neurons that receive inputs from outside the MLPWOF are called input neurons.

MLPWOFs first appeared in M. I. Jordan, "Attractor Dynamics and Parallelism in a Connectionist Sequential Machine," In *Proceedings of the Eighth Annual Conference of the Cognitive Science Society*, pp. 531–546, Erlbaum (1986). However, in all of the MLPWOFs' applications to system identification/control and signal processing, that can be found in the literature, the feedback-sending neurons of an MLPWOF include all of the output neurons.

Preferred MLPWOFs for making neural systems, in accordance with the teaching of this invention, have only free feedbacks. A typical MLPWOF with only free feedbacks is depicted in FIG. 6. The MLPWOF has 2 free-feedback-sending neurons 85 each connected to a free-feedback-receiving neuron 90 through a unit time delay device 95, which is indicated by a box enclosing the number 1 as before. The free-feedback-sending neurons 85 shown in FIG. 6 are summers. However, free-feedback-sending neurons may also be neurons (or neurons) of another type or types. There is one input neuron 100 in the MLPWOF, which receives input data from outside the network, and one output neuron 105, which sends output data to outside the network.

The MLPWOF in FIG. 6 has 4 neurons 110 in the first layer of neurons and 3 neurons 115 in the second layer. The internal function of a neuron in layers 1 and 2 is shown in FIG. 2 and explained previously. In short, the weighted sum 108 in the neuron is $w_0 + \Sigma_{i=1}^n w_i I_i$ and the activation level 110 of the neuron is $a(w_0 + \Sigma_{i=1}^n w_i I_i)$, where the activation function a(x) is a sigmoid function such as the hyperbolic tangent function tanh x and the logistic function $1/(1+e^{-x})$.

The 3 neurons 90, 100 and 3 neurons 85, 105 are regarded as neurons in layer 0 and layer 3 respectively. The neurons in layers 1 and 2 are regarded as neurons in their respective layers. Since the neurons in layers 1 and 2 do not interact directly with outside the MLPWOF, they are called hidden neurons or neurons, and their layers are called hidden layers. The 3 neurons in layer 0 simply distribute the feedbacks to the neurons in layer 1. Each of the 3 neurons in layer 3 evaluates the weighted sum of the activation levels of the neurons in layer 2. All neurons in each layer are numbered from left to right. An input neuron here can be viewed as a neuron, that has only a single input and whose activation function is the identity function, a(x)=x. An output neuron here can be viewed as a neuron whose activation function is also the identity function. Therefore, the words, "neuron" and "neuron", are interchangeable.

The neurons in each layer are numbered from left to right here. The "numbering of a neuron" refers to this numbering in the neuron's layer. The symbol $w_{ij}^l$ denotes the weight on the delayless connection from neuron j in layer l−1 to neuron i in layer l. Only a few of the $w_{ij}^l$ are shown in FIG. 6 to avoid cluttering the figure. The bias for neuron i in layer l is denoted by $w_{i0}^l$, which is viewed as "the weight on the delayless connection leading into i in layer l from neuron 0 in layer l−1, whose activation level is set always equal to 1."

Let us now see how the MLPWOF depicted in FIG. 6 processes information at time t. Denoting input i at time t by $\beta_i^0(t)$, the activation level $\beta_i^l(t)$ of neuron i in layer l and the weighted sum $\eta_i^l(t)$ in the same neuron at time t satisfy, for l=1, 2, $$\beta_i^l(t) = a(\eta_i^l(t)), \tag{7}$$

$$\eta_i^l(t) = w_{i0}^l + \sum_{j=1}^{n_{l-1}} w_{ij}^l \beta_j^{l-1}(t), \tag{8}$$

where $n_{l-1}$ denotes the number of neurons in layer l−1 and a(x) is the activation function. The output $\eta_i^3(t)$ at output terminal i is then determined by $$\eta_i^3(t) = w_{i0}^3 + \sum_{j=1}^{3} w_{ij}^3 \beta_j^2(t). \tag{9}$$

The feedbacks, $\eta_2^3(t)$ and $\eta_3^3(t)$, are fedback to the feedback-receiving terminals 90 after a unit time delay. Therefore the feedbacks at these terminal, $\beta_2^0(t)$ and $\beta_3^0(t)$, are equal to $\eta_2^3(t-1)$ and $\eta_3^3(t-1)$ respectively. The activation levels, $\eta_2^3(0)$ and $\eta_3^3(0)$, of the feedback-sending neurons 85 at time t=0 form the initial dynamic state of the MLPWOF.

Depending on the application, there can be, in an MLPWOF, any number of input neurons, output neurons, free feedbacks, output feedbacks, and layers, and any number of neurons in each hidden layer. Although only the hyperbolic tangent function tanh x and the logistic function $1/(1+e^{-x})$ have been used as the activation function in the MLPWOFs in the literature, other functions such as any wavelet, spline, polynomial, rational, trigonometric and exponential function can also be used as the activation function, in accordance with the present invention, to make the neural systems. It is noted that all the MLPWOFs with one and the same activation function for hidden neurons form one MLPWOF paradigm. It will be appreciated that there may be more than one type of activation function in an MLPWOF paradigm and the activation function of an input neuron does not have to be an identity function.

Figure 7:
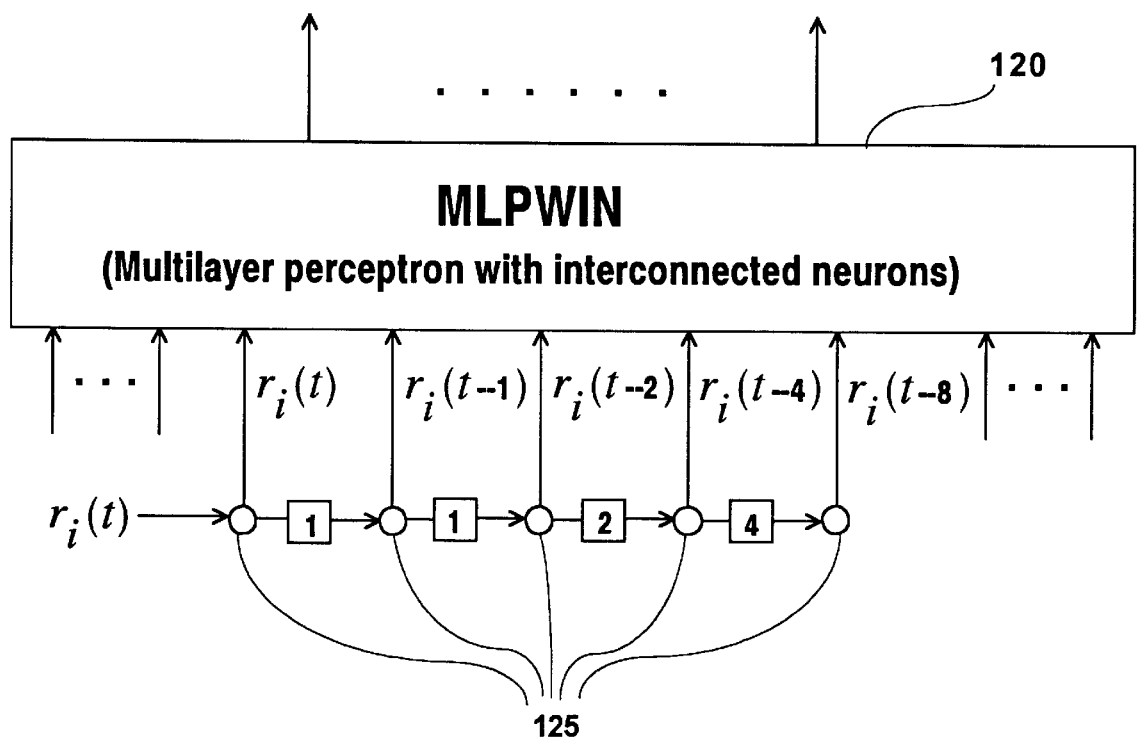
FIG. 7 shows an example MLPWINTP (MLP with interconnected neurons and tapped delay lines) with an MLPWIN 120 and one example tapped delay line consisting of five neurons 125 and four delay connections. Each of these five neurons has an identity activation function and simply passes (or distributes) its single input to its outputs. Receiving a component $r_i(t)$ of the input process of the MLPWINTD, the example tapped delay line shown in FIG. 7 holds $r_i(t)$, $r_i(t-1)$, $r_i(t-2)$, $r_i(t-4)$, and $r_i(t-8)$ as input components for the MLPWIN 120 at time t.

4. Multilayer perceptrons with interconnected neurons and tapped delay lines (MLPWINTPs): An MLPWINTP is a neural network formed with an MLPWIN and tapped delay lines. FIG. 7 shows an MLPWIN 120 with one example tapped delay line consisting of five neurons 125 and four delay connections in an example MLPWINTP. Each of these five neurons has an identity activation function and simply passes (or distributes) its single input to its outputs. Receiving a component $r_i(t)$ of the input process of the MLPWINTD, the example tapped delay line shown in FIG. 7 holds $r_i(t)$, $r_i(t-1)$, $r_i(t-2)$, $r_i(t-4)$, and $r_i(t-8)$ as input components for the MLPWIN 120 at time t.

Figure 8:
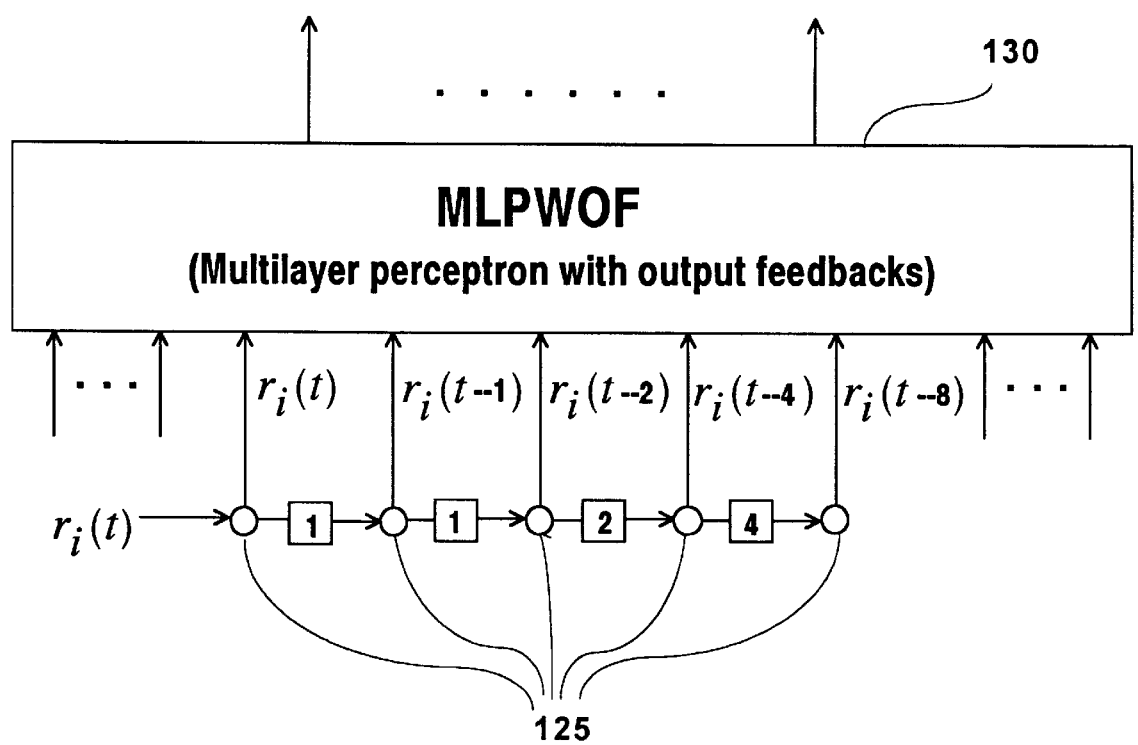
FIG. 8 shows an example MLPWOFTP (MLP with output feedbacks and tapped delay lines) with an MLPWOF 130 and one example tapped delay line consisting of five neurons 125 and four delay connections. Each of these five neurons has an identity activation function and simply passes (or distributes) its single input to its outputs. Receiving a component $r_i(t)$ of the input process of the MLPWOFTD, the example tapped delay line shown in FIG. 8 holds $r_i(t)$, $r_i(t-1)$, $r_i(t-2)$, $r_i(t-4)$, and $r_i(t-8)$ as input components for the MLPWOF 130 at time t. An MLPWOFTD may also have tapped delay lines for holding delayed components of the MLPWOF's output process as input components for the same MLPWOF in the MLPWOFTD.

5. Multilayer perceptrons with output feedbacks and tapped delay lines (MLPWOFTPs): An MLPWOFTP is a neural network formed with an MLPWOF and tapped delay lines. FIG. 8 shows an MLPWOF 130 with one example tapped delay line consisting of five neurons 125 and four delay connections in an example MLPWOFTP. Each of these five neurons has an identity activation function and simply passes (or distributes) its single input to its outputs. Receiving a component $r_i(t)$ of the input process of the MLPWOFTD, the example tapped delay line shown in FIG. 8 holds $r_i(t)$, $r_i(t-1)$, $r_i(t-2)$, $r_i(t-4)$, and $r_i(t-8)$ as input components for the MLPWOF 130 at time t. An MLPWOFTD may also have tapped delay lines for holding delayed components of the MLPWOF's output process as input components for the same MLPWOF in the MLPWOFTD.

6. Radial basis function networks (RBFNs): Radial basis function networks (RBFNs) were first proposed to approximate probability density functions in the 1960s. Only Gaussian activation functions were used then, but numerous other activation functions have been used in a large number of research papers ever since. Nevertheless, all the RBFNs in the literature are neural networks without delay connections and with a single layer of hidden neurons (or processing units).

A typical neuron of an RBFN is depicted in FIG. 1. It is a composition of a basis function 5 and an activation function 15, which are denoted by b and a respectively. If the inputs to the neuron are $I_1, I_2, \ldots, I_n$ as shown in FIG. 1, the basis function 5 with parameters $w_1, w_2, \ldots, w_n$, is usually the Euclidean distance between the vectors $(I_1, I_2, \ldots, I_n)$ and $(w_1, w_2, \ldots, w_n)$, i.e.

$$b(I_1, I_2, \ldots, I_n, w_1, w_2, \ldots, w_n) = \sqrt{\sum_{i=1}^{n}(I_i - w_i)^2},$$

whose value appears at 10. The activation function 15 can be any one of many functions such as the Gaussian function, $$a(x, w_0) = \exp(-x^2/w_0^2),$$

the thin-plate-spline function, $$a(x, w_0) = x^2 \log x,$$

the multiquadric function, $$a(x, w_0) = (x^2 + w_0^2)^{1/2},$$

and the inverse multiquadric function, $$a(x, w_0) = (x^2 + w_0^2)^{-1/2},$$

where $w_0$ is another parameter of the neuron. The activation level of the neuron is its output at 20.

If we replace the MLP neurons with the RBFN neurons in the hidden layers of an MLP (e.g. FIG. 4), we obtain an RBFN. Thus the NNs in FIG. 4 can be viewed as an example RBFN. Here we note that $w_{ij}^l$ denotes a parameter of the i-th neuron in the l-th layer and that the weights on the connections are set equal to one.

Let us now see how the RBFN depicted in FIG. 4 processes information at time t. Denoting component i of the exogenous input at time t by $\beta_i^0(t)$, the activation level $\beta_i^l(t)$ of neuron i in layer l and the basis function output $\eta_i^l(t)$ in the same neuron at time t satisfy, for l=1,2, $$\beta_i^l(t) = a(\eta_i^l(t), w_{i0}^l) = \exp\left[-(\eta_i^l(t))^2 / (w_{i0}^l)^2\right], \quad (10)$$

$$\eta_i^l(t) = \left[\sum_{j=1}^{n_{l-1}} (\beta_j^{l-1}(t) - w_{ij}^l)^2\right]^{1/2}, \quad (11)$$

where $n_{l-1}$ denotes the number of neurons in layer l-1. The output $\eta_i^3(t)$ at output neuron i is then determined by $$\eta_i^L(t) = w_{i0}^L + \sum_{j=1}^{n_{L-1}} w_{ij}^L \beta_j^{L-1}(t), \quad (12)$$

where L=3, $n_{L-1}$=3, and i=1,2,3.

Depending on the application, there can be, in an RBFN, any number L of layers, any number no of input neurons, any number $n_L$ of output neurons, and any number $n_l$ of neurons in each hidden layer l. It is noted that all the RBFNs with one and the same activation function for hidden neurons form one RBFN paradigm. It will be appreciated that there may be more than one type of activation function in an RBFN paradigm and the activation function of an input neuron does not have to be an identity function. By setting some delayless weights $w_{ij}$ equal to zero, differently configured RBFNs, which are not fully connected, can be obtained. Notice that the equations, (10), (11) and (12), for l1, . . . , L-1, possibly with some minor modifications are valid for the processing of most RBFNs.

Since there are no delay connections in an RBFN, it does not have a recursive section and is thus a nonrecursive NN. If all the output neurons are summers, equation (12) is valid for every output component of an RBFN. Hence all the weights, $w_{ij}^L$, in layer L, appear linearly in the RBFN's outputs and are thus linear weights of the RBFN. Since every other weight appears in the RBFN's outputs through nonlinear activation functions, the weights, $w_{ij}^L$, constitute the linear section of the RBFN.

7. Radial basis function networks with interconnected neurons (RBFNWINs): If we replace the MLPWIN neurons with the RBFN neurons in the hidden layers of an MLPWIN (e.g. FIG. 5) we obtain an RBFNWIN. Let us now see how the example RBFNWIN shown in FIG. 5 processes information at time t. Here we assume that the basis function is the Euclidean distance and the activation function is the Gaussian function. Denoting component i of the input to the RBFNWIN at time t by $\beta_i^0(t)$, the activation level $\beta_i^l(t)$ of neuron i in layer l and the basis function output $\eta_i^l(t)$ in the same neuron at time t satisfy, for l=1,2, $$\beta_i^l(t) = a(\eta_i^l(t), w_{i0}^l) = \exp\left[-(\eta_i^l(t))^2 / (w_{i0}^l)^2\right] \quad (13)$$

$$\eta_i^l(t) = \left[\sum_{j=1}^{n_{l-1}} (\beta_j^{l-1}(t) - w_{ij}^l)^2 + \sum_{j=1}^{n_l} (\beta_j^l(t-1) - w_{ij}^{rl})^2\right]^{1/2}, \quad (14)$$

where $n_l$ denotes the number of neurons in layer l, and $\beta_i^l(t-1)$, for i=1, ..., $n_l$ and l=1,2, form the dynamic state of the example RBFNWIF at time t. The output $\eta_1^3(t)$ of the example RBFNWIN in FIG. 5 is then determined by $$\eta_i^L(t) = w_{i0}^L + \sum_{j=1}^{L} w_{ij}^L \beta_j^{L-1}(t). \quad (15)$$

Depending on the application, there can be, in an RBFNWIN, any number L of layers, and any number $n_l$ of neurons in each layer l, for l=0, ..., L. It is noted that all the RBFNWINs with one and the same activation function for hidden neurons form one RBFNWIN paradigm. It will be appreciated that there may be more than one type of activation function in an RBFNWIN paradigm and the activation function of an input neuron does not have to be an identity function. By setting some delayless weights $w_{ij}^l$ and/or delay weights $w_{ij}^{rl}$ equal to zero, differently configured RBFNWINs can be obtained. Notice that the equations, (13), (14) and (15), for l=1, ..., L-1, with possibly some minor modifications are valid for the processing of most RBFNWINs.

In an RBFNWIN, a neuron with a self-feedback delay connection and/or in a cycle within a layer is a cyclic neuron. All such cyclic neurons and those neurons and/or connctions that have a path leading to one of these cyclic neurons constitute the recursive section of the RBFNWIN. The rest of the neurons and connections of the RBFNWIN form the nonrecursive section. If all the output neurons are summers, equation (6) is valid for every output component of the RBFNWIN. Hence all the weights, $w_{ij}^L$, in layer L, appear linearly in the RBFNWIN's outputs and are thus linear weights of the RBFNWIN. Since every other weight appears in the RBFNWIN's outputs through nonlinear activation functions, the weights, $w_{ij}^L$, constitute the linear section of the RBFNWIN.

Range Reducers Used in Neural Systems

A range reducer in a neural system is a dynamic transformer. It dynamically transforms at least one component of the exogenous input process of the neural system and sends the resulting process to at least one input neuron of the NN in the neural system. If the NN is a recursive NN (RNN), a possible benefit of using a range reducer is a reduction of the valid input range and/or approximation capability required of the RNN so as to ease the RNN size and training data requirements and thereby lessen the training difficulty. Another possible benefit is an enhancement of the generalization capability of the neural system beyond the length of time for which the training data are available. Therefore, an NN that a neural system comprises is assumed to be an RNN (recursive NN) in the following descriptions of range reducers.

Figure 9:
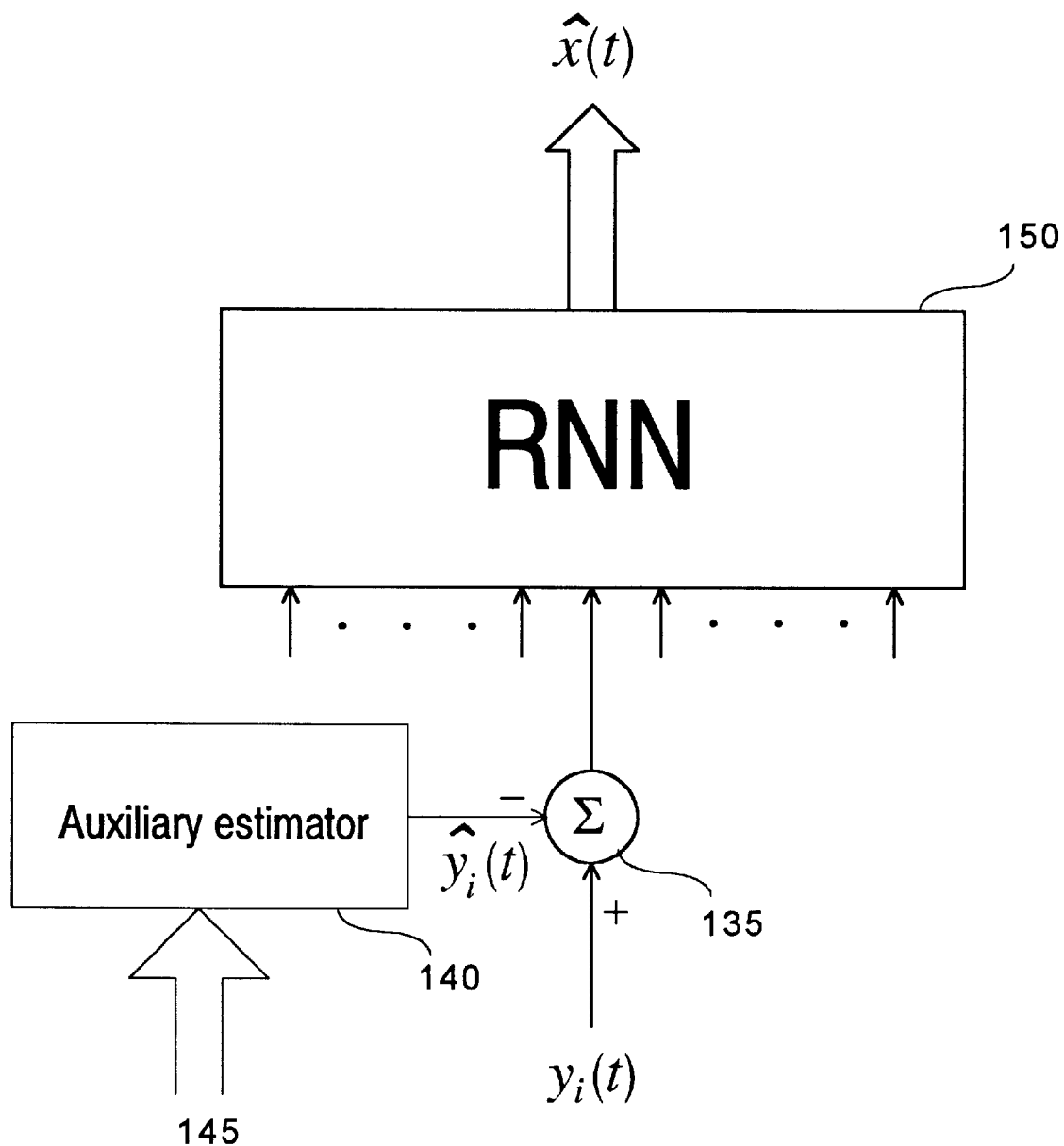
FIG. 9 shows one range reducer by estimate subtraction and how it is connected to a recurrent neural network 150 in a neural system. The range reducer comprises an auxiliary estimator 140 and an subtractor 135. The auxiliary estimator receives inputs 145, and sends an output $\hat{y}_i(t)$ to the subtractor 135, where it is subtracted from the component $y_i(t)$ of the exogenous input process y(t). The difference is then input to the recurrent neural network 150.

A basic scheme for dynamically transforming the ith component $y_i(t)$ of an exogenous input process $y(t)$ to a neural system is to subtract some estimate $\hat{y}_i(t)$ of $y_i(t)$ from $y_i(t)$ at every time point t. A scheme that generates the estimate $\hat{y}_i(t)$ is called an auxiliary estimator of $y_i(t)$. The resulting difference, $y_i(t)-\hat{y}_i(t)$, is used at time t as the ith component of the input vector to the RNN in the neural system. A device that comprises an auxilliary estimator to generate an estimate $\hat{y}_i(t)$, and a subtractor to perform the subtraction, $y_i(t)-\hat{y}_i(t)$, is called a range reducer by estimate subtraction, which is a dynamic transformer of $y_i(t)$. FIG. 9 shows how a range reducer by estimate subtraction comprising an auxiliary estimator 140 and a subtractor 135 is connected to an RNN 150. The input 145 to the auxiliary estimator at a time can be any information available at the same time during the auxiliary estimator's operation.

It has been found that if all the range reducers in a neural system comprising an RNN are range reducers by estimate subtraction and all the auxiliary estimates $\hat{y}_i(t)$ involved at the time point t are functions of the exogenous input process $y(t)$ up to and including the time point t-1, for t=1,2, ..., T, then the exogenous input process to the neural system, and the input process to the RNN in the neural system are causally equivalent with respect to the RNN, provided that the RNN is a recursive neural network with a sufficient number of delay connections and the range reducers are properly initialized for an operation. Here causal equivalence of two processes with respect to the RNN means that the values of any one of them at a time can be constructed, with the aid of the RNN, from all the values of the other up to and including the same time. The causal equivalence between the exogenous input process to the neural system and the input process to the RNN guarantees that the range reducers used in the neural system do not "destroy" any useful information contained in the exogenous input process. Two types of range reducer by estimate subtraction are given as examples in the following:

1. Range Reducers by Differencing

If an exogenous input process y is the sampled values, at discrete time points, of a continuous continuous-time process, then the vector value y(t-1) is a "reasonably good" estimate of the vector value y(t). This observation motivated a simple, yet effective way to reduce the range of the exogenous inputs, when two consecutive exogenous inputs, y(t-1) and y(t), are not too far apart.

Figure 10:
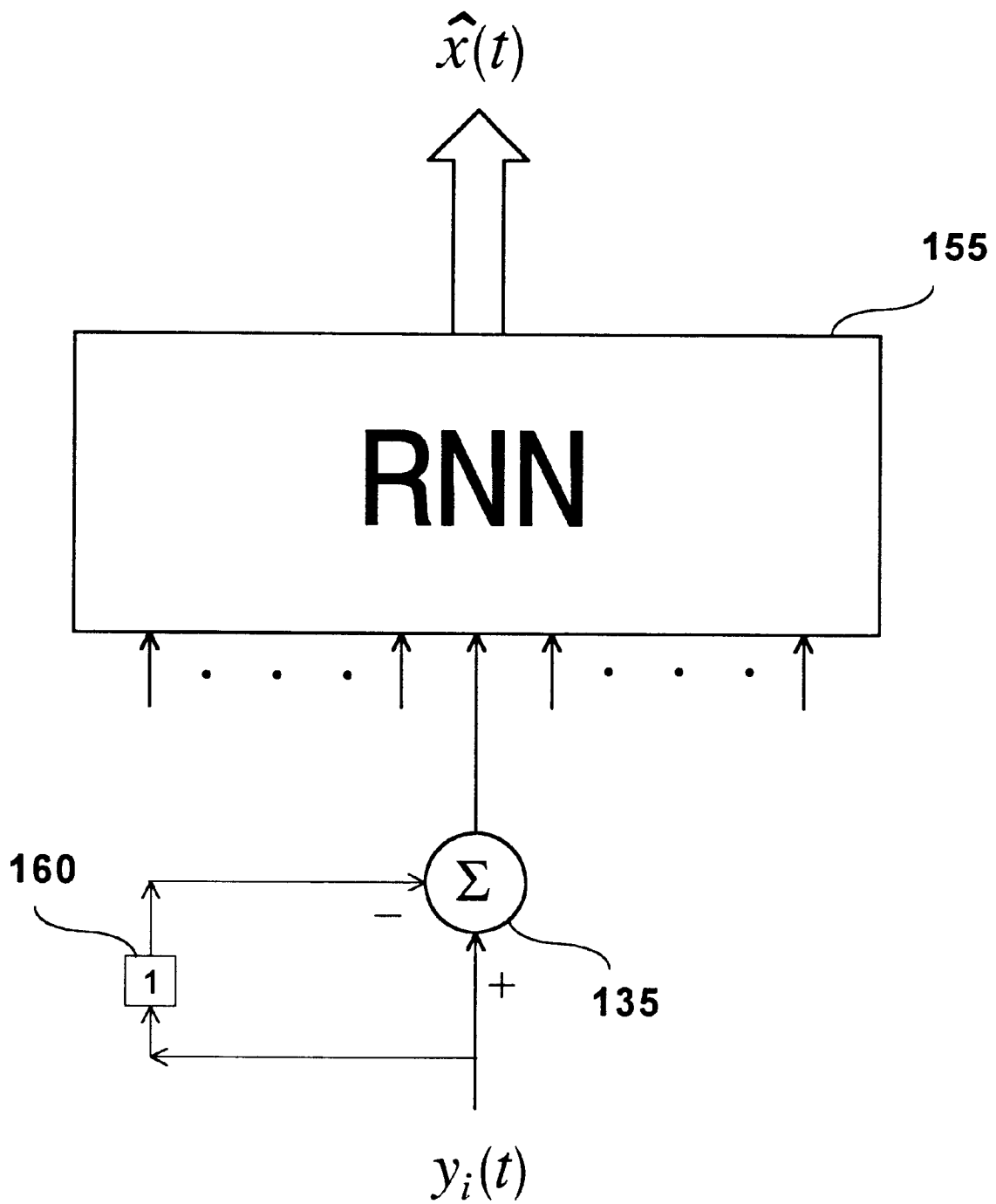
FIG. 10 shows one range reducer by differencing and how it is connected to a recurrent neural network in a neural system. A range reducer by differencing is a range reducer by estimate subtractor, wherein the auxiliary estimator is a unit time delay device 0160.

Consider the neural system depicted in FIG. 10. A differencer, that consists of a unit time delay 160 and a subtractor 135, is concatenated at an input terminal of an RNN 155. At each time point t, the differencer subtracts the preceding exogenous input $y_i(t-1)$ from the current exogenous input $y_i(t)$ and feeds the difference $y_i(t)-y_i(t-1)$ to the ith input terminal of the RNN. This differencer is a range reducer by estimate subtraction, in which the unit time delay 160 is used as an auxiliary estimator.

There are three ways to initialize the differencer for an operation. One way is to start the neural system at t=2, the ith component of the first input vector to the RNN being $y_i(2)-y_i(1)$ and the first output vector of the RNN being x(2).

The second way is to determine an initialization value for $y_i(0)$ jointly with the weights w and initial dynamic state v of the RNN in training. In the operation of the neural system, the ith component of the first input vector to the RNN is $y_i(1) - y_i(0)$. The third way is to use the best available estimate $\bar{y}_i(0)$ of $y_i(0)$ and then use $y_i(1) - \bar{y}_i(0)$ as the ith component of the first input vector to the RNN consistently in the training and operation of the neural system.

2. Range Reducers by Linear Prediction

Figure 11:
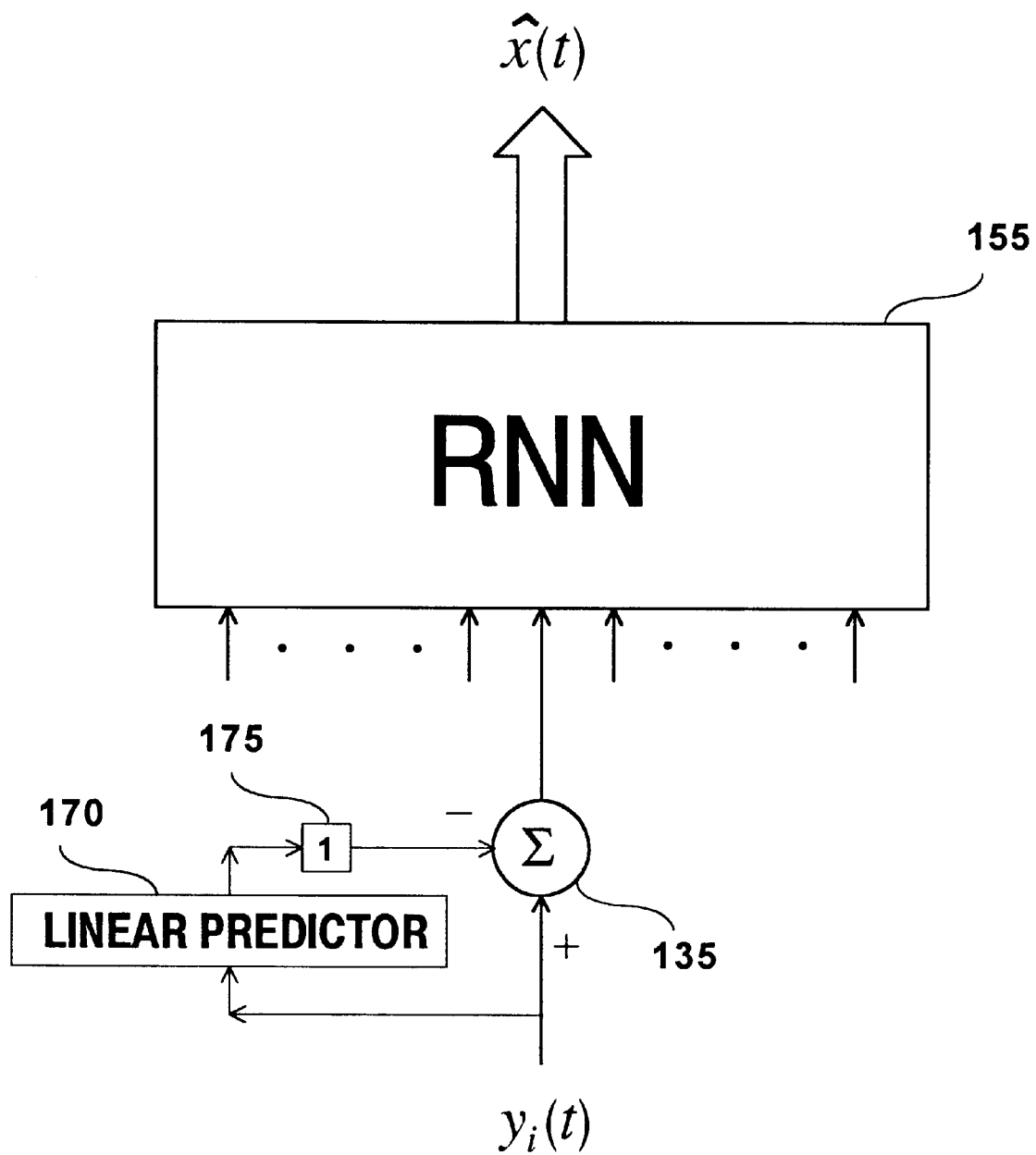
FIG. 11 shows one range reducer by linear prediction and how it is connected to a recurrent neural network in a neural system. A range reducer by linear prediction is a range reducer by estimate subtractor, wherein the auxiliary estimator is a linear predictor 170 and a unit time delay device 175.

Consider the neural system depicted in FIG. 11 where one range reducer is shown. The range reducer, which comprises a linear predictor 170, a unit time delay device 175 and a subtractor 135, is concatenated to the ith input terminal of an RNN 155. The linear predictor inputs the ith component of the exogenous input process y(t) to the neural system, and outputs a prediction $\hat{y}_i(t+1)$ of $y_i(t+1)$. After a unit time delay, the preceding prediction $\hat{y}_i(t)$ is now subtracted from $y_i(t)$ by the subtractor 135. The resulting difference, $y_i(t) - \bar{y}_i(t)$, is then input to the RNN at its ith input neuron.

A range reducer by differencing is obviously a special range reducer by linear prediction, in which the estimate $\hat{y}_i(t+1)$ generated by the linear predictor is simply $y_i(t)$. A general linear predictor is written as $\hat{y}_i(t) = \sum_{j=1}^{J} c_j y_i(t-j)$, where J is a fixed positive integer called the order of the linear predictor, and $c_j$ are the linear predictor coefficients (S. Haykin, *Adaptive Filter Theory*, 2nd edition, Prentice-Hall (1991)). Realizations of the ith component $y_i(t)$ of the exogenous input process, which are part of the training data, are used to determine $c_j$, j=1,2, . . . , J so that the linear predictor, $\hat{y}_i(t) = \sum_{j=1}^{J} c_j y_i(t-j)$, predicts $y_i(t)$ in the standard least-squares sense. A fast and stable algorithm for this can be found in D. T. M. Slock and T. Kailath, "Numerically Stable Fast Transversal Filters for Recursive Least Squares Adaptive Filtering," *IEEE Transactions Signal Processing*, Vol. 39, No. 1, pp. 92–114 (1991). Some other algorithms can be found in S. Haykin, *Adaptive Filter Theory*, 2nd edition, Prentice-Hall (1991).

There are three ways to initialize the linear predictor. One way is to start the neural system at t=J+1, the ith component of the first input vector to the RNN being $y_i(J+1) - \hat{y}_i(J+1)$ and the first output vector of the RNN being $\hat{x}(J+1)$. The second way is to determine J initialization values, $y_i(-J+1)$, $y_i(-J+2)$, . . . , $y_i(0)$ jointly with the weights w and initial dynamic state v of the RNN in training. The third way is to use the best available estimate $\bar{y}_i(-J+1), \bar{y}_i(-J+2), \ldots, \bar{y}_i(0)$ of $y_i(-J+1), y_i(-J+2), \ldots, y_i(0)$ and then use $y_i(1) - \sum_{j=1}^{J} c_j \bar{y}_i(1-j)$ as the ith component of the first input vector to the RNN consistently in the training and operation of the neural system.

It will be appreciated that the above arguments can be easily generalized to the vector case in which a linear predictor generates a vector-valued estimate of a certain number of components of y(t), of which estimate a selected number of components are then subtracted from their corresponding components of y(t) to yield their corresponding components of the input vector to the RNN.

Range Extenders Used in Neural Systems

A range extender in a neural system is a dynamic transformer. It can be used to dynamically transform the outputs from at least one output neuron of an NN in the neural system into at least one component of the outward output process of the neural system. A range extender can also be used to dynamically transform the outputs of at least one neuron of an NN in the neural system into at least one input process to another neuron of the same NN.

If the NN is an recursive NN (RNN), a possible benefit of using a range extender is the reduction of the valid output range and/or approximation capability required of the RNN so as to ease the RNN size and training data requirements and thereby lessen the training difficulty. Another possible benefit is an enhancement of the generalization capability of the neural system beyond the length of time for which the training data are available. Therefore, an NN that a neural system comprises is assumed to be an RNN (recursive NN) in the following descriptions of range extenders.

Only the range extenders, that produce components of the outward output process of a neural system, are considered in this and the next subsection. Other range extenders are discussed later on.

A basic scheme for dynamically transforming the outputs of an output neuron, say neuron i in layer L, of an RNN into ith component of the outward output process is to add some estimate $\hat{x}_i(t)$ of a desired outward output $x_i(t)$ for the same output neuron to the neuron's actual output $\beta_i^L(t)$ at every time point t. The resulting sum, $\beta_i^L(t) + \hat{x}_i(t)$, is used as the ith component $\hat{x}_i(t)$ of the outward output vector $\hat{x}(t)$ of the neural system at time t. Thus, the "actual desired output" for the output neuron is $x_i(t) - \hat{x}_i(t)$ at time t. The estimate $\hat{x}_i(t)$ is called an auxiliary estimate of $x_i(t)$ and a scheme that generates this estimate $\hat{x}_i(t)$ is called an auxiliary estimator. A device that comprises such an auxiliary estimator and an adder is called a range extender by estimate addition, which is a dynamic transformer of the output process $\beta_i^L(t)$.

Note that realizations of an optimal outward output process may or may not be available for training the neural system. For instance, if a neural system is intended to be a system identifier, communication channel equalizer, time series predictor, or optimal filter, realizations of the desired outward output process of the neural system may be obtained by experiments and/or simulations. However, if a neural system is intended to be a controller of a plant for optimal control or model reference control, realizations of the desired outward output process of the neural system are usually not available.

Figure 12:
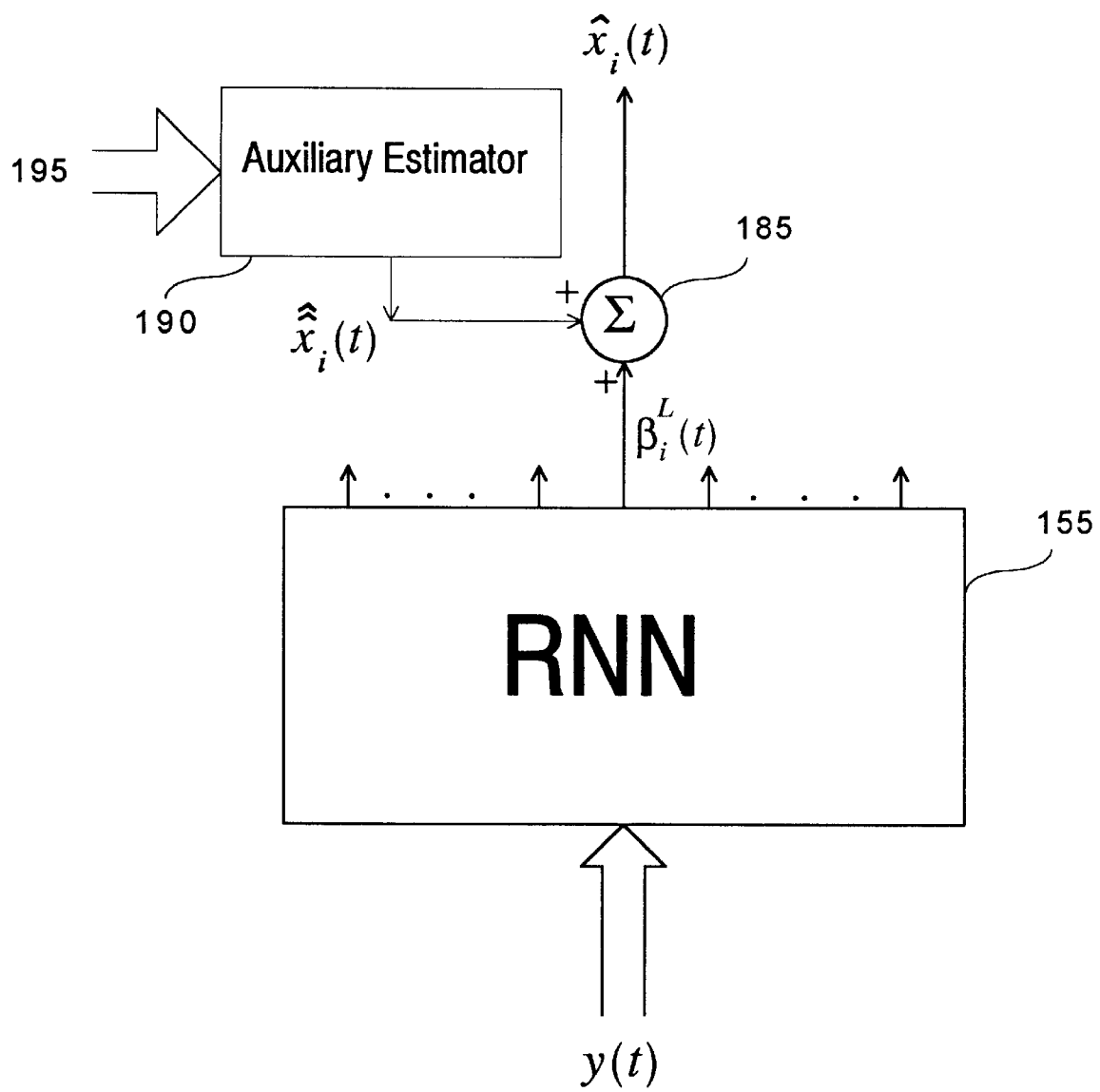
FIG. 12 shows one range extender by estimate addition and how it is connected to a recurrent neural network 155 in a neural system. The range extender comprises an auxiliary estimator 190 and an adder 185. The auxiliary estimator receives inputs 195, and sends an output $\hat{x}_i(t)$ to the adder 185, where it is added to the component $\beta_i^L(t)$ of the outward output process. The sum is the component $\hat{x}_i(t)$ of the outward output process $\hat{x}(t)$ of the neural system.

FIG. 12 shows one way a range extender by estimate addition comprising an auxiliary estimator 190 and an adder 185 is connected to an RNN 155. The input 195 to the auxiliary estimator at a time can be any information available at the same time during the auxiliary estimator's operation.

It has been found that a range extender by estimate addition works very effectively, if the auxiliary estimate $\hat{x}_i(t)$ involved is a function of the exogenous inputs, $y(\tau)$, $\tau=1,2,\ldots,t$, for $t=1,2,\ldots,T$. Three types of range extender by estimate addition, whose auxiliary estimators have different levels of estimation accuracy and different levels of computational cost, are given as examples in the following:

1. Range Extenders by Accumulation

If it is known that the ith component $x_i(t)$ of an optimal outward output process x(t) does not vary very rapidly in time, then the value $x_i(t-1)$ is a good approximate of $x_i(t)$, and a good estimate of x(t-1) is a "reasonably good" estimate of the vector value x(t). This observation motivated a simple, yet effective way to dynamically transform the outputs of an output neuron of an RNN in a neural system, when two consecutive signals, x(t-1) and x(t), are not too far apart.

Figure 13:
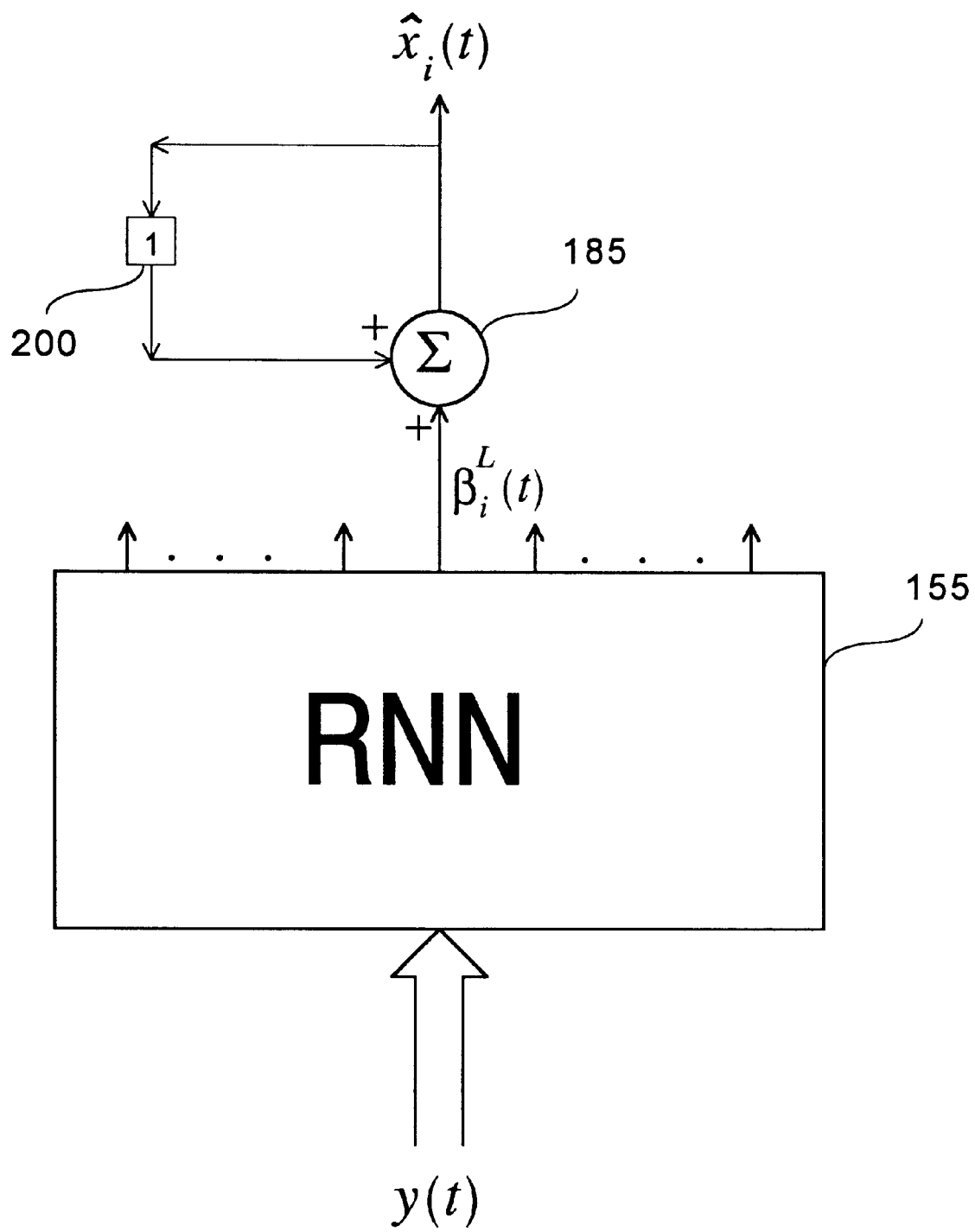
FIG. 13 shows one range extender by accumulation and how it is connected to a recurrent neural network in a neural system. A range extender by accumulation is a range extender by estimate addition, wherein the auxiliary estimator is a unit time delay device 200.

Consider the neural system depicted in FIG. 13. Only one accumulator used as a range extender is shown. The accumulator, comprising a unit time delay device 200 and an adder 185, is concatenated directly to output neuron i of the RNN 155. At each time point t, the accumulator adds the output $\beta_i^L(t)$ of the RNN to the accumulator's output $\hat{x}_i(t-1)$ at the preceding time point t−1. Thus the accumulator accumulates all the outputs of output neuron i of the RNN from t=1 onward plus the initial accumulation denoted by $\hat{x}_i(0)$. Mathematically, the accumulator is described simply by $$\hat{x}_i(t)=\beta_i^L(t)+\hat{x}_i(t-1), \ t=1,2,\ldots,T. \qquad (16)$$

Here, the RNN actually estimates the difference $x_i(t)-\hat{x}_i(t-1)$. If a good a priori estimate $\bar{x}_i(0)$ is given of $x_i(0)$, it should be used as the initial accumulation $\hat{x}_i(0)$. Otherwise, the initial accumulation $\hat{x}_i(0)$ can be determined together with the weights and/or parameters w and the initial dynamic state v of the RNN in training the neural system. Training algorithms are provided in the sequel for training an MLP-WIN and an MLPWOF as the RNN together with selected accumulators in the neural system.

An accumulator used as a range extender will be called a range extender by accumulation, which may be used whether realizations of the desired outward output process of the neural system are available for training it or not.

2. Range Extenders by Linear Prediction

Figure 14:
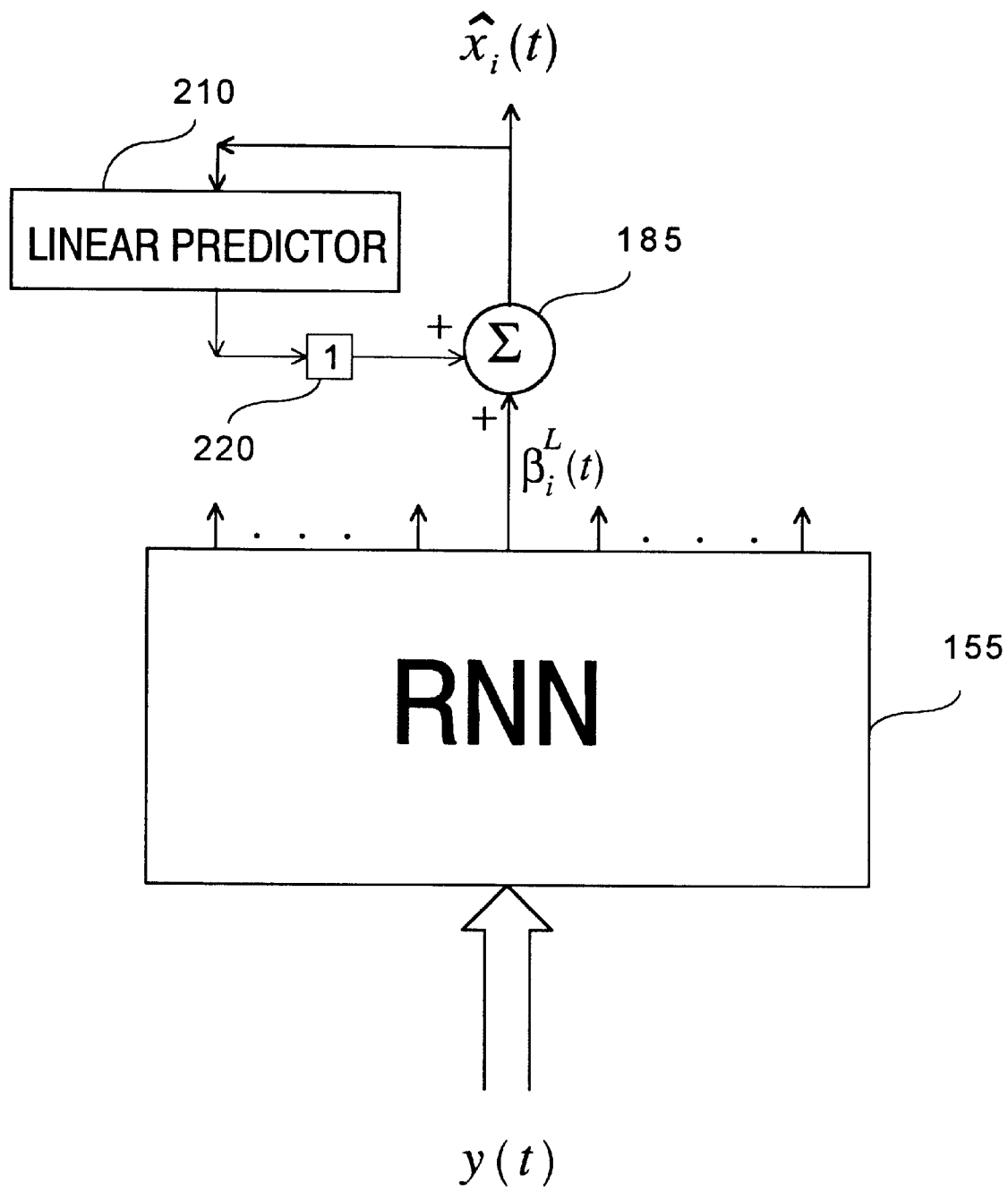
FIG. 14 shows one range extender by linear prediction and how it is connected to a recurrent neural network in a neural system. A range extender by linear predictor is a range extender by estimate addition, wherein the auxiliary estimator is a linear predictor 210 and a unit time delay device 220.

Consider the neural system depicted in FIG. 14 where only one range extender is shown. The one shown is a range extender by estimate addition, that consists of a linear predictor 210, a unit time delay device 220 and an adder 185, and is concatenated to output neuron i of an RNN 155. The estimate $\hat{\hat{x}}_i(t)$ of the value $\hat{x}_i(t)$ of the outward output process at time t, to be added to $\beta_i^L(t)$ to yield $\hat{x}_i(t)$, i.e. $\hat{x}_i(t)=\beta_i^L(t)+\hat{\hat{x}}_i(t)$, is generated by the linear predictor 210 and the unit time delay device 220, which constitute the auxiliary estimator in the range extender by estimate addition. Here the outward output process $\hat{x}$ is that of the trained neural system with all the adjustable weights of the neural system properly determined. Thus $\hat{\hat{x}}_i(t)$ obtained by the linear predictor 210 and the unit time delay device 220 is also a good estimate of $x_i(t)$, the desired output at time t. A range extender by accumulation can be viewed as a special case in which $\hat{x}_i(t-1)$ is used as the predicted and delayed value of $\hat{x}_i(t)$.

A better estimate of $\hat{x}_i(t)$ than $\hat{x}_i(t-1)$, which is used in a range extender by accumulation, can be obtained by the linear predictor $\hat{\hat{x}}_i(t)=\Sigma_{j=1}^J c_j \hat{x}_i(t-j)$, where J is a fixed positive integer called the order of the linear predictor, $c_j$ are the linear predictor coefficients (S. Haykin, *Adaptive Filter Theory*, 2nd edition, Prentice-Hall (1991)).

Notice that to determine the linear predictor coefficients in a standard way, realizations of the outward output process $\hat{x}_i(t)$ of the trained neural system are required. However, before the weights and coefficients of both the RNN and the linear predictor are fully determined, such realizations are not available.

If the realizations of the desired outward output process are available for training the neural system and thus also available for the determination of the mentioned linear predictor coefficients, we determine the linear predictor coefficients in the linear predictor $\Sigma_{j=1}^J c_j x_i(t-j)$ for predicting $x_i(t)$ instead.

More specifically, we use realizations of the ith component $x_i(t)$ of the desired outward output process x to determine $c_j$, j=1, 2, ..., J, so that the linear finite impulse response filter $\Sigma_{j=1}^J c_j x_i(t-j)$ predicts $x_i(t)$ in the standard sense. A fast and stable algorithm for this can be found in D. T. M. Slock and T. Kailath, "Numerically Stable Fast Transversal Filters for Recursive Least Squares Adaptive Filtering," *IEEE Transactions on Signal Processing*, Vol. 39, No. 1, pp. 92–114 (1991). Some other algorithms can be found in S. Haykin, *Adaptive Filter Theory*, 2nd edition, Prentice-Hall (1991).

Then we use these coefficients $c_j$, j=1,2, ..., J as the coefficients in the linear predictor $\hat{\hat{x}}_i(t)=\Sigma_{j=1}^J c_j \hat{x}_i(t-j)$ for predicting $\hat{x}_i(t)$. The resulting linear predictor is expected to generate good estimate $\hat{\hat{x}}_i(t)$ of $x_i(t)$, provided $\hat{x}_i(t)$ mimics $x_i(t)$ closely.

To initialize the linear predictor at t=1, we need the initialization values, $\hat{x}_i(-J+1)$, $\hat{x}_i(-J+2)$, ..., $\hat{x}_i(0)$, in both the training and the operation of the neural system. If the signals, $x_i(-J+1), x_i(-J+2), \ldots, x_i(0)$, are available at t=1 in the operation of the neural system in the application under consideration, we may include realizations of $x_i(-J+1)$, $x_i(-J+2)$, ..., $x_i(0)$ in the training data set in addition to those of $x_i(1), x_i(2), \ldots, x_i(T)$. In training, the realization of $x_i(-J+1)$, $x_i(-J+2)$, ..., $x_i(0)$ is used as the initialization values, $\hat{x}_i(-J+1)$, $\hat{x}_i(-J+2)$, ..., $\hat{x}_i(0)$.

If $x_i(-J+1), x_i(-J+2), \ldots, x_i(0)$ are not available at time t=1, in the operation of the neural system in the application under consideration, we use the best a priori estimates of $x_i(-J+1), x_i(-J+2), \ldots, x_i(0)$ instead. Once a method of initializing the linear predictor is chosen, it is consistently used in both the training and operation of the neural system.

If a trained neural system, including the linear predictor with length J, adder, and RNN, works satisfactorily, the process of designing a neural system is completed. Otherwise, we may increase J and repeat the above process of determining $c_j$ and then training the neural system again or we may adjust the values of $c_j$, j=1, 2, ..., J together with the adjustable weights w of the RNN by minimizing the training criterion further, using the existing values of $c_j$ and w as the initial guess in the minimization process.

If the realizations of the desired outward output process are not available for the determination of the linear predictor coefficients $c_j$, these coefficients are determined jointly with the adjustable weights of the RNN in training the neural system.

It will be appreciated that the above arguments can be easily generalized to the vector case, in which a linear predictor generates a vector-valued estimate of a certain number of components of x(t), of which estimate a selected number of components are then added to their corresponding components of $\beta^L(t)$ to yield their corresponding components of $\hat{x}(t)$.

3. Range Extenders by Feedforward Linear Estimation

Figure 15:
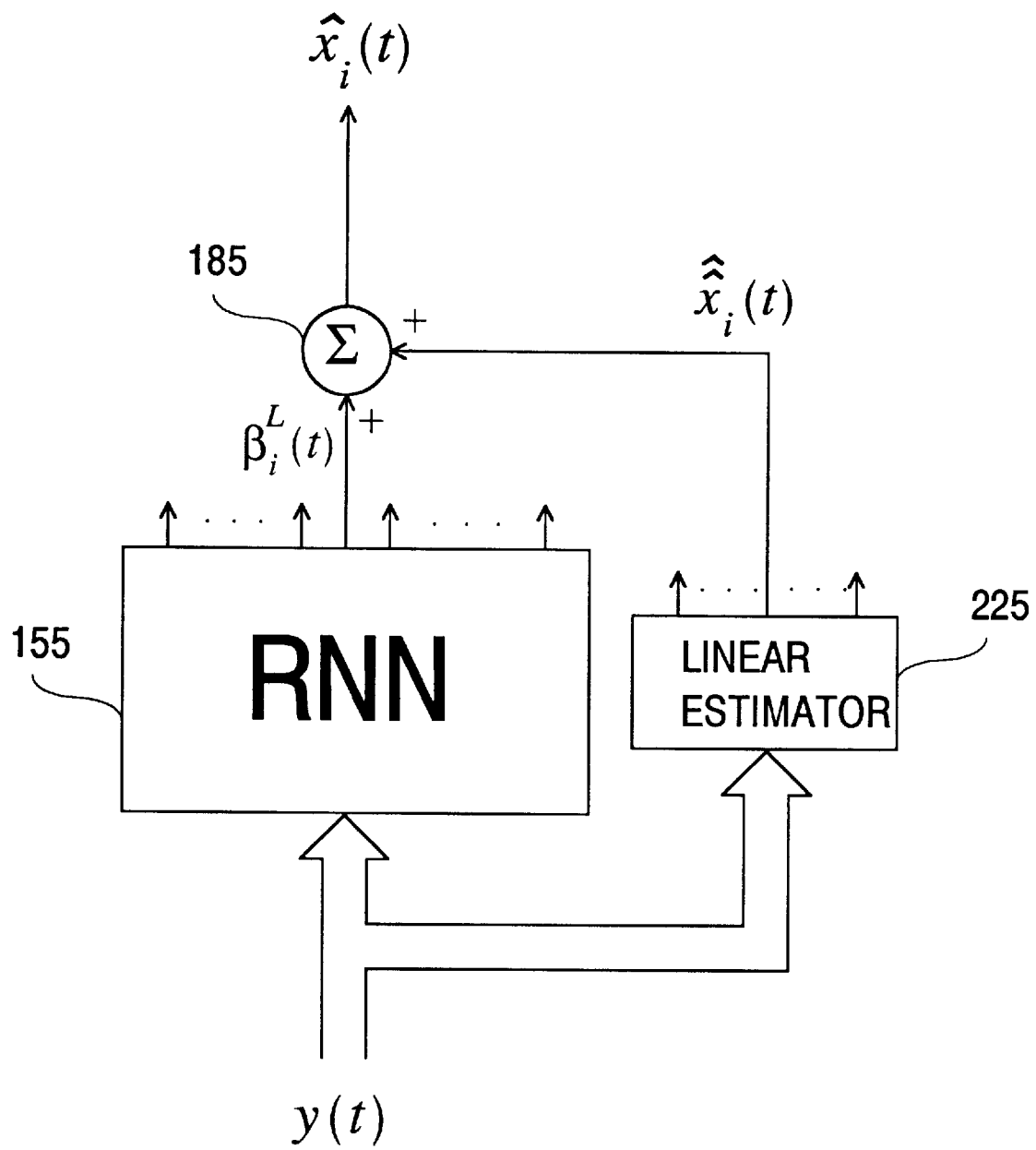
FIG. 15 shows one range extender by feedforward linear estimation and how it is connected to a recurrent neural network in a neural system. A range extender by feedforward linear prediction is a range extender by estimate addition, wherein the auxiliary estimator is a linear estimator 225, which inputs some or all components of the exogenous input process, and outputs estimats of some or all components of the desired outward output process of the neural system.

Using a linear finite-impulse-response (FIR) filter as the auxiliary estimator to process the exogenous input process to estimate the desired outward output process, a range extender by estimate addition is obtained, which will be called a range extender by feedforward linear estimation. Such a range extender comprising a linear estimator (i.e. linear FIR filter) 225 and an adder 185 is shown in FIG. 15. The input vector to its auxiliary estimator 225 at time t is the value y(t) of the exogenous input process y, and the output vector of the auxiliary estimator 225 at the same time is the auxiliary estimate of those components of the desired outward output process that are dynamically transformed by said range extender. Let the vector with these components of the desired outward output process be denoted by z(t) and the auxiliary estimate of z(t) be denoted by $\hat{z}(t)$.

The auxiliary estimator is a linear estimator described by $\hat{z}(t)=\Sigma_{j=0}^{J-1} C_j y(t-j)$ where J denotes the order of the linear estimator and $C_j$, for j=0,1, ..., J−1, are the coefficient matrices. It is assumed here also that realizations $x(t,\omega), \omega \in S$ of the desired outward output process y are available for determining the linear estimator coefficients $C_j$. Using the components $z(t,\omega)$ of the realization $x(t,\omega)$ corresponding to those of $\hat{z}(t)$ as the desired output, and $y(t,\omega)$ as the input for each $\omega$ in the sample set S, the coefficient matrices $C_j$ are determined by minimizing $\Sigma_{\omega \in S} \Sigma_{t=1}^T \|z(t,\omega) - \Sigma_{j=0}^{J-1} C_j y(t-j,\omega)\|^2$, where $\|\cdot\|$ is the Euclidean norm. Assuming that $y(\tau,\omega)$ is zero for $\tau \leq 0$ and $\omega \in S$, the recursive least squares algorithm in D. T. M. Slock and T. K. Kailath, "Numerically Stable Fast Transversal Filtering for Recursive Least Squares Adaptive Filtering," *IEEE Transactions on Signal Processing*, Vol. 39, No. 1, pp. 92–114 (1991), can be applied to calculate the coefficient matrices, $C_j$, $j=0,1,\ldots,J-1$.

The estimate $\hat{x}_i(t)$ of $x_i(t)$ generated by the neural system depicted in FIG. 14 is the sum of $\hat{x}_i(t)$ and $\beta_i^L(t)$, the ith output of the RNN 155. To initialize the linear estimator in operation at t=1, we need the initialization values for $y(-J+1), y(-J+2), \ldots, y(0)$. If they are not available during the operation of the neural system, we may set them equal to zero in training the neural system and then in operating the neural system. An alternative way to determine the initialization values is to optimize them jointly with the weights of the neural system.

Selecting Range Extenders and/or Reducers

Figure 16:
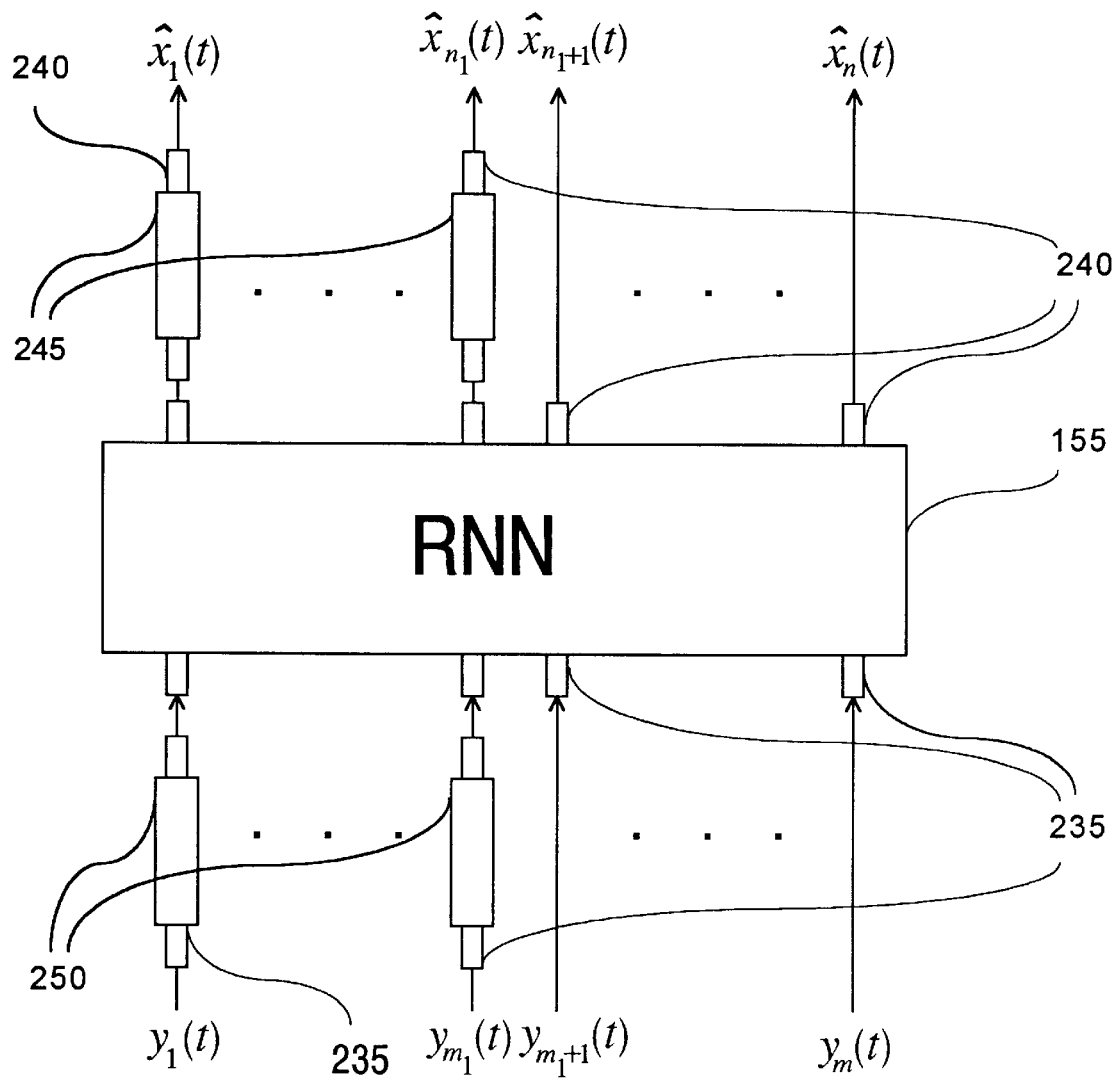
FIG. 16 shows an example neural system receiving an exogenous input process $(y_1(t), y_2(t), \ldots, y_m(t))$ at the input terminals 235 of the neural system and sending out an outward output process $(\hat{x}_1(t), \hat{x}_2(t), \ldots, \hat{x}_n(t))$ at the output terminals 240 of the neural system at time t. Each of the components, $y_1(t), \ldots, y_m(t)$, is dynamically transformed by a range reducer 250. Each of the components, $\hat{x}_1(t), \ldots, \hat{x}_{n_i}(t)$, is the output of a range extender 245. The neural system shown is not the most general type. It is understood that a range reducer may input more than one component of the exogenous input process, and may send its outputs to more than one input neuron of the recurrent neural network in the neural system. It is also understood that a range extender may receive inputs from more than one output neuron of the recurrent neural network, may directly input one or more components of the exogenous input process, and may produce more than one component of the outward output process of the neural system.

FIG. 16 shows a neural system receiving an exogenous input process $(y_1(t), y_2(t), \ldots, y_m(t))$ at the input terminals 235 of the neural system and sending out an outward output process $(\hat{x}_1(t), \hat{x}_2(t), \ldots, \hat{x}_n(t))$ at the output terminals 240 of the neural system at time t. Each of the components, $y_1(t), \ldots, y_{m_1}(t)$, is dynamically transformed by a range reducer. Each of the components, $\hat{x}_1(t), \ldots, \hat{x}_{n_1}(t)$, is the output of a range extender. The neural system shown is not the most general type. Let us first see how range extenders and reducers are selected for such a neural system.

There are three ways to examine the possible range of a component of an exogneous input process or a desired outward output process of a neural system under design. This component will now be referred to as the component process. First, we consider the physical meaning of the component process, which is usually sufficient for us to determine whether the range of the component process is large and/or expanding. For instance, the longitude and latitude of an ocean-going ship or a long range airplane usually have large and expanding ranges. On the other hand, the grey level of a pixel in a thermal imagery usually has a small and bounded range. Second, we analyze the dynamic equation (if it exists) that governs the evolution of the component process. For instance, if the dynamic equation is not BIBO (bounded-input-bounded-output) stable, the range of the component process is not even bounded in the long run. On the other hand, if the dynamic equation has a global attractor, which is super stable, the range of the component must be bounded, provided the perturbation term in the dynamic equation is also bounded. In this case, the bound of the component process can sometimes be determined from the bound of the perturbation. Third, we examine the realizations of the component process in the training data set. If some of the these realizations have a large range or have a tendency to grow, then the range of the component process should be regarded as large and/or expanding.

The adjective, "large," is, of course, a relative term. It has a lot to do with the "resolution" of the component process, that we are concerned with. For instance, if we want to estimate the location of a ship to within a standard error of 10 feet, a range of 10 miles is "very large." However, if we only want to estimate the ship location to within a standard error of ½ mile, the range of 10 mile is not large at all.

After examining the possible range of a component process, if we still have some doubt as to whether the range should be regarded as large, we can check if there is sufficient difference in performance between neural systems with and without a range extender or reducer for the component process to justify including such a range extender or reducer into the neural system.

Recall that a purpose of a range extender by estimate addition is to reduce the valid output range required of an output node of the RNN in a neural system and, with the aid of a range extender by estimate addition, the valid output range required is the range of the difference, at each time point, between the desired outward output of the output node and the auxiliary estimate generated by the auxiliary estimator in the range extender. Hence this range of the difference is a good measure of the need for a range extender by estimate addition. Recall also that a purpose of a range reducer by estimate subtraction is to reduce the valid input range (or valid domain) required of an input node of the RNN in a neural system and, with the aid of a range reducer by estimate subtraction, the valid input range required is the range of the difference, at each time point, between the corresponding exogenous input to the neural system and its estimate generated by the auxiliary estimator in the range reducer. Hence this range of the difference is a good measure of the need for a range reducer by estimate subtraction.

If the input process to the auxiliary estimator in a range extender or reducer is only part or all of the exogenous input process to a neural system, it is straightforward to evaluate the performance of the range extender or reducer. For instance, the auxiliary estimator used in a range extender by feedforward linear estimation, and the auxiliary estimators used in range reducers by differencing and by linear prediction all input part or all of the exogenous input process of a neural system and nothing else. To evaluate the performance of such an auxiliary estimator and thus the range extender or reducer that it serves, all that needs to be done is to apply the auxiliary estimator to the realizations of the part or all of the exogenous input process of the neural system under design, that are available in the training set, compute the estimation errors (i.e. $x_i(t,\omega) - \hat{x}_i(t,\omega)$ or $y_i(t,\omega) - \hat{y}_i(t,\omega)$) of the resulting estimates, and then examine the range of these errors, which is the desired measure of performance. Note that such an evaluation can be done before we start to train neural systems.

If the input process to the auxiliary estimator in a range extender or reducer involves the outputs of the neural system, a thorough evaluation of the performance of the range extender or reducer requires training the neural system first. The auxiliary estimators used in a range extender by accumulation and by linear prediction involve the outputs of the neural system in the auxiliary estimators' inputs.

Since training a neural system involves a great deal of computation, a method of evaluating the performance of such a range extender or reducer without first training a neural system is highly desirable, even if the method does not produce a perfectly accurate results. Let us now look at such a method. Suppose that a good neural system has been found and has a good performance. Then the outward output process of the neural system is closely approximated by its desired outward output process. Hence good approximate realizations of the output process of an auxiliary estimator, whose input process involves the outward output process of the neural system, can be obtained by replacing realizations of the outward output process with realizations of the desired outward output process for the inputing of the auxiliary estimator, provided these realizations of the desired outward output process are available. This method will be called a bootstrap method and usually provides an adequate measure of performance. For instance, the range of $x_i(t,\omega)-x_i(t-1,\omega)$, $t=2,3,\ldots,T$, $\omega \in S$ is thus used as an approximate of the range of $x_i(t,\omega)-\hat{x}_i(t-1,\omega)$, $t=2,3,\ldots,T$, $\omega \in S$, in checking if a range extender by accumulation is effective for the component process $x_i(t)$. To check if a range extender by linear prediction is effective, we examine the range of $x_i(t,\omega)-\Sigma_{j=1}^{J} c_j x_i(t-j,\omega)$, $t=J+1, J+2, \ldots, T$, $\omega \in S$, where J is the order of linear prediction.

However, if a thorough evaluation of a range extender or reducer, whose inputs involve the neural system outputs, is needed, then the training of neural systems is indispensible. Algorithms for training neural systems are provided in the sequel. To minimize computation involved in training, the evaluation and selection of range transformers, and the training of neural systems should be coordinated carefully. We use such a fixed RNN architecture that the architecture of the RNN is a neglegible factor in evaluating and selecting range transformers. We determine the RNN architecture to be eventually used in the neural system only after range transformers are selected. The foregoing bootstrap method can be first used to narrow down the kinds of range transformer for a more thorough evaluation. Here range extenders by linear prediction of different orders are considered as different kinds. Every time a neural system is trained, one or more kinds of range transformers are evaluated. The adjustable weights and initial dynamic state of the RNN of the given fixed architecture, resulting from training a neural system, can be used as initial values of the same weights and initial dynamic state for training the next neural system of the same RNN architecture so as to minimize computation costs.

The final selection of range extenders and reducers for a large RNN architecture is made in consideration of the computational and implementational costs of the range transformers, and, of course, the filtering performance of the neural system in order to optimize the cost-effectiveness of the neural system.

Figure 17:
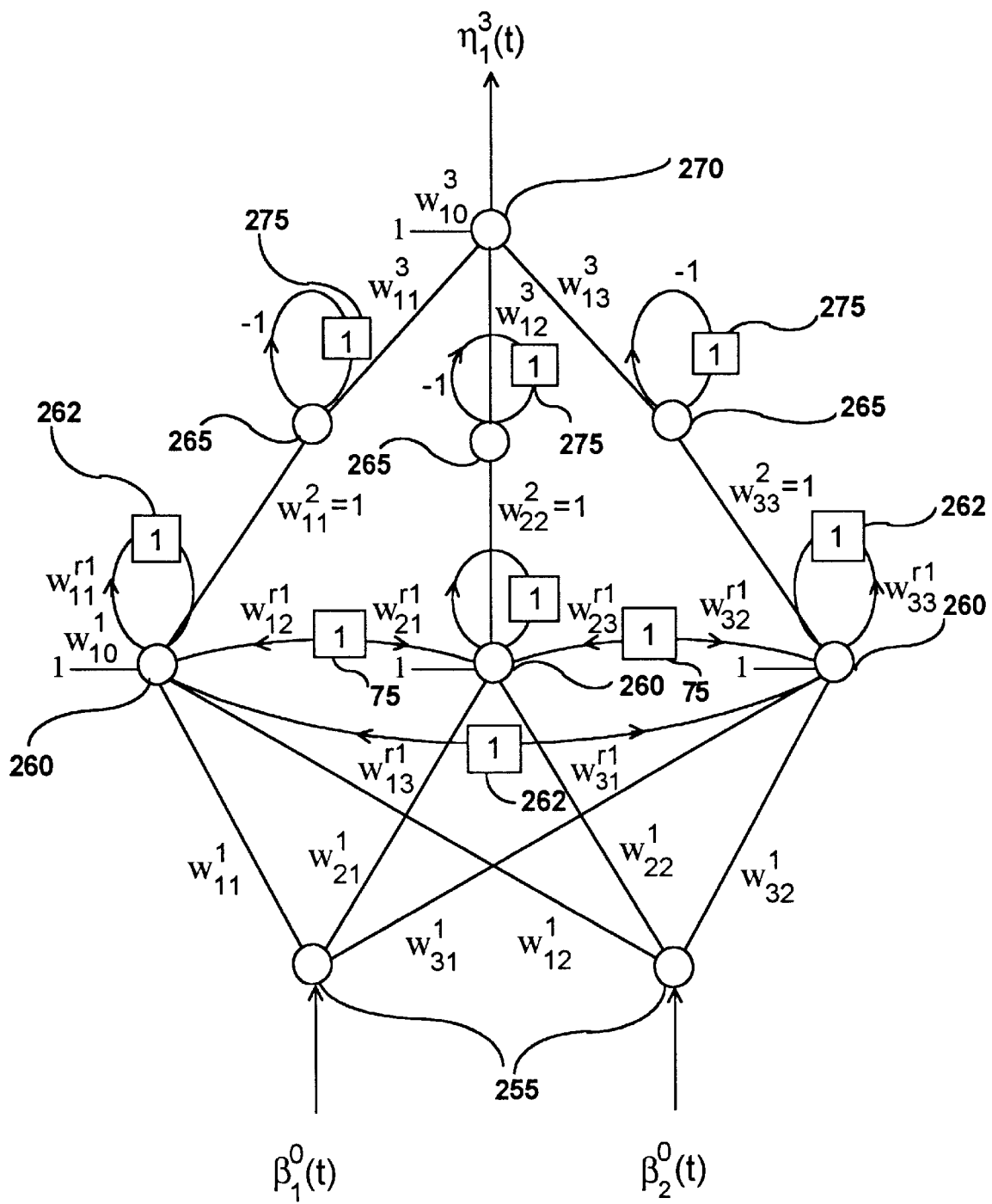
FIG. 17 shows that a neural system with a recursive neural network and range extenders can still have linear weights. The 3 range extenders by accumulation, each consisting of a summer 265 and a unit time delay device 275, can be viewed as the second hidden layer of a multilayer perceptron, whose neurons 260 in the first layer are interconnected. Since the weights $w_{ij}^2=1$ if $i \neq j$, and $=0$ if $i=j$, these weights are not adjustable weights. The ouput neuron is only a summer and the weights $w_{ij}^3$. are not on a cycle. They are linear weights.

It is understood that the ideas and techniques discussed above are applicable to many neural systems with other configurations than that shown in FIG. 16. For instance, FIG. 17 shows a neural system with a somewhat different configuration. It comprises a recursive neural network and range extenders, but still has linear weights from its nonrecursive section. The 3 range extenders by accumulation, each consisting of a summer 265 and a unit time delay device 275, can be viewed as the second hidden layer of a multilayer perceptron, whose neurons 260 in the first layer are interconnected. Since the weights $w_{ij}^2=1$ if $i \neq j$, and $=0$ if $i=j$, these weights are not adjustable weights. The ouput neuron is only a summer and the weights $w_{ij}^3$ are not on a cycle. They are linear weights of the neural system.

If there is an environmental parameter to adapt to on-line, if a recursive NN is required, if adaptive adjustment of weights is necessary, and if it is determined by ideas and techniques discussed above that the ranges of some components of the outward output process of the neural system are necessarily large or expand necessarily in time during the operation of the neural system, then range extenders can be incorporated in a neural system in the way shown in FIG. 17 for each such component of the outward output process. Such a neural system is especially suitable for use as a processor in a robust adaptive neural system to be elaborated on. The adaptively adjustable weights of the processor can be selected from among the linear weights, and the nonadaptively adjustable weights can be selected from among the other weights. The advantages of using only linear weights as adaptively adjustable weights are discussed later on.

Robust Neural Systems with Only Nonadaptively Adjustable Weights

Neural network training and synthesis are well-established concepts in the open literature, where there are many training and synthesis methods and techniques available. These methods and techniques are essentially valid for the robust neural systems disclosed herein except that the training and synthesizing are now performed with respect to a risk-sensitive training criterion. In this subsection, the training and synthesizing of a robust neural system (NS) with only nonadaptively adjustable weights are described using examples. The scope of the present invention should not be limited by these examples.

Recall that an NS either comprises an NN or comprises an NN and at least one range transformer. Synthesizing training data into a neural system (NS) with only nonadaptively adjustable weights with respect to a nonadaptive risk-sensitive training criterion usually comprises training and testing at least one NS, until the performance of an NS is satisfactory or can not be significantly improved by changing the architecture of the NS, whichever comes first, and then selecting a trained and tested NS as the synthesized NS in consideration of NS architecture versus its performance to optimize the cost-effectiveness. The nonadaptively adjustable weights of a synthesized NS are held fixed during its operation. Three example nonadaptive risk-sensitive training criteria are described in the following. An NS with only nonadaptively adjustable weights, that are trained with respect to these nonadaptive risk-sensitive training criteria, is called a robust neural system, whose adjustable weights are held fixed after the nonadaptive training.

For the first example, let us first consider the use of an NS comprising a nonrecurrent NN as an approximate of a known or unknown function f from $\Omega \subset R^m$ to $R^n$. A nonrecurrent NN for approximating f is itself a function with the same domain $\Omega$ and range $R^n$. This function depends also on the nonadaptively adjustable weights w of the nonrecurrent NN and is therefore denoted by $\hat{f}(x,w)$, for $x \in \Omega$.

Given a nonadaptive training data set $S=\{(x_1,z_1), \ldots, (x_N,z_N)\}$, where $z_i=f(x_i)+\xi_i$ and $\xi_i$ is a zero-mean observational noise for $i=1, \ldots, N$, a nonadaptive risk-sensitive training criterion that reflects a risk-sensitive approximation error of the NS is $$Q(w) := \frac{1}{N}\sum_{i=1}^{N} \exp\left[\lambda \|z_i - \hat{f}(x_i, w)\|_p^p\right], \qquad (17)$$

where $$\|\zeta\|_p := \left[\sum_{i=1}^{n} |\zeta_i|^p\right]^{1/p} \text{ for } \zeta \in R^n.$$

Note that if the variances of $\xi_i$'s are zero, $z_i=f(x_i)$, for all i. Widely used nonrecurrent NNs are multilayer perceptrons and radial basis function networks. Methods of training these NNs with respect to the standard quadratic error training criterion are well-known. Modifying them for the nonadaptive risk-sensitive training criterion (17) is straightforward.

For the second example of a nonadaptive risk-sensitive training criterion, let us consider the use of an NS to process an exogenous input process and produce an outward output process. The processing performance of the NS for an intended application is affected by the exogenous input process and/or some other processes. These processes are or can be viewed stochastic processes whose joint probability distributions are determined by their anticipated joint relative frequencies during the operations of the NS. These processes may be natural in the operating environment of the NS or artificial (i.e. man-made or designed) for effecting the intended application, but are all regarded as processes in the operating environment. Some examples of these processes follow. If the NS is trained to be an optimal estimation filter, the involved measurement process is a part or the whole of the exogenous input process, and another process affecting the filtering performance is the signal process to be estimated. If the NS is trained to be a model reference controller, the exogenous input process comprises the input process to the involved reference model and the output process of the plant to be controlled; and another process that affect the control performance is the output process of the reference model. If the NS is trained to be a system identifier in the series-parallel formulation, the exogenous input process comprises the input process and the unit-time delayed output process of the plant to be identified; and another process that affects the identification performance is the output process of the plant to be identified.

Let all the adjustable weights w of the NN and all the adjustable parameters, coefficients and/or initialization values of the range transformers in the NS be called the adjustable weights W of the NS. A realization of the exogenous input process and/or the corresponding realizations of other processes, that, together with the NS, determine the processing performance jointly, are called a realization of the operating environment, which is denoted by $\omega$. Assume for simplicity here that each realization w starts at time t=−B and ends at time t=T, where B is a positive integer so large that all the initial states for the operating environment at time t=0 are specified and/or included in each realization starting at time t=−B; and where the T is a positive integer such that the processing performance of the NS over the time interval from 1 to T reflects sufficiently the processing performance of the NS during its operation. For each realization $\omega$, the exogenous input vector to the NS is denoted by $\zeta(t,\omega)$; and the output vector of the NS with adjustable weights W, after feeding $\zeta(s,\omega)$, s=−B, −B+1, ..., t consecutively one at a time at the input neurons of the NS is denoted by $\gamma(t,\omega, W)$. A widely used measure of processing performance for a realization $\omega$ is usually expressed in the form $$\sum_{\tau=1}^{T} \rho^2(\tau, \omega, \gamma(\tau, \omega, W))$$

for some positive-valued function $\rho$. A risk-sensitive measure of performance of the NS for $\omega$ is exp $$\left[\lambda \sum_{\tau=1}^{T} \rho^p(\tau, \omega, \gamma(\tau, \omega, W))\right].$$

A collection S of exemplary realizations $\omega$ of the operating environment, that are available and used for training the neural system, is called a training data set. For a nonadaptive training of a robust neural system, the nonadaptive training data set consists of simulated data, exerimental data, and/or operational data collected in previous operations. For illustration, assume that each exemplary realization $\omega$ starts at time t=−B and ends at time t=T, where B and T are as defined before. An example nonadaptive risk-sensitive training criterion is $$Q(W) = \frac{1}{|S|} \sum_{\omega \in S} \exp\left[\lambda \sum_{\tau=1}^{T} \rho^p(\tau, \omega, \gamma, (\tau, \omega, W))\right], \quad (18)$$

where |S| is the number of elements in the set S.

In training an NS with respect to this training criterion Q(W), we search for the values $W^*$ of the adustable weights W such that $Q(W^*)$ is small, the NS with $W^*$ has a good generalization ability, the NS has a small number of adjustable weights after pruning, etc. Hence training the NS involves a method of minimizing or reducing Q(W) by the variation of W, a method such as a cross-validation technique to ensure a good generalization capability, and/or sometimes a neural network pruning technique. If the NS comprises neither a recursive neural network nor a range extender, training the NS with respect to Q(W) is easy. Otherwise, methods and algorithms for nonadaptive training discussed in detail in U.S. Pat. No. 5,408,424, entitled "Optimal Filtering by Recurrent Neural Networks," granted 18 Apr. 1995; and U.S. Pat. No. 5,649,065, entitled "Optimal Filtering by Neural Networks with Range Extenders and/or Reducers," granted 15 Jul. 1997 can be applied here with simple modifications.

For the third example of a nonadaptive risk-sensitive training criterion, let us consider the use of an NS to adaptively process an exogneous input process and produce an outward output process in an operating environment with an environmental parameter that is unknown and/or changing from time to time during the operation of the NS. Such environmental parameters and the benefits of an NS adapting to them are discussed in more detail later on. Here, a nonadaptive risk-sensitive training criterion is given for nonadaptively training an NS into a not only robust but also adaptive NS, whose weights do not need to be adjusted on-line. Assume that the exogenous input process and/or other processes that affect the processing performance are dependent on a vector-valued environmental parameter $\theta$, which is unknown and/or changes from time to time during the operation of the NS. If realizations of the operating environment are available for each of a set $\Theta$ of typical values of the environmental parameter $\theta$, a recursive neural network, that is synthesized from these realizations, can have adaptive ability to adapt to the environmental parameter. This capability of a recursive neural network was mentioned in L. A. Feldkamp and G. V. Puskorius, "Training of robust neural controller," in *Proceedings of the 33rd Conference on Decision and Control*, pp. 2754–2759, Lake Buena Vista, Fla., 1994, and James Ting-Ho Lo and Lei Yu, "Adaptive neural filtering by using the innovations process," in *Proceedings of the 1995 World Congress on Neural Networks*, Vol. II, pp. 29–35, Washington, D.C., 1995. An NS consisting of a recursive neural network and at least one range transformer also has the adaptive capability.

Let the realizations $\omega$ of the operating environment that are available for the typical value $\theta$ in $\Theta$ be denoted by $S_\theta$. Then the training data set is $S = \cup_{\theta \in \Theta} S_\theta$ and the training criterion (18) can be written as $$Q(W) = \sum_{\theta \in \Theta} \sum_{\omega \in S_\theta} Q_\omega$$

-continued $$Q_\omega := \frac{1}{|S|} \exp\left[\lambda \sum_{\tau=1}^{T} \rho^p(\tau, \omega, \gamma(\tau, \omega, W))\right],$$

where |S| is the number of elements in $S = \cup_{\theta \in \Theta} S_\theta$ as in (18). The methods of nonadaptively training an NS with respect to (18) are equally applicable here. The "multistream" training method reported in L. A. Feldkamp and G. V. Puskorius, "Training of robust neural controller," in *Proceedings of the 33rd Conference on Decision and Control*, pp. 2754–2759, Lake Buena Vista, Fla., 1994, after some modification, is expected to be effective here. An NS, that is synthesized with respect to the above training criterion, is robust and has adaptive ability to adapt to the environmental parameter θ without adjusting its weights on-line.

Environmental Parameters and Robust Adaptive Neural Systems

In many applications of practical importance, the information available is insufficient to completely specify a neural system's operating environment over its entire operating time period(s), before the same period(s). This information about the operating environment may be in the form of a mathematical (and/or statistical) model with completely or partially specified functional forms, some simulation data, or some true data, or a combination thereof. The insufficiency of information may be parameters that are identified mathematical and/or physical variables (e.g. temperature, fluid flow velocity, chemical concentration, instrument calibration parameters) with unknown values, or may only be viewed or conceived as an unknown number of parameters, which are not even identified, or may be a combination thereof. All these parameters, identified or not, are called environmental parameters. An environmental parameter may be dependent on the neural network (NS) used and may be time-invariant or time-variant. An environmental parameter over time, to be called the environmental parameter function, may be treated as an unknown deterministic function (or constant) or a stochastic process (or random variable) with known or unknown statistics, which may be time-invariant or time-variant. The NS is required to deliver good overall performance over all possible realizations of the environmental parameter function, and to avoid unacceptable or disastrous performances for any individual realizations of the environmental parameter function.

Sometimes, the information available is sufficient to completely specify the NS's operating environment over its entire operating time period(s), before the same period(s). However, the NS's operating environment is so complex or contains so much variability that a processor with predetermined weights and/or parameters is believed to be more difficult to design or more costly to build or operate than a robust and/or adaptive system with on-line weight and/or parameter adjustment. In this case, some specified or unspecified variables in the operating environment are taken as environmental parameters.

To illustrate the terminologies, two example problems of robust and/or adaptive processing are now given.

Example 1

A plant to be identified is a discrete-time SISO (single input single output) dynamic system described by the mathematical model: For t=0,1, . . .

$$y(t+1) = f(y(t), \ldots, y(t-p+1), x(t), \ldots, x(t-q+1), \theta(t), \epsilon(t)), \quad (19)$$

with the initial condition $$(y(0), \ldots, y(-p+1), x(-1), \ldots, x(-q+1)) = (y_0, \ldots, y_{-p+1}, x_{-1}, \ldots, x_{-q+1}), \quad (20)$$

where the function f and the integers, p and q, are given; x(t) is the known input at time t; and ε is a random sequence with given joint probability distributions. A measurement z(t) of y(t) is made available at time t, that satisfies $$z(t) = y(t) + \xi(t), \quad (21)$$

where ξ is a stochastic sequence with given joint probability distributions. If ξ(t) is equal to zero for every t, z(t) equals y(t) and y(t) is thus available. The equations, (19) and (20), describe the evolution of the output y, given the input x, up to and including time t+1, provided that $\theta^t := \{\theta(s), s=1, \ldots, t\}$ is given. Here the symbol ":=" means "being defined to be." The equations, (19), (20) and (21), represent the operating environment of the plant identifier (or emulator) under design. θ(t) is an environmental parameter at time t.

Example 2

A plant is to be identified, whose input/output relationship is known to satisfy equations of the forms, (19) and (20), the function, f, and the integers, p and q, are not known and the environmental parameter θ(t) is a constant not even identified (i.e., how many and what components there are in θ(t) are unknown). However, for each of a large number of different, though unknown, exemplary values of θ, a large set of exemplary realizations of the plant's input process x and output measurement process z are available, which reflect their joint probability distributions during the plant's operations. The operating environment is represented by these exemplary realizations of x and z for each exemplary value of θ. The numbering of the unidentified and unknown exemplary values of θ can be used as an environmental parameter instead of θ.

If an adequate amount of information can be accumulated on-line for an NS to adapt to an environmental parameter so that either the overall processing performance of the NS is improved, or no unacceptable processing performance for the individual values of the environmental parameters occurs, or both, this environmental parameter is called adaptation-worthy, and the NS should make use of the on-line information about this environmental parameter to adapt to it. In the rest of this description, the vector of all the adaptation-worthy environmental parameters of the operating environment of an NS, that are to be adapted to by the NS are called the (vector-valued) environmental parameter for the NS. Nonadaptively training an NS into a robust NS, that has the ability to adapt to an adaptation-worthy environmental parameter without on-line weight adjustment, is discussed in the preceding subsection. However, a robust NS without on-line weight adjustment for both robust as well as adaptive processing has three shortcomings:

If the variability of the adaptation-worthy environmental parameters is large, a large NS, a large set of training data, and a difficult/long training are required.

If the probability distribution of the adaptation-worthy environmental parameters is not known, typical values of these parameters are selected for generating training data. An NS trained on these data is optimal only with respect to the probability distribution of the adaptation-worthy environmental parameters reflected by the values of these parameters selected for training data generation, and thus is not optimal with respect to the real probability distribution.

If the a priori training data set does not cover all possible operation conditions, the NS without on-line weight adjustment may not have the generalization ability to avert disastrous identification results. For instance, a plant to be identified may comprise hundreds of components whose failures or adjustments may not shut down the plant but may change its dynamics sufficiently to upset the neural identifier trained on an a priori data set not including all the possible combinations of the failures and adjustments of these components.

These shortcomings of a robust adaptive NS without on-line weight adjustment make it desirable to use a robust adaptive NS with on-line weight adjustment in many applications. The most common way of adapting an NN on-line is to adjust all its adjustable weights on-line. However, adapting all the adjustable weights of an NN causes three drawbacks:

- As opposed to the fast adaptive algorithms for adaptive linear filters, all the algorithms, such as the backpropagation and RTRL-based algorithms, for adjusting the adjustable weights of an NN, involve a relatively large amount of computation and converge relatively slowly, especially when the NN involved is a recursive one.
- The training criterion (or the performance surface) of a NN with nonlinear hidden neurons is generally nonquadratic and may have many local extrema. As opposed to nonadaptive (or preoperational, or off-line) training in which multiple training sessions can be conducted to avoid choosing a poor local optimizer of the training criterion as the weights for the NN, adaptive training of an adaptive NN during its operation does not usually allow multiple training sessions and can get trapped into a poor local extrema of the training criterion. Global optimization algorithms such as simulated annealing, genetic algorithms, ALOPEX and other stochastic algorithms can be used here, but they converge even more slowly then those algorithms using derivatives of the training criterion with respect to the weights of the NN such as those based on gradient descent, conjugate gradient, or quasi-Newton methods.
- If an unknown environmental parameter is the only information missing about the operating environment of an NN, its adaptive training should focus on learning about and adapting to the unknown environmental parameter. Allowing all the adjustable weights to be adjusted adaptively does not make the best use of the preoperational information and fails to focus on adapting to the unknown environmental parameter alone. Consequently, more information than required for learning about or adapting to the unknown environmental parameter has to be accumulated on-line to achieve successful adaptation.

A novel type of adaptive neural system (ANS), comprising a processor and an adaptor, is disclosed in U.S. patent application Ser. No. 08/575,055 for general adaptive processings. The processor comprises an NN, whose adjustable weights are divided into nonadaptively adjustable weights and adaptively adjustable weights. The nonadaptively adjustable weights are determined in a nonadaptive (or a priori, or off-line) training and are held fixed during the operation of the ANS. This enables the ANS to make full advantage of the a priori information about the operating environment and thereby helps the ANS focus on learning about and adapting to an unknown environmental parameter about the operating environment. The adaptor of the ANS adjusts only the adaptively adjustable weights on-line that are judiciously selected. This allows for the use of simpler, faster and more efficient adaptive algorithm in the adaptor of the ANS and helps reduce or even eliminate poor local minima of the performance surface (or adaptive training criterion) for the adaptive (or on-line) training.

For the same benefits, a robust adaptive NS with adaptively adjustable weights in accordance with the teachings of this invention has a configuration similar to that of the ANS disclosed in U.S. patent application Ser. No. 08/575,055. The robust adaptive NS with adaptively adjustable weights disclosed herein, which is simply called a robust adaptive neural system (RANS), also comprises a processor and an adaptor. The processor is a neural system that either comprises an NN or comprises an NN and at least one range transformer, the adjustable weights of the processor being divided into nonadaptively adjustable weights and adaptively adjustable weights. While the nonadaptively adjustable weights are determined in a nonadaptive training and are held fixed during the operation of the robust adaptive NS, the adaptively adjustable weights are adjusted on-line by the adaptor to adapt to the environmental parameter. In the next two subsections, preferred embodiments of the robust adaptive NS are illustrated by examples.

Robust Adaptive Neural Sytems

Let us now consider the use of a robust adaptive neural system (RANS), defined in the preceding subsection, to process an exogneous input process and to produce an outward output process in an operating environment with an environmental parameter $\theta$ to adapt to. The processing performance of the RANS for an intended application is affected by the exogenous input process of the RANS's processor and/or some other processes, of which at least one is dependent on $\theta$. These processes are or can be viewed as stochastic processes whose joint probability distributions are determined by their anticipated joint relative frequencies during the operations of the RANS. These processes may be natural in the operating environment of the RANS or artificial (i.e. man-made or designed) for effecting the intended application, but are all regarded as processes in the operating environment. Some examples of these processes follow. If the processor in the RANS is trained to be an optimal estimation filter, the involved measurement process is a part or the whole of the exogenous input process, and another process affecting the filtering performance is the signal process to be estimated. If the processor is trained to be a model reference controller, the exogenous input process comprises the input process to the involved reference model and the output process of the plant to be controlled; and another process that affect the control performance is the output process of the reference model. If the processor is trained to be a system identifier in the series-parallel formulation, the exogenous input process comprises the input process and the unit-time delayed output process of the plant to be identified; and another process that affects the identification performance is the output process of the plant to be identified.

A realization of the exogenous input process of the processor and/or the corresponding realizations of other processes, that, together with the RANS, determine the RANS's processing performance jointly, are called a realization of the operating environment, which is denoted by $\omega$. Assume for simplicity here that each realization $\omega$ starts at time t=−B and ends at time t=T, where B is a positive integer so large that all the initial states for the operating environment at time t=0 are specified and/or included in each realization starting at time t=−B; and where the T is a positive integer such that the processing performance of the RANS over the time interval from 1 to T reflects sufficiently the processing performance of the RANS during its operations.

For a nonadaptive training of the processor of an RANS, the nonadaptive training data set consists of exemplary realizations of the operating environment, that are simulated or collected in exeriments and/or previous operations. The nonadaptive training criterion is constructed with such exemplary realizations of the operating environment for the RANS. If a mathematical model is available of the operating environment, it is simulated, using a random number generator if necesary, to generate a collection $S_{\theta_n}$ of such exemplary realizations of the operating environment for each $\theta_n$ of a selected set $\Theta$ of typical values, $\theta_1, \ldots, \theta_N$, of the environmental parameter $\theta$. The set $\Theta$ and the collections $S_{\theta_n}$ should be selected and generated such that the union $S := \cup_{n=1}^{N} S_{\theta_n}$ reflects the operating environment sufficiently. If no mathematical model (or equation) is available for the operating environment, experimental data and/or past operational data can be used. The collection of such data is also denoted by $S := \cup_{n=1}^{N} S_{\theta n}$, where $\theta_1, \ldots, \theta_N$ are again typical values of the environmental parameter $\theta$. Whether S is simulated, experimental or operational data, it is called a nonadaptive training data set.

Recall that an RANS comprises a processor and an adaptor, and that a processor is an NS that either comprises an NN or comprises an NN and at least one range transformer. For simplicity of discussion, the is assumed to comprise an NN and at least one range transformer in the following. Let all the adjustable weights w of the NN and all the adjustable parameters, coefficients and/or initialization values of the range transformers in the processor be collectively called the adjustable weights W of the processor. If no range transformer is used, W=w. For each realization $\omega \in S_\theta$, the exogenous input vector to the processor is denoted by $\zeta(t,\theta,\omega)$; and the outward output vector of the processor with adjustable weights W, after feeding $\zeta(s,\theta,\omega)$, s=−B, −B+1, . . . , t consecutively one at a time at the input terminals of the processor with adjustable weights W is denoted by $\gamma(t,\theta,\omega,W)$.

We divide the adjustable weights W into nonadaptively adjustable weights U and adaptively adjustable weights V. Using these notations, an example nonadaptive risk-sensitive training criterion for training the processor is $$P(U, V(\theta_1), \ldots, V(\theta_N)) = \frac{1}{|S|} \sum_{n=1}^{N} \sum_{\omega \in S_{\theta_n}} \exp\left[\sum_{\tau=1}^{T} \rho^P(\tau, \theta_n, \omega, \gamma(\tau, \theta_n, \omega, U, V(\theta_n)))\right], \quad (22)$$

where $\rho$ is a nonnegative-valued function, and $|S|$ is the number of elements in the set S. Intuitively speaking, in this nonadaptive risk-sensitive training criterion, while the same nonadaptively adjustable weights U are shared by all the selected typical values of $\theta$, one set $V(\theta_n)$ of adaptively adjustable weights is used for each typical value $\theta_n$. This set of variables $V(\theta_n)$ of the function P is called the diversity variables associated with the typical value $\theta_n$ of the environmental parameter $\theta$. Since the optimization of $P(U, V(\theta_1), \ldots, V(\theta_N))$ is done off-line, as much computation as required to produce an optimal or very good solution can be performed. If a cross-validation technique is applied in the nonadaptive training, the generalization capability of the processor is maximized. If an NS pruning method is applied in the nonadaptive training, only those connections with nonadaptively adjustable weights whose being pruned do not significantly increase P and/or reduce the generalization capability of the processor are allowed to be pruned. The weight of a pruned connection is set equal to zero and the weights of all the connections incident to a pruned neuron are also set equal to zero. The values of the variables, U, $V(\theta_1), \ldots, V(\theta_N)$, that result from the nonadaptive training, are denoted by $U^*, V^*(\theta_1), \ldots, V^*(\theta_N)$ and called the best-fit values of these variable with respect to the nonadaptive risk-sensitive training criterion P. If the nonadaptively trained processor is selected to be used in the processor of an RANS, the best-fit values $U^*$ of U are called the operational values of the nonadaptively adjustable weights of the processor with respect to the nonadaptive risk-sensitive training criterion P.

Given an NS with both nonadaptively and adaptively adjustable weights, nonadaptively training the NS is the entire process of searching for the best-fit values of the nonadaptively adjustable weights and the diversity variables of the NS with both nonadaptively and adaptively adjustable weights. Methods and algorithms for nonadaptive training discussed in detail in U.S. Pat. No. 5,649,065, entitled "Optimal Filtering by Neural Networks with Range Extenders and/or Reducers," grant 15 Jul. 1997; and U.S. patent application Ser. No. 08/575,055, entitled "Nonadaptively Trained Adaptive Neural Systems," filed 21 Dec. 1995 can be applied here with simple modifications.

Two types of adaptor, which adaptively adjusts or determines the adaptively adjustable weights of the processor of an RANS, are described in the following.

Using an Adaptor with an Auxiliary NS and a Mapping NN

Figure 18:
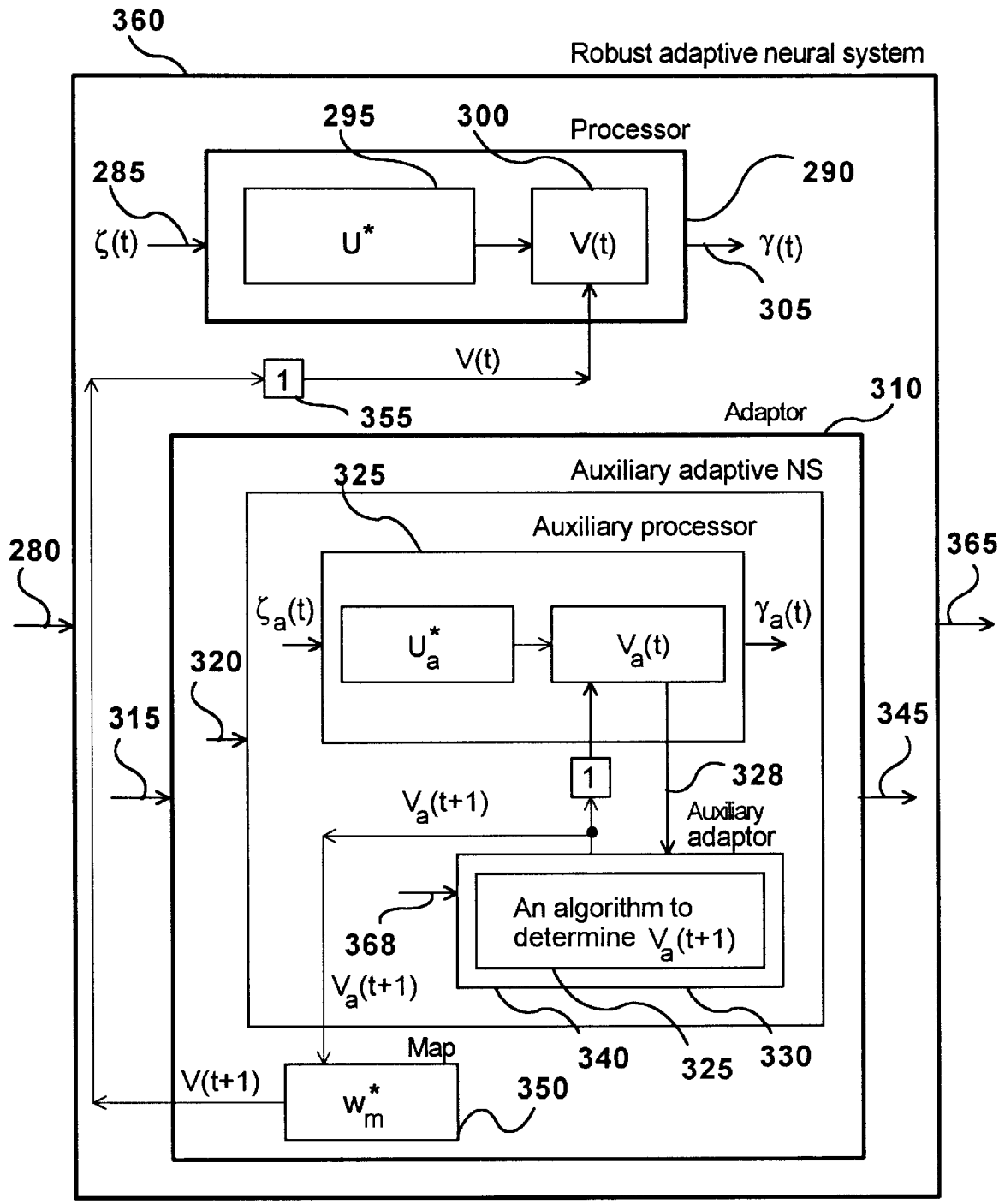
FIG. 18 shows a robust adaptive neural system (NS) with an adaptor 310, in which a map 350 and an auxiliary adaptive NS 340 are employed. The auxiliary adaptive NS 340 comprises a processor 325 and an adaptor 330, which are called an auxiliary processor and an auxiliary adaptor. The robust adaptive NS keeps receiving information 280 from its operating environment. At time t, the processor 290 inputs part or all of this information 285 and presents this and possibly some of the past information in a suitable form $\zeta(t)$ to the processor 290. Using $U^*$ and V(t) as the non-adaptively adjustable and adaptively adjustable weights respectively at time t, the processor processes $\zeta(t)$ to produce its output vector $\gamma(t)$. At the same time t, the adaptor 310 receives information 315 from the robust adaptive NS's inputs 280 and possibly other parts within the robust adaptive NS 360. Inputting $\zeta_a(t)$, the auxiliary processor 325 with nonadaptively adjustable weights $U_a^*$ and adaptively adjustable weights $V_a(t)$ produces $\gamma_a(t)$. Using $\gamma_a(t)$ and other processing information 328 from the auxiliary processor 325, an algorithm in the auxiliary adaptor 330 minimizes or reduces an adaptive training criterion $J_a(V_a,t)$ and thereby determines the values $V_a(t+1)$ of the adaptively adjustable weights $V_a$ of the auxiliary processor 325, which values are then transformed into V(t+1) by the map 350. V(t+1) is then delayed 355 by one time step and transferred into the adaptively adjustable section 300 for use by the processor 290 at the next time instant. The nonadaptively adjustable weights, U and $U_a$, have been set equal to their operational values, $U^*$ and $U_a^*$, obtained in nonadaptive trainings with respect to nonadaptive risk-sensitive training criteria. All the informations from the robust adaptive NS 360 that are used outside it constitute the outputs 365 of the robust adaptive NS 360.

FIG. 18 shows the first type 310 of adaptor, in which a map 350 and an auxiliary adaptive NS 340 are employed. The auxiliary adaptive NS 340 comprises a processor 325 and an adaptor 330, which are called an auxiliary processor and an auxiliary adaptor respectively to distinguish them from the processor 290 and the adaptor 310 of the RANS 360. The adjustable weights $W_a$ of the auxiliary processor 325 are divided into nonadaptively adjustable weights $U_a$ and adaptively adjustable weights $V_a$. The auxiliary adaptor adjusts the adaptively adjustable weights $V_a$ on-line, and the map 350 then transforms them into the adaptively adjustable weights V of the processor 290. In order to adaptively adjust $V_a$, the desired outward output process of the auxiliary processor must be measurable processes in the operating environment.

The exogenous input process and the outward output process of the auxiliary processor 325 are denoted by $\zeta_a(t)$ and $\gamma_a(t)$ respectively. $\zeta_a(t)$ may or may not be the same as the exogenous input process $\zeta(t)$ of the processor 290. For simplicity of discussion here, it is assumed that the nonadaptive training data for the auxiliary processor is the previously defined set $S = \cup_{n=1}^{N} = S_{\theta_n}$ or a subset of S. For each realization $\omega \in S_\theta$, the exogenous input vector to the auxiliary processor 325 is denoted by $\zeta_a(t,\theta,\omega)$; and the output vector of the auxiliary processor with adjustable weights $W_a$, after feeding $\zeta_a(s,\theta,\omega)$, s=−B, −B+1, . . . , t consecutively one at a time at the input terminals of the auxiliary processor with adjustable weights $W_a$ is denoted by $\gamma_a(t,\theta,\omega, W_a)$, or $\gamma_a(t,\theta,\omega,U_a,V_a)$.

An example nonadaptive training criterion for training the auxiliary processor is $$P_a(U_a, V_a(\theta_1), \ldots, V_a(\theta_N)) =$$

$$\frac{1}{|S|} \sum_{n=1}^{N} \sum_{\omega \in S_{\theta_n}} \sum_{\tau=1}^{T} \rho_a^2(\tau, \theta_n, \omega, \gamma_a(\tau, \theta_n, \omega, U_a, V_a(\theta_n))),$$

where $\rho_a^2$ is a function quadratic in $\gamma_a(\tau,\theta_n,\omega,U_a,V_a(\theta_n))$, and $\gamma_a(t,\theta,w,U_a,V_a)$ is assumed to be linear in $V_a$ for all t. The values of $U_a$, $V_a(\theta_1)$, ..., $V_a(\theta_N)$, that result from the nonadaptive training, are denoted by $U_a^*, V_a^*(\theta_1), \ldots, V_a^*(\theta_N)$ and called the best-fit values of these variable with respect to the nonadaptive training criterion $P_a$. If a nonadaptively trained processor is selected to be used as the auxiliary processor 325 of an RANS, the best-fit values, $U_a^*$, of $U_a$ are called the operational values of the nonadaptively adjustable weights of the processor with respect to the nonadaptive training criterion $P_a$. Methods and algorithms for nonadaptive training discussed in detail in U.S. Pat. No. 5,649,065, entitled "Optimal Filtering by Neural Networks with Range Extenders and/or Reducers," grant 15 Jul. 1997; and U.S. patent application Ser. No. 08/575,055, entitled "Nonadaptively Trained Adaptive Neural Systems," filed 21 Dec. 1995 can be applied here with simple modifications.

Denote the current realization of some processes of the operating environment for the RANS 360 during its operation by $\omega_c$; the input vector of the auxiliary processor 325 at time t by $\zeta_a(t,\omega_c)$, and the output vector of the auxiliary processor with its nonadaptively adjustable weights $U_a^*$ and adaptively adjustable weights $V_a$ by $\gamma_a(t,\omega_c,U_a^*,V_a)$, the corresponding cost or error of the auxiliary processor 325 incurred by this output vector at time t is, in general, a function of t, $\omega_c$ and $\gamma_a(t,\omega_c,U_a^*:,V_a)$ and thus denoted by $\sigma_a^2(t,\omega_c,\gamma_a(t,\omega_c,U_a^*,V_a))$. Note that $\omega_c$ contains information about θ. A preferred adaptive training criterion in accordance with the teachings of the present invention is $$J_a(V_a, t) := \frac{\lambda^t - 1}{\lambda - 1} \sum_{\tau=1}^{t} \lambda^{t-\tau} \sigma_a^2(\tau, \omega_c, \gamma_a(\tau, \omega_c, U_a^*, V_a)),$$

where λ is a positive discount factor less than or equal to 1, and $\sigma_a^2$ is a function quadratic in $\gamma_a(\tau,\omega_c,U_a^*,V_a)$. A requirement for the choice of the exogenous input process and outward output process of the auxiliary processor 325 and the choice of $\sigma_a^2$ is that $\sigma_a^2(\tau,\omega_c,\gamma_a(\tau,\omega_c,U_a^*,V_a))$ for all τ and $\omega_c$ is a function of $V_a$ well-defined on-line; i.e., $J_a$ can be constructed with the information available during the operation of the robust adaptive NS 360. Since $\sigma_a^2$ is a function quadratic in $\gamma_a(\tau,\omega_c,U_a^*,V_a)$, and $\gamma_a(\tau,\omega_c,U_a^*,V_a)$ is a function linear in $V_a$, the criterion $J(V_a,t)$ is quadratic in $V_a$, and an RLS, QR-LS, I-QR-LS, LSL, QRD-LSL or LMS algorithm can be used as the algorithm 335 for determining $V_a(t+1)$ by minimizing or reducing $J_a(V_a,t)$. These algorithms are extensively treated in the paper by A. H. Sayed and T. Kailath, "A State-Space Approach to Adaptive RLS Filtering," *IEEE Signal Processing Magazine*, Vol. 11, No. 3, pp.18–60 (1994) and in the book by S. Haykin, *Adaptive Filter Theory*, 2nd edition, Prentice-Hall (1991). The values $V_a(t+1)$ of $V_a$ thus obtained by the auxiliary adaptor 330 at time t are also denoted by $V_a(t+1,\omega_c)$, indicating its dependence on $\omega_c$.

The values $V_a(t+1)$ of the adaptively adjustable weights of the auxiliary processor 325 are transformed by the map 350 into the values $V(t+1)$ of the adaptively adjustable weights of the processor 290, which are in turn delayed 355 by one time step and transfered into the adaptively adjustable section of the processor 290. A preferred map is a mapping NN such as an MLP, which has only nonadaptively adjustable weights and is described by $M(V_a,w_m)$, where $V_a$ denotes the inputs and $w_m$ denotes the nonadaptively adjustable weights of the mapping NN. The mapping NN is trained as follows: For each typical value $\theta_n$, for n=1, ..., N, of the environmental parameter θ, the best-fit values, $V_a^*(\theta_n)$ and $V^*(\theta_n)$, of the adaptively adjustable weights, $V_a$ and V, respectively of the auxiliary processor 325 and the processor 290 are included as a input/output pair in a preliminary training data set for a preliminary nonadaptive training of the MLP. Recall that the best-fit values, $(U_a^*,V_a^*(\theta_1), \ldots, V_a^*(\theta_N))$ and $(U^*,V^*(\theta_1), \ldots, V^*(\theta_N))$, are obtained with respect to $P_a$ for the auxiliary processor and P for the processor respectively. The values of the nonadaptively adjustable weights $w_m$ of the mapping NN, that are obtained in this preliminary training, are then used as the initial guess in a nonadaptive training using a nonadaptive training criterion as follows:

$$Q(w_m) =$$

$$\frac{1}{|S|} \sum_{n=1}^{N} \sum_{\omega \in S_{\theta_n}} \exp\left[\sum_{\tau=1}^{T} \rho^p(\tau, \theta_n, \omega, \gamma(\tau, \theta_n, \omega, U^*, M(V_a^*(\theta_n), w_m)))\right].$$

An alternative nonadaptive training criterion is $$Q(w_m) =$$

$$\frac{1}{|S|} \sum_{n=1}^{N} \sum_{\omega \in S_{\theta_n}} \exp\left[\sum_{\tau=1}^{T} \rho^p(\tau, \theta_n, \omega, \gamma(\tau, \theta_n, \omega, U^*, M(V_a(\tau, \omega), w_m)))\right],$$

where $V_a(\tau,\omega)$ is obtained at time τ−1 by minimizing or reducing $J_a(V_a,\tau)$ by the variation of $V_a$, regarding ω as the "current realization" $\omega_c$.

This is how the robust adaptive NS in FIG. 18 works during its operation: The robust adaptive NS keeps receiving information 280 from its operating environment. At time t, the processor 290 inputs part or all of this information 285 and presents this and possibly some of the past information in a suitable form ζ(t) to the processor 290. Using $U^*$ and $V(t)$ as the nonadaptively adjustable and adaptively adjustable weights respectively at time t, the processor processes ζ(t) to produce its output vector γ(t). At the same time t, the adaptor 310 receives information 315 from the robust adaptive NS's inputs 280 and possibly other parts within the robust adaptive NS 360. Inputting $\zeta_a$(t), the auxiliary processor 325 with nonadaptively adjustable weights $U_a^*$ and adaptively adjustable weights $V_a(t)$ produces $\gamma_a(t)$. Using $\gamma_a(t)$ and other processing information 328 from the auxiliary processor 325, an algorithm in the auxiliary adaptor 330 determines the values $V_a(t+1)$ of the adaptively adjustable weights $V_a$ of the auxiliary processor 325, which values are then transformed into $V(t+1)$ by the map 350. $V(t+1)$ is then delayed 355 by one time step and transferred into the adaptively adjustable section 300 for use by the processor 290 at the next time instant. The algorithm 335 may simply accumulate information at some time steps. In this case, the values $V(t+1)$ produced by the algorithm 335 may stay the same for two or more consecutive times. All the informations from the robust adaptive NS 360 that are used outside it constitute the outputs 365 of the robust adaptive NS 360. We stress here that "time" means an index of time or a numbering of quantities, patterns or events. Usually, it is a temporal instant of time.

Using an Adaptor with a Risk-Sensitive Algorithm

Figure 19:
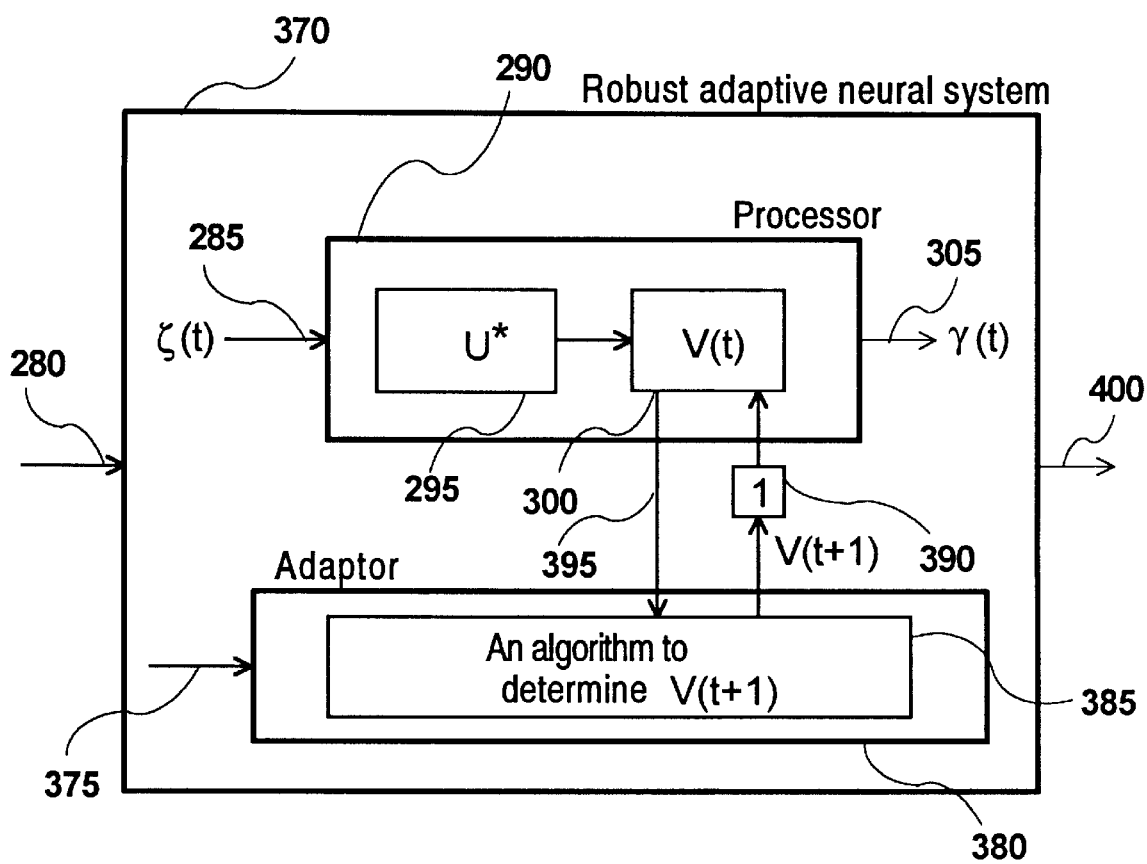
FIG. 19 shows a robust adaptive neural system (NS) 370 with an adaptor, that uses an algorithm for adaptively adjusting the adaptively adjustable weights V of the processor 290 directly. The robust adaptive NS receives inputs 280 from its operating environment, processes these inputs through a processor 290 and an adaptor 380, and produces outputs 400. In the processor 290, the nonadaptively adjustable weights U have been set equal to their operational values $U^*$ obtained with respect to a nonadaptive risk-sensitive training criterion in a nonadaptive training. Using $U^*$ and V(t) as the nonadaptively adjustable and adaptively adjustable weights respectively at time t, the processor 290 processes $\zeta(t)$ to produce its output vector $\gamma(t)$. At the same time t, the adaptor 380 receives information 375 from the processor's outputs 305, and possibly other parts within the robust adaptive NS 370. The adaptor also receives the processor's processing information 395 concerning the adaptively adjustable weights V(t). Using these data, an algorithm 385 in the adaptor minimizes or reduces a adaptive risk-sensitive training criterion and thereby determines the values V(t+1) of the adaptively adjustable weights V of the processor, which values are then delayed 390 by one time step and transferred into the adaptively adjustable section 300 for use by the processor 290 at the next time.

FIG. 19 shows the second type of adaptor 380, which comprises a risk-sensitive algorithm that adjusts the adaptively adjustable weights V of the processor 290 directly. A necessary condition for using this second type of adaptor is that the adaptive training data obtained and accumulated on-line is sufficient in a reasonably short time for determining the adaptively adaptable weights of the processor 290 in an adaptive training of the processor.

To simplify our discussion here, we assume that during the operation of the robust adaptive neural system, the environmental parameter $\theta(t)$ is an unknown constant, and the desired (or target) outward output process is measurable. We also assume that the adaptively adjustable weights V are linear weights of the processor. For each realization $\omega$, the exogenous input vector to the processor 290 is denoted by $\zeta(t,\omega)$; the outward output vector of the processor with nonadaptively adjustable weights $U^*$ and adaptively adjustable weights V, after feeding $\zeta(s,\omega)$, $s=-B, -B+1, \ldots, t$, consecutively one at a time at the input terminals of the processor is denoted by $\gamma(t,\omega,U^*,V)$; and the measurement of the desired outward output vector $\delta(t,\omega)$ by $z(t,\omega)=\delta(t,\omega)+\xi(t,\omega)$, where $\xi$ is a measurement noise process with zero mean. An adaptive training criterion for adaptively adjusting V is $$J(V,t) = \int \exp\left[\lambda \sum_{\tau=1}^{t} (\delta(\tau,\omega) - \gamma(\tau,\omega,U^*,V))^2\right] d\mu(\omega), \quad (23)$$

where the integral is taken with respect to the probability distribution $\mu$ of the stochastic processes, whose realizations constitute the realizations $\omega$ of the operating environment. Since the adaptively adjustable weights V are linear weights of the processor, $$\gamma(t,\omega,U^*,V) = V\beta_c(t)$$

$$= ((\beta_c(t))^T \otimes I)\text{vec}(V),$$

for some column vector $\beta_c(t)$, which is a column vector usually of the activation levels, at time t, of the neurons (including 1 for bias) processed by the connections with the adaptively adjustable weights V. Here $\otimes$ denotes the Kronecker product, and vec is the vectorization operator. Let the minimizer of $J(V,T)$ be denoted $V^*$. Note that both $J(V,T)$ and $V^*$ are functions of $\theta(t)$, which is assumed to be a constant parameter.

Consider the following "linear signal and measurement processes":

$$a(t+1) = a(t)$$

$$z(t) = H(t)a(t) + \xi_c(t),$$

where $$\xi_c(t) := \delta(t) - V^*(t)\beta_c(t) + \xi(t) \quad (24)$$

$$a(t) := \text{vec}(V^*)$$

$$H(t) := (\beta_c(t))^T \otimes I.$$

A risk-sensitive filter for these signal and measurement processes, that performs the following minimization, $$\min_{\hat{a}(\cdot)} \frac{1}{\lambda} \ln E\left[\exp\lambda \sum_{\tau=1}^{t} \|H(\tau)a(\tau) - H(\tau)\hat{a}(\tau)\|^2\right],$$

over all Borel functionals $\hat{a}(\cdot)$ of $\{z(1), \ldots, z(t)\}$, produces a risk-sensitive estimate of $a(t)$, which will also be denoted by $\hat{a}(t)$. A crude probability distribution of $a(0)$ can be obtained from $V^*(\theta_1), \ldots, V^*(\theta_n)$. Let its mean and covariance be denoted by $a(0)$ and $P(0)$.

Usually, $a(0)$ is not Gaussian, and $\xi_c(t)$ cannot be a white Gaussian process. However, if these Gaussian conditions are approximately true, two risk-sensitive filters, the a posteriori and a priori risk-sensitive filters, are available for approximating the risk-sensitive estimate of a (t). Even if these Gaussian conditions are not approxiamately true, the a posteriori and a priori risk-sensitive filters should still work well, because they are also $H^\infty$ filters (See B. Hassibi and A. H. Sayed and T. Kailath, "$H^\infty$-Optimality of the LMS Algorithm, *IEEE Transactions on Signal Processing*, vol. 44, pp. 267–280, (1996)).

If $\lambda \leq \frac{1}{2}$ and $\text{trace}(\Sigma_{t=0}^\infty H(t)H^T(t)) = \infty$, then the a posteriori risk-sensitive filter exists and its equations are:

$$\hat{a}(t+1) = \hat{a}(t) + K(t+1)(z(t+1) - H(t+1)\hat{a}(t)) \quad (25)$$

$$K(t) = P(t)H^T(t)(I + H(t)P(t)H^T(t))^{-1}$$

$$P(t+1) = P(t) - P(t)[H^T(t)\ H^T(t)]R_e^{-1}(t)[H^T(t)\ H^T(t)]^T P(t)$$

$$R_e(t) = \begin{bmatrix} -(2\lambda)^{-1}I & 0 \\ 0 & R(t) \end{bmatrix} + \begin{bmatrix} H(t) \\ H(t) \end{bmatrix} P(t)[H^T(t)\ H^T(t)].$$

If $\lambda \leq \frac{1}{2}$, $\text{trace}(\Sigma_{i=0}^\infty H(t)H^*(t)) = \infty$, and $P^{-1}(0) - H(t)H^*(t) \geq 0$ for $t=0, 1, \ldots$, then the a priori risk-sensitive filter exists and its equations are:

$$\hat{a}(t+1) = \hat{a}(t) + K_a(t)(z(t) - H(t)\hat{a}(t)) \quad (26)$$

$$K_a(t) = \tilde{P}(t)H^T(t)(I + H(t)\tilde{P}(t)H^T(t))^{-1}$$

$$\tilde{P}(t) = [P^{-1}(t) - 2\lambda H^*(t)H(t)]^{-1},$$

where $P(t)$ satisfies the above Riccati equation.

If $\lambda$ is set equal to $\frac{1}{2}$, the above filters become the so-called normalized LMS algorithm and LMS algorithm respectively for the multiple measurement case.

This is how a robust adaptive neural system (NS) in FIG. 19 works: The robust adaptive NS receives inputs 280 from its operating environment, processes these inputs through a processor 290 and an adaptor 380, and produces outputs 400. In the processor 290, the nonadaptively adjustable weights U have been set equal to their operational values $U^*$ obtained with respect to the nonadaptive risk-sensitive training criterion $P(u,v(\theta_1), \ldots, v(\theta_N))$ in equation (22) in a nonadaptive training. Using $U^*$ and $V(t)$ as the nonadaptively adjustable and adaptively adjustable weights respectively at time t, the processor 290 processes $\zeta(t)$ to produce its output vector $\gamma(t)$. At the same time t, the adaptor 380 receives information 375 from the processor's outputs 305, and possibly other parts within the robust adaptive NS 370. The adaptor also receives the processor's processing information 395 concerning the adaptively adjustable weights $V(t)$. Using these data, an algorithm 385 in the adaptor minimizes or reduces the adaptive risk-sensitive training criterion $J(V,t)$ and thereby determines the values $V(t+1)$ of the adaptively adjustable weights V of the processor, which values are then delayed 390 by one time step and transferred into the adaptively adjustable section 300 for use by the processor 290 at the next time.

Innumerable variations of the the preferred embodiments shown in FIG. 18 and FIG. 19 are possible. Some examples are the following.

- Different time indices can be used for the processor and the adaptor in an ANS.
- Another scheme for determining or adjusting the adaptively adjustable weights of the processor 290 can be employed in the adaptor.
- Some nonadaptively adjustable weights can also be used as adaptively adjustable weights being adjusted in an adaptive training.
- Realizations ω of the nonadaptive training data S are of different lengths, and the nonadaptive training criterion is defined accordingly. This is especially important, when a mathematical model of the operating environment is unavailable and realizations in the nonadaptive training data can only be collected in experiments and actual operations.
- Realizations ω of the nonadaptive training data S start at different times and the nonadaptive training criterion is defined accordingly. This is especially important for time-varying operating environment.
- If the nonadaptive training data is not sufficient to reflect the operating environment, the disclosed methods of nonadaptively training an NS can still be applied. The resulting values of the nonadaptively adjustable weights can still carry important, although incomplete, information about the operating environment, which can still be useful for subsequent adaptive training.
- If only a coarse and/or inaccurate mathematical model is available or if the nonadaptive training data contain inaccurate data about the operating environment, the disclosed methods of nonadaptively training an NS can still be applied. The resulting values of the nonadaptively adjustable weights can still carry important, although inaccurate, information about the operating environment, which can still be useful for subsequent adaptive training.
- A plurality of NNs are used in the processor. In fact, by the definition of a neural network, it is not necessarily connected and hence a plurality of NNs can be viewed as a single NN.
- A combination of two or more of the above variations is used.

CONCLUSION, RAMIFICATION, AND SCOPE OF INVENTION

A robust neural system for robust processing is disclosed, that is able to avert unacceptable or disastrous processing performances. This robust neural system either comprises a neural network or comprises at least one range transformer. At least one weight of the robust neural system is a nonlinear weight of the neural work determined in a nonadaptive training of the robust neural system with respect to a nonadaptive risk-sensitive training criterion. Various versions of the robust neural system are described for various robust processing requirements.

While our descriptions hereinabove contain many specificities, these should not be construed as limitations on the scope of the invention, but rather as an exemplification of preferred embodiments. In addition to these embodiments, those skilled in the art will recognize that other embodiments are possible within the teachings of the present invention. Accordingly, the scope of the present invention should be limited only by the appended claims and their appropriately construed legal equivalents.

What is claimed is:

1. A robust neural system for robust processing, said robust neural system comprising a neural network, wherein at least one adjustable weight of said neural network is a nonlinear weight of said neural network, that is determined in a nonadaptive training of said robust neural system with respect to a nonadaptive risk-sensitive training criterion.

2. The robust neural system of claim 1, wherein said robust neural system comprises at least one range transformer.

3. The robust neural system of claim 1, wherein all the adjustable weights of said robust neural system, including said at least one adjustable weight, are nonadaptively adjustable weights determined in said nonadaptive training, said adjustable weights of said robust neural system being held fixed during said robust neural system's operation.

4. The robust neural system of claim 3, wherein said nonadaptive risk-sensitive training criterion is constructed with realizations of said robust neural system's operating environment for each of a plurality of typical values of an environmental parameter, said robust neural system being for robust and adaptive processing.

5. The robust neural system of claim 1, wherein said neural network is a multilayer perceptron.

6. The robust neural system of claim 1, wherein said neural network is a recurrent neural network.

7. The robust neural system of claim 1, wherein said neural network is a recursive neural network.

8. The robust neural system of claim 1, wherein said neural network is a radial basis function network.

9. A robust adaptive neural system for robust and adaptive processing, said robust adaptive neural system comprising:

a processor, comprising
   a plurality of nonadaptively adjustable weights, whose operational values are determined in a nonadaptive training of said robust neural system with respect to a nonadaptive risk-sensitive training criterion; and
   a plurality of adaptively adjustable weights; and
adaptor means for adjusting the values of said adaptively adjustable weights in an adaptive training during said robust adaptive neural system's operation,
wherein at least one of said nonadaptively adjustable weights is a nonlinear weight of said processor.

10. The robust adaptive neural system of claim 9, wherein said processor comprises at least one range transformer.

11. The robust adaptive neural system of claim 9, wherein said plurality of adaptively adjustable weights are linear weights of said processor.

12. The robust adaptive neural system of claim 11, wherein an algorithm, selected from the group consisting of the a posteriori risk-sensitive filter, the a priori risk-sensitive filter, the normalized LMS algorithm and the LMS algorithm, is used in said adaptor means.

13. The robust adaptive neural system of claim 9, wherein said processor comprises a multilayer perceptron comprising at least one of said adaptively adjustable weights, and said at least one of said nonadaptively adjustable weights.

14. The robust adaptive neural system of claim 9, wherein said processor comprises a recursive neural network comprising at least one of said adaptively adjustable weights, and said at least one of said nonadaptively adjustable weights; and wherein said at least one of said nonadaptively adjustable weights is in the recursive section of said recursive neural network.

15. The robust adaptive neural system of claim 9, wherein said processor comprises a radial basis function network comprising at least one of said adaptively adjustable weights, and said at least one of said nonadaptively adjustable weights.

16. The robust adaptive neural system of claim 9, wherein an auxiliary adaptive neural system and a map are used in said adaptor means.

17. An article of manufacture for training a neural system comprising a plurality of nonadaptively adjustable weights and a plurality of adaptively adjustable weights, said article of manufacture comprising:

evaluation means for evaluating a nonadaptive risk-sensitive training criterion, that is a function of said nonadaptively adjustable weights and the diversity variables associated with a plurality of typical values of said neural system's environmental parameter; and adjusting means for adjusting the values of said nonadaptively adjustable weights and said diversity variables to reduce the value of said nonadaptive risk-sensitive training criterion, wherein at least one of said nonadaptively adjustable weights is a nonlinear weight of said neural system.

18. The article of manufacture of claim 17, wherein said neural system comprises a multilayer perceptron.

19. The article of manufacture of claim 17, wherein said neural system comprises a radial basis function network.

20. The article of manufacture of claim 17, wherein said neural system comprises a recursive neural network.

\* \* \* \* \*